US011339839B2

(12) United States Patent
Toyoda et al.

(10) Patent No.: US 11,339,839 B2
(45) Date of Patent: May 24, 2022

(54) REVERSE INPUT SHUTOFF CLUTCH, ELECTRIC VALVE TIMING ADJUSTMENT DEVICE, VARIABLE COMPRESSION RATIO DEVICE, AND ELECTRIC POWER STEERING DEVICE

(71) Applicant: NSK LTD., Tokyo (JP)

(72) Inventors: Toshirou Toyoda, Fujisawa (JP); Kota Fukuda, Fujisawa (JP); Hiroki Nishii, Fujisawa (JP); Yuya Daikoku, Fujisawa (JP); Yuka Kaneko, Fujisawa (JP)

(73) Assignee: NSK LTD., Tokyo (JP)

( * ) Notice: Subject to any disclaimer, the term of this patent is extended or adjusted under 35 U.S.C. 154(b) by 17 days.

(21) Appl. No.: 16/634,992

(22) PCT Filed: Jul. 27, 2018

(86) PCT No.: PCT/JP2018/028267
§ 371 (c)(1),
(2) Date: Jan. 29, 2020

(87) PCT Pub. No.: WO2019/026794
PCT Pub. Date: Feb. 7, 2019

(65) Prior Publication Data
US 2021/0262532 A1 Aug. 26, 2021

(30) Foreign Application Priority Data

Aug. 1, 2017 (JP) .............................. JP2017-148955
Oct. 5, 2017 (JP) .............................. JP2017-195214
(Continued)

(51) Int. Cl.
*F16D 51/22* (2006.01)
*B62D 5/04* (2006.01)
(Continued)

(52) U.S. Cl.
CPC ............ *F16D 51/22* (2013.01); *B62D 5/0433* (2013.01); *F02D 15/02* (2013.01); *F16D 41/105* (2013.01); *F16D 43/26* (2013.01); *B62D 5/005* (2013.01)

(58) Field of Classification Search
None
See application file for complete search history.

(56) References Cited

U.S. PATENT DOCUMENTS 1,575,038 A 3/1926 Class
1,617,745 A 2/1927 Cousinard
(Continued)

FOREIGN PATENT DOCUMENTS

CN 102482955 A 5/2012
CN 103124667 A 5/2013
(Continued)

OTHER PUBLICATIONS

International Search Report and Written Opinion dated Oct. 30, 2018, from International Application No. PCT/JP2018/028267, 13 sheets.
(Continued)

*Primary Examiner* — Timothy Hannon
(74) *Attorney, Agent, or Firm* — Katten Muchin Rosenman LLP

(57) ABSTRACT

The reverse input shutoff clutch includes: an input member, an output member coaxially arranged with the input member, a pressed member having a pressed surface, and an engaging element. The engaging element, when rotational torque is inputted to the input member, moves in a direction away from the pressed surface due to engagement with the input member and transmits the rotational torque to the output member, and when rotational torque is reversely inputted to the output member, moves in a direction toward
(Continued)

the pressed surface due to engagement with the output member, and prevents or suppresses relative rotation between the output member and the pressed member.

19 Claims, 46 Drawing Sheets

(30) Foreign Application Priority Data

Mar. 5, 2018 (JP) .............................. JP2018-038243
Jul. 13, 2018 (JP) .............................. JP2018-133373

(51) Int. Cl.
*F02D 15/02* (2006.01)
*F16D 41/10* (2006.01)
*F16D 43/26* (2006.01)
*B62D 5/00* (2006.01)

(56) References Cited

U.S. PATENT DOCUMENTS

| | | | | |
|---|---|---|---|---|
| 2,359,010 | A * | 9/1944 | Smith | F16B 1/04 |
| | | | | 192/223.1 |
| 2,870,889 | A * | 1/1959 | Walton | F16D 41/08 |
| | | | | 192/22 |
| 3,051,282 | A | 8/1962 | Greene | |
| 3,335,831 | A | 8/1967 | Kalns | |
| 4,591,029 | A | 5/1986 | Da Foe | |
| 5,007,511 | A * | 4/1991 | Ostrander | F16D 59/00 |
| | | | | 192/223 |
| 5,325,947 | A * | 7/1994 | Campbell | F16D 43/02 |
| | | | | 192/107 T |
| 8,376,115 | B2 * | 2/2013 | Cai | B60N 2/938 |
| | | | | 192/223 |
| 9,455,607 | B2 * | 9/2016 | Mizutani | F16D 51/12 |
| 2012/0098367 | A1 | 4/2012 | Mizutani et al. | |
| 2014/0190762 | A1 | 7/2014 | Kiyota et al. | |
| 2016/0185383 | A1 | 6/2016 | Fujita et al. | |

FOREIGN PATENT DOCUMENTS

| | | | | |
|---|---|---|---|---|
| DE | 102015011862 | A1 * | 3/2017 | ........... F02N 15/023 |
| EP | 0631901 | A1 | 1/1995 | |
| EP | 2 415 978 | A1 | 2/2012 | |
| JP | 3-4838 | Y2 | 6/1984 | |
| JP | 2002-174320 | A | 6/2002 | |
| JP | 2004-084918 | A | 3/2004 | |
| JP | 2007-232095 | A | 9/2007 | |
| JP | 2007239520 | A | 9/2007 | |
| JP | 2009108889 | A | 5/2009 | |
| JP | 2010-255494 | A | 11/2010 | |
| JP | 2010-281292 | A | 12/2010 | |
| JP | 2011-27252 | A | 2/2011 | |
| JP | 2013-36467 | A | 2/2013 | |
| JP | 2016-121782 | A | 7/2016 | |
| JP | 2016-173080 | A | 9/2016 | |

OTHER PUBLICATIONS

Extended European search report dated Mar. 17, 2021, from European Patent Application No. 18840469.3-1012, 12 sheets.
Office Action dated Apr. 2, 2021, from Chinese Patent Application No. 201880050907.5, 11 sheets.

* cited by examiner

REVERSE INPUT SHUTOFF CLUTCH, ELECTRIC VALVE TIMING ADJUSTMENT DEVICE, VARIABLE COMPRESSION RATIO DEVICE, AND ELECTRIC POWER STEERING DEVICE

TECHNICAL FIELD

The present invention relates to a reverse input shutoff clutch having a function that transmits rotational torque that is inputted to an input member to an output member, and completely shuts off rotational torque that is reversely inputted to the output member so as not to be transmitted to the input member, or allows only part of that reversely inputted rotational torque to be transmitted to the input member and shuts off the remaining part. The present invention also relates to an electric valve timing adjustment device, a variable compression ratio device, and an electric power steering device in which the reverse input shutoff clutch is incorporated.

BACKGROUND ART

A reverse input shutoff clutch includes an input member connected to an input side mechanism such as a drive source and an output member connected to an output side mechanism such as a speed reduction mechanism or the like, and has a function that transmits rotational torque that is inputted to an input member to an output member, and completely shuts off rotational torque that is reversely inputted to the output member so as not to be transmitted to the input member, or allows only part of that reversely inputted rotational torque to be transmitted to the input member and shuts off the remaining part.

The reverse input shutoff clutch is roughly classified into a lock type and a free type according to a difference in a mechanism for shutting off the rotational torque reversely inputted to the output member. The lock-type reverse input shutoff clutch includes a mechanism that prevents or suppresses rotation of the output member when rotational torque is reversely inputted to the output member. On the other hand, the free-type reverse input shutoff clutch includes a mechanism that causes the output member to idle when rotational torque is inputted to the output member. Which one of the lock-type reverse input shutoff clutch and the free-type reverse input shutoff clutch is used is appropriately determined depending on the intended use or the like of the device incorporating the reverse input shutoff clutch.

JP 2002-174320A, JP 2007-232095A, JP 2004-084918A and the like describe lock-type reverse input shutoff clutches. The reverse input shutoff clutch described in JP 2002-174320A includes a mechanism that, when rotational torque is reversely inputted to an output member, prevents rotation of an output member by using the change of a coil spring in diameter caused by the torsion of the coil spring to tighten a member arranged inside the coil spring. On the other hand, the reverse input shutoff clutches described in JP 2007-232095A and JP 2004-084918A include a mechanism that, when rotational torque is reversely inputted to an output member, prevents rotation of the output member by moving rolling bodies arranged in wedge-shaped spaces between an inner member and an outer member toward sides of the wedge-shaped spaces where the width in the radial direction becomes narrow to cause a strut force between the inner member and outer member.

On the other hand, a valve timing adjustment device (Variable Cam Timing: VCT) is used as a control mechanism for changing the valve timing of the internal combustion engine in accordance with the operating state of the internal combustion engine. The valve timing adjustment device controls the phase of the camshaft according to the operating state such as the engine speed, accelerator opening, or the like, and optimizes the timing of opening and closing of the intake valve and exhaust valve, for example, so that suitable torque and output may be obtained.

JP 2016-173080A describes a hydraulic valve timing adjustment device that uses engine oil pressure. However, the hydraulic valve timing adjustment device has a need for improvement in that the responsiveness is poor at the time of low-temperature startup when fluidity of oil is low. In view of this, JP 2010-255494A describes an electric valve timing adjustment device that is capable of improving the responsiveness at the time of low-temperature startup by using an electric motor.

PRIOR ART DOCUMENTS

Patent Literature

Patent Literature 1: JP 2002-174320A
Patent Literature 2: JP 2007-232095A
Patent Literature 3: JP 2004-084918A
Patent Literature 4: JP 2016-173080A
Patent Literature 5: JP 2010-255494A

SUMMARY OF INVENTION

Problem to be Solved by the Invention

The reverse input shutoff clutch described in JP 2002-174320A uses a change of a coil spring in diameter caused by torsion of the coil spring, so it is necessary to ensure a long axial dimension of the coil spring. Accordingly, there is a problem in that the axial direction dimension of the reverse input shutoff clutch becomes large. The reverse input shutoff clutches described in JP 2007-232095A and JP 2004-084918A have a problem in that the number of parts increases due to a large number of rolling elements being used.

An object of the present invention is to provide a lock-type reverse input shutoff clutch in which it is possible to shorten the dimension in the axial direction and reduce the number of parts.

Means for Solving the Problems

The reverse input shutoff clutch of the present invention includes: an input member, an output member, a pressed member, and an engaging element.

The output member is coaxially arranged with the input member.

The pressed member has a pressed surface.

The engaging element, when a rotational torque is inputted to the input member, moves in a direction away from the pressed surface due to engagement with the input member and engages with the output member, to transmit the rotational torque that is inputted to the input member to the output member; and when a rotational torque is reversely inputted to the output member, moves in a direction toward the pressed surface due to engagement with the output member and comes in contact with the pressed surface, to completely shut off not to transmit the rotational torque that is reversely inputted to the output member, or to transmit part of the rotational torque that is reversely inputted to the output member to the input member and shut off the remaining part of the rotational torque that is reversely inputted to the output member.

The reverse input shutoff clutch of the present invention may have a configuration in which, in a positional relationship in which the engaging element is brought into contact with the pressed surface by rotational torque being reversely inputted to the output member, a gap exists between the engaging element and the input member and allows the engaging element to be pressed toward the pressed surface due to the engaging element engaging with the output member.

The engaging element may be arranged between the pressed surface and an output member side engaging portion provided on the output member, and may cause an input member side engaging portion provided at a portion of an end surface of the input member that is separated in a radial direction from the center of rotation of the input member to engage with an engaging element side input engaging portion that is provided in the engaging element so as to enable movement of the engaging element toward or away from the pressed surface. In this case, the engaging element side input engaging portion may be configured by a hole (through hole, or hole with a bottom) formed in an axial direction. Alternatively, the engaging element side input engaging portion may be formed so as to be recessed inward in the radial direction on an outer surface of the engaging element in the radial direction.

A magnitude of looseness of the input member side engaging portions with respect to the engaging element side input engaging portion may be made to be different between a case in which the input member rotates in one direction and a case in which the input member rotates in the other direction.

A portion of the engaging element that engages with the output member side engaging portion may have a flat surface shape. In this case, a bottom surface of the engaging element including the portion engaging with the output member side engaging portion may have a flat surface shape entirely.

A plurality of the engaging elements may be provided so as to sandwich the output member side engaging portion from the outer side in the radial direction. In this case, a pair of the engaging elements may be provided so as to sandwich the output member side engaging portion by the bottom surfaces of the engaging elements.

Each of the pair of engaging elements may comprise a concave guide portion on the bottom surface, and an elastic member may be arranged so as to span between the concave guide portions.

The pressed surface may be an arc-shaped concave surface, and a pressing surface of the engaging element that is pressed against the pressed surface may be an arc-shaped convex surface having a radius of curvature equal to or smaller than the radius of curvature of the pressed surface.

An elastic member may be arranged between the output member and the engaging element.

A shutoff rate of rotational torque reversely inputted to the output member may be made to be different between a case in which the output member rotates in one direction and a case in which the output member rotates in the other direction.

A cross-sectional shape of the pressed surface and a cross-sectional shape of the pressing surface of the engaging element pressed against the pressed surface may both be linear or arc shaped. In this case, the cross-sectional shape of the pressing surface may be linear, and flat or curved chamfers may be provided on both sides of the pressing surface in the axial direction.

An electric valve timing adjustment device of the present invention includes an electric motor as a drive source, a driven member that is rotationally driven by a crankshaft, and a speed reduction mechanism that has a first input portion, a second input portion, and an output portion connected to a camshaft; in which a reverse input shutoff clutch of the present invention is provided between the electric motor and the driven member, and the speed reduction mechanism, and the reverse input shutoff clutch is constructed by the reverse input shutoff clutch according of the present invention;

the electric motor is connected to the input member;

the driven member is connected to the pressed member;

the first input portion of the speed reduction mechanism is connected to the output member, and the second input portion of the speed reduction mechanism is connected to the driven member; and when the electric motor is driven, the rotational torque of the electric motor is transmitted to the output portion of the speed reduction mechanism, and when the electric motor is not driven, the rotational torque of the driven member is transmitted to the output portion of the speed reduction mechanism.

A variable compression ratio device of the present invention includes: a link mechanism that is connected to a piston of an internal combustion engine and that moves the piston in a vertical direction; a control shaft for changing the posture of the link mechanism by own rotation; and an electric motor for rotating the control shaft; and has a function that, by changing a rotation phase of the control shaft by the electric motor, changes at least one of the top dead center position and the bottom dead center position of the piston to change the engine compression ratio.

In the variable compression ratio device of the present invention, a reverse input shutoff clutch of the present invention is provided between the electric motor and the control shaft; the input member is connected to the electric motor either directly or via a speed reduction mechanism; and the output member is connected to the control shaft or is integrally provided with the control shaft.

An electric power steering device of the present invention includes: a rotating shaft that rotates based on the operation of a steering wheel and applies a steering angle to steered wheels according to an amount of rotation of the steering wheel; a steering force assisting motor for applying an assisting force to the rotating shaft; and a worm reducer that is provided between the steering force assisting motor and the rotating shaft and that transmits rotation of the steering force assisting motor to the rotating shaft.

In the electric power steering device of the present invention, the rotating shaft is configured by connecting an input-side rotating shaft and an output-side rotating shaft coaxially arranged with each other via a reverse input shutoff clutch of the present invention; the input member is connected to the input-side rotating shaft or is integrally provided with the input-side rotating shaft; and the output member is connected to the output-side rotating shaft or is integrally provided with the output-side rotating shaft.

Effect of Invention

With the present invention, the axial dimension of the reverse input shutoff clutch may be shortened, and the number of parts may be reduced.

MODES FOR CARRYING OUT THE INVENTION

First Example

Figure 1:
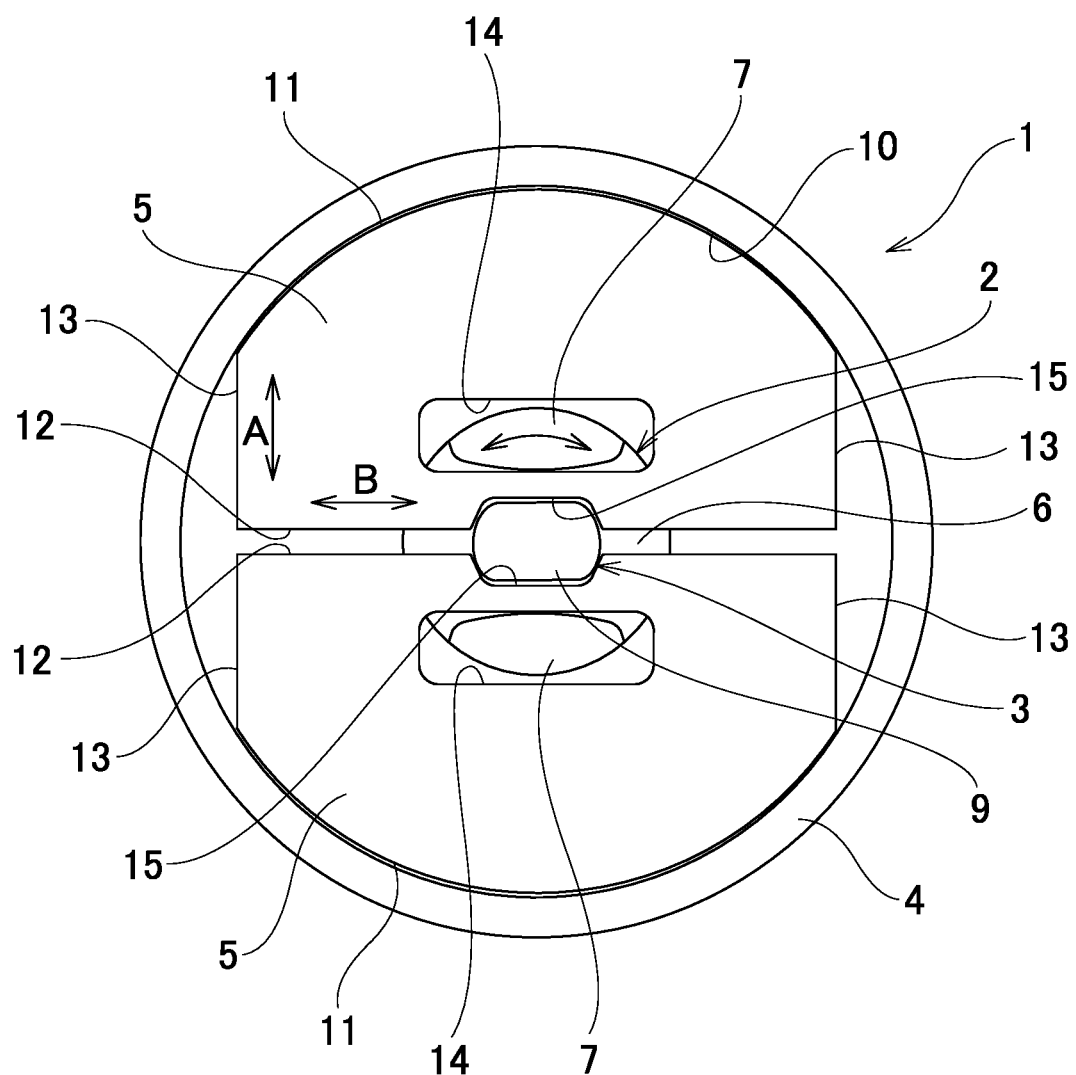
FIG. 1 is a diagram illustrating a reverse input shutoff clutch of a first example of an embodiment of the present invention.

A first example of an embodiment of the present invention will be described with reference to FIG. 1 to FIG. 9. Note that in the following description, unless specified otherwise, the axial direction, the radial direction, and the circumferential direction refer to the axial direction, the radial direction, and the circumferential direction of a reverse input shutoff clutch 1. In this example, the axial direction, the radial direction, and the circumferential direction of the reverse input shutoff clutch 1 coincide with the axial direction, the radial direction, and the circumferential direction of an input member 2, coincide with the axial direction, the radial direction, and the circumferential direction of an output member 3, and coincide with the axial direction, the radial direction, and the circumferential direction of a pressed member 4.

[Description of the Structure of the Reverse Input Shutoff Clutch]

The reverse input shutoff clutch 1 of this example is a lock-type reverse input shutoff clutch, and includes an input member 2, an output member 3, a pressed member 4, and a pair of engaging elements 5. The reverse input shutoff clutch 1 has a reverse input shutoff function that transmits rotational torque that is inputted to the input member 2 to the output member 3, however, completely shuts off rotational torque that is reversely inputted to the output member 3 so as not to be transmitted to the input member 2, or allows only part of that reversely inputted rotational torque to be transmitted to the input member 2 and shuts off the remaining part.

Figure 3:
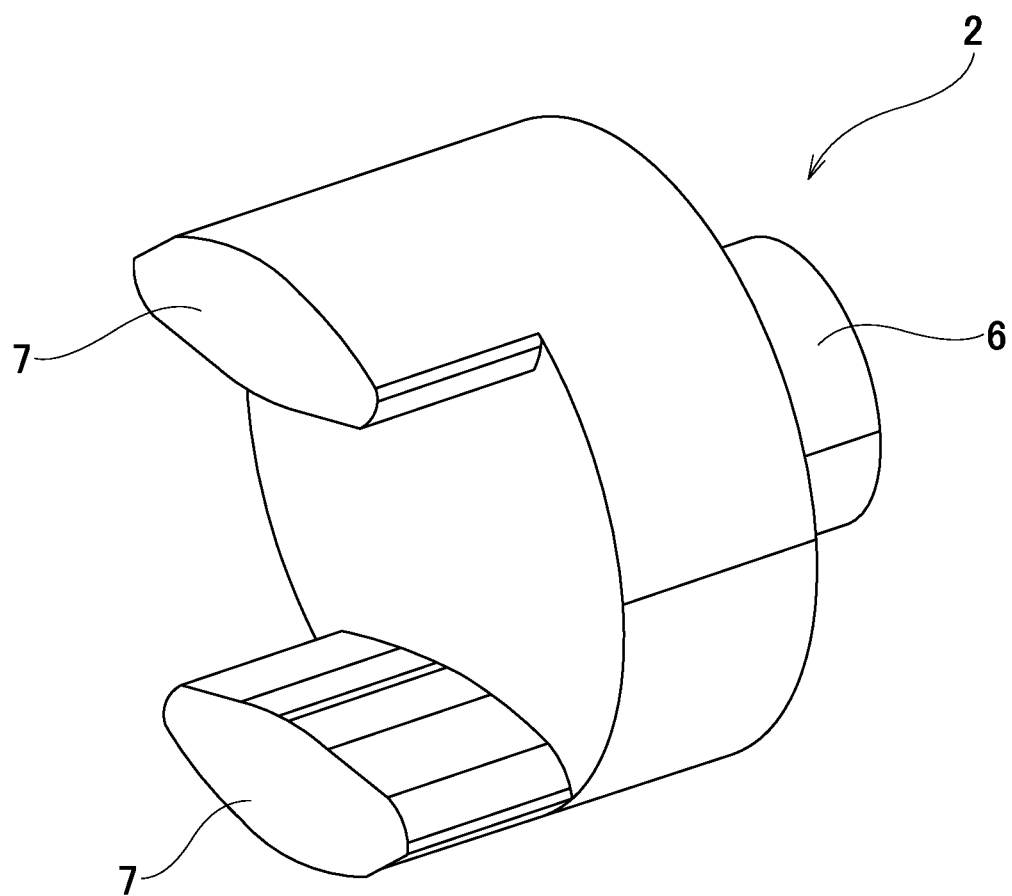
FIG. 3 is a perspective view illustrating a part of an input member that is removed from the reverse input shutoff clutch of the first example.

The input member 2 is connected to an input side mechanism such as an electric motor or the like from which rotational torque is inputted. As illustrated in FIG. 3, the input member 2 includes an input shaft portion 6 and a pair of input member side engaging portions 7. The input shaft portion 6 has a stepped columnar shape, and a base end portion thereof is connected to an output portion of the input side mechanism so as to be able to transmit torque, or is integrally provided with an output portion of the input side mechanism. Each of the pair of input member side engaging portions 7 has a substantially elliptical columnar shape, and the pair of input member side engaging portions 7 is constituted by convex portions that extend in the axial direction from two positions on diametrically opposite sides of the tip end surface of the input shaft portion 6. Each of the pair of input member side engaging portions 7 is separated from the other in the diameter direction of the input member 2. For this reason, each of the pair of input member side engaging portions 7 is disposed in a portion of the tip end surface of the input shaft portion 6 that is separated outwardly in the radial direction from the center of rotation. The input member side engagement portion 7 has an outer side surface in the radial direction thereof that has a contour shape that is the same cylindrical surface shape as the outer circumferential surface of the tip end portion of the input shaft portion 6, and an inner side surface in the radial direction thereof that is an arc-shaped convex surface of which the central portion in the circumferential direction protrudes inward in the radial direction.

Figure 4:
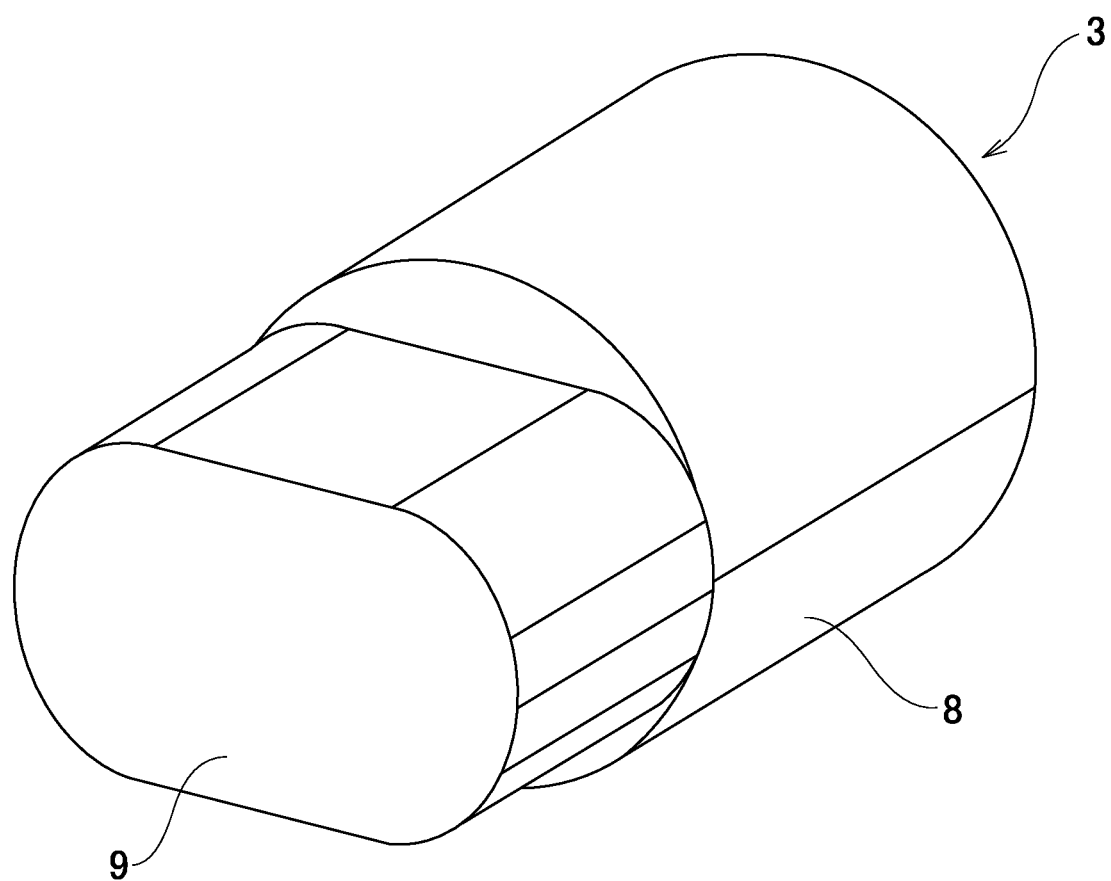
FIG. 4 is a perspective view illustrating a part of an output member that is removed from the reverse input shutoff clutch of the first example.

The output member 3 is connected to an output side mechanism such as a speed reduction mechanism or the like, and outputs rotational torque. The output member 3 is arranged coaxially with the input member 2 and, as illustrated in FIG. 4, has an output shaft portion 8 and an output member side engaging portion 9. The output shaft portion 8 has a columnar shape, and a tip end portion thereof is connected to the input portion of the output side mechanism so as to be able to transmit torque, or is integrally provided with the input portion of the output side mechanism. The output member side engaging portion 9 has a cam function. In other words, the distance from the center axis of rotation of the output member 3 to the outer peripheral surface of the output member side engaging portion 9 is not constant in the circumferential direction. In this example, the output member side engaging portion 9 has a substantially long columnar shape and extends in the axial direction from the central portion of the base end surface of the output shaft portion 8. The outer peripheral side surface of the output member side engaging portion 9 is constituted by a pair of flat surfaces that are parallel to each other and a pair of arc-shaped convex surfaces. For this reason, the distance from the center of rotation of the output member side engaging portion 9 to the outer peripheral side surface is not constant in the circumferential direction. The output member side engaging portion 9 is arranged in a portion between the pair of input member side engaging portions 7.

Figure 2:
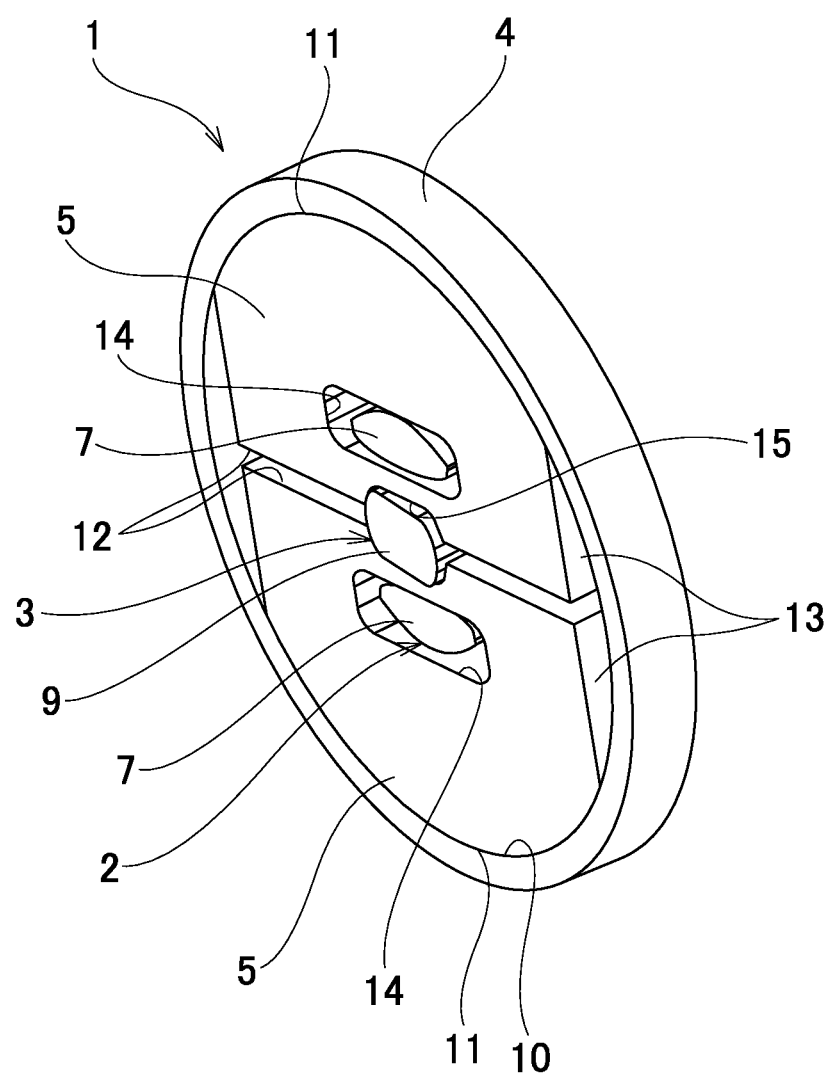
FIG. 2 is a perspective view of a reverse input shutoff clutch of the first example.

As illustrated in FIG. 2, the pressed member 4 is formed in a thin annular shape, and is fixed to another member (not illustrated) such as a housing or the like, for example, and the rotation thereof is restricted. The pressed member 4 is arranged coaxially with the input member 2 and the output member 3, and arranged farther on the outer side in the radial direction than the input member 2 and the output member 3. More specifically, the pair of input member side engaging portions 7 and the output member side engaging portion 9 are arranged on the inner side in the radial direction of the pressed member 4 in the assembled state of the reverse input shutoff clutch 1. The pressed member 4 has a pressed surface 10, which is a cylindrical surface shaped concave surface, on the inner peripheral surface thereof.

Each of the pair of engaging elements 5 is formed in a substantially semicircular plate shape, and the pair of engaging elements 5 is arranged on the inner side in the radial direction of the pressed member 4. Each of the pair of engaging elements 5 has an outer side surface in the radial direction that is pressed against the pressed surface 10, which constitutes a pressing surface 11 composed of a cylindrical surface shaped convex surface, and an inner side surface in the radial direction, which constitutes a bottom surface 12, other than a portion where an engaging element side output engaging portion 15 (described later) is formed, having a flat surface shape. Moreover, both sides in the width direction of each of the engaging elements 5 are flat surface shaped side surfaces 13 that are perpendicular to the bottom surface 12. Note that the radial direction with respect to the engaging element 5 is a direction perpendicular to the bottom surface 12 and is indicated by an arrow A in FIG. 1, and a direction parallel to the bottom surface 12 that is indicated by an arrow B in FIG. 1 is referred to as the width direction with respect to the engaging element 5. The radius of curvature of the pressing surface 11 is equal to or less than the radius of curvature of the pressed surface 10. The pressing surface 11 has a surface characteristic of having a large friction coefficient as compared with other portions of the engaging element 5. The pressing surface 11 may be configured directly by the surface of the engaging element 5 or may be configured by a friction material fixed to the engaging element 5 by bonding, adhesion or the like.

In this example, the pressing surfaces 11 of the pair of engaging elements 5 are directed to the opposite side in the radial direction of the pressed member 4, and the bottom surfaces 12 of the pair of engaging elements 5 are opposed to each other. Moreover, in a state where the pair of engaging elements 5 is arranged on the inner side in the radial direction of the pressed member 4, the inner diameter dimension of the pressed member 4 and the radial dimensions of the engaging elements 5 are regulated so that there are gaps in at least one of a portion between the pressed surfaces 10 and the pressing surfaces 11 and a portion between the bottom surfaces 12.

Each engaging element 5 has an engaging element side input engaging portion 14 and an engaging element side output engaging portion 15. The engaging element side input engaging portion 14 is configured by a through hole that penetrates an intermediate portion in the radial direction of the engaging element 5 in the axial direction, and is a rectangular long hole that is long in the width direction. The engaging element side input engaging portion 14 has a size that allows the input member side engaging portion 7 to be loosely inserted. More specifically, in a state where the input member side engaging portion 7 is inserted inside the engaging element side input engaging portion 14, there are gaps in the width direction and in the direction orthogonal to the width direction of the engaging element 5 between the input member side engaging portion 7 and the inner surface of the engaging element side input engaging portions 14. Accordingly, the input member side engaging portion 7 may be displaced in the direction of rotation of the input member 2 with respect to the engaging element side input engaging portion 14 (engaging element 5), and the engaging element side input engaging portion 14 may be displaced in a direction orthogonal to the width direction of the engaging element 5 with respect to the input member side engaging portion 7.

The engaging element side output engaging portion 15 is constructed by a substantially rectangular concave portion that is recessed outward in the radial direction from the central portion in the width direction of the bottom surface 12 of each of the pair of engagement elements 5. Each engaging element side output engaging portion 15 has a size and a shape such that a front half part in the minor axis direction of the output member side engaging portion 9 may be disposed on the inner side thereof without looseness. More specifically, the opening width of the engaging element side output engaging portion 15 is substantially the same (the same or slightly larger) as the dimension in the major axis direction of the output member side engaging portion 9, and the depth in the radial direction is slightly smaller than ½ of the dimension in the minor axis direction of the output member side engaging portion 9. The bottom portion of the engaging element side output engaging portion 15 is a flat surface parallel to the bottom surface 12.

In the assembled state of the reverse input shutoff clutch 1 of the present example, the pair of input member side engaging portions 7 of the input member 2 arranged on one side in the axial direction is respectively inserted in the axial direction into each of the engaging element side input engaging portion 14 of the pair of engaging elements 5, and the output member side engaging portion 9 of the output member 3 arranged on the other side in the axial direction is inserted in the axial direction into between the pair of engaging element side output engaging portions 15. In other words, the pair of engaging elements 5 is arranged so that the output member side engaging portion 9 is sandwiched from the outer side in the radial direction by the engaging element side output engaging portions 15. Moreover, in this example, the dimension in the axial direction of the input member side engaging portions 7, the dimension in the axial direction of the output member side engaging portion 9, the dimension in the axial direction of the pressed member 4, and the dimensions in the axial direction of the engaging elements 5 are mostly the same.

[Operation of the Reverse Input Shutoff Clutch Operation]

The operation of the reverse input shutoff clutch 1 of this example will be described.

(Case of Inputting Rotational Torque to the Input Member 2)

Figure 5:
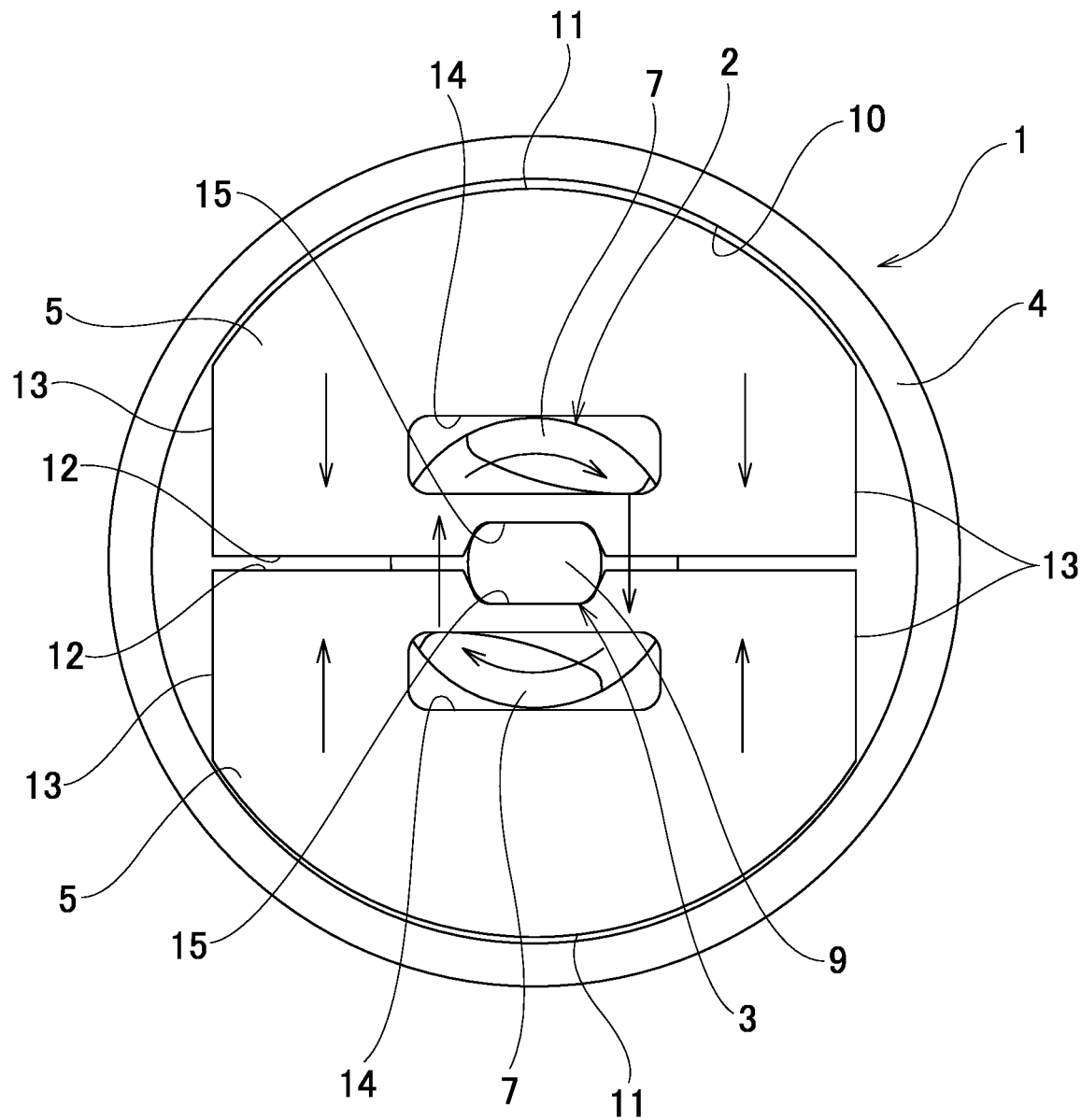
FIG. 5 is a diagram illustrating a state in which rotational torque is inputted to the input member in the reverse input shutoff clutch of the first example.

First, a case in which rotational torque is inputted to the input member 2 from the input side mechanism will be described. As illustrated in FIG. 5, when rotational torque is inputted to the input member 2, the input member side engaging portion 7 is rotated inside the engaging element side input engaging portion 14 in the direction of rotation of the input member 2 (clockwise direction in the example in FIG. 5). Then, the inner side surface in the radial direction of the input member side engaging portion 7 presses the inner surface of the engaging element side input engaging portion 14 inward in the radial direction, and each of the pair of engaging elements 5 moves in a direction away from the pressed surface 10. In other words, due to the engagement with the input member 2, the pair of engaging elements 5 is moved inward in the radial direction, that is to say, in a mutually approaching direction (the engaging element 5 located on the upper side in FIG. 5 is moved downward, and the engaging element 5 located on the lower side in FIG. 5 is moved upward). As a result, the bottom surfaces 12 of the pair of engaging elements 5 move in a direction toward each other, and the pair of engaging element side output engaging portions 15 sandwich the output member side engaging portion 9 of the output member 3 from both sides in the radial direction. In other words, while rotating the output member 3 so that the major axis direction of the output member side engaging portion 9 is parallel to the bottom surfaces 12 of the engaging elements 5, the output member side engaging portion 9 is made to engage with the pair of engaging element side output engaging portions 15 without looseness. Therefore, the rotational torque that is inputted to the input member 2 is transmitted to the output member 3 via the pair of engaging elements 5 and outputted from the output member 3. When the rotational torque is inputted to the input member 2, the reverse input shutoff clutch 1 of this example moves the pair of engaging elements 5 in directions away from the pressed surface 10, regardless of the direction of rotation of the input member 2. Then, regardless of the direction of rotation of the input member 2, the rotational torque inputted to the input member 2 is transmitted to the output member 3 via the pair of engaging elements 5.

(Case of Reversely Inputting Rotational Torque to the Output Member 3)

Figure 6:
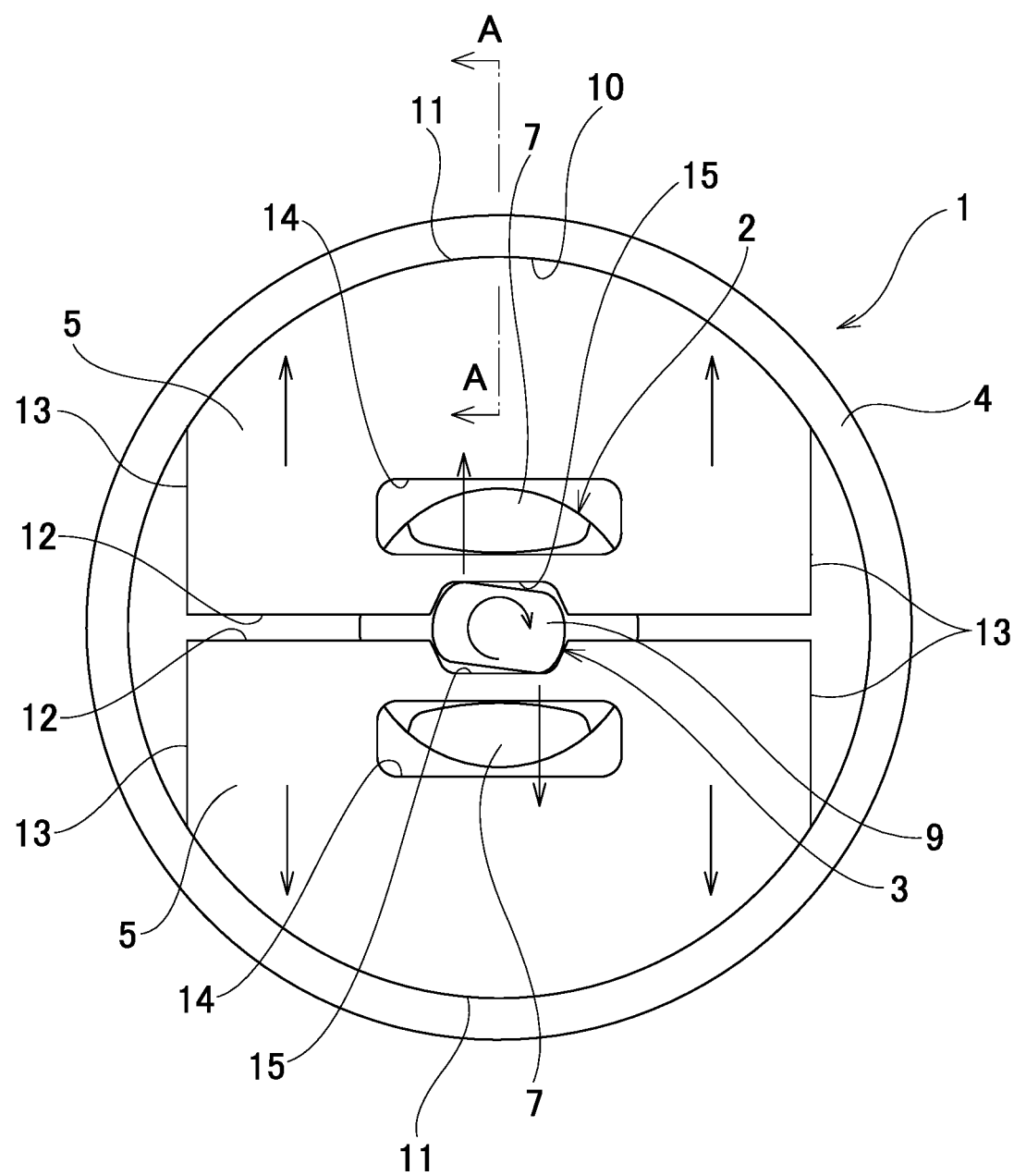
FIG. 6 is a diagram illustrating a state in which rotational torque is reversely inputted to the output member in the reverse input shutoff clutch of the first example.

Next, a case in which rotational torque is reversely inputted to the output member 3 from the output side mechanism will be described. As illustrated in FIG. 6, when rotational torque is reversely inputted to the output member 3, the output member side engaging portion 9 rotates on the inner side between the pair of engaging element side output engaging portions 15 in the direction of rotation of the output member 3 (clockwise direction in the example in FIG. 6). Then, the corner portions of the output member side engaging portion 9 press the bottom surfaces of the engaging element side output engaging portions 15 outward in the radial direction, and move the pair of engaging elements 5 in directions toward the pressed surface 10. In other words, due to the engagement with the output member 3, the pair of engaging elements 5 are moved outward in the radial direction, that is to say, in a mutually separating direction (the engaging element 5 located on the upper side in FIG. 5 is moved upward, and the engaging element 5 located on the lower side in FIG. 5 is moved downward). As a result, each pressing surface 11 of the pair of engaging elements 5 is pressed against the pressed surface 10 of the pressed member 4. At this time, the pressing surfaces 11 and the pressed surface 10 are in contact with each other over the entire range or a part of the range (for example, the central portion) of the pressing surfaces 11 in the circumferential direction. As a result, the rotational torque that is reversely inputted to the output member 3, by being transmitted to the pressed member 4 fixed to another member (not illustrated), is completely shut off and not transmitted to the input member 2, or only a part of the rotational torque that is reversely inputted to the output member 3 is transmitted to the input member 2, and the remaining part is shut off. In order to completely shut off the rotational torque reversely inputted to the output member 3 and prevent that rotational torque from being transmitted to the input member 2, the pair of engaging elements 5 is stretched between the output member side engaging portion 9 and the pressed member 4 to lock the output member 3 so that the pressing surfaces 11 do not slide (relatively rotate) with respect to the pressed surface 10. On the other hand, in order that only a part of the rotational torque reversely inputted to the output member 3 is transmitted to the input member 2 and the remaining part is shut off, the pair of engaging elements 5 is stretched between the output member side engaging portion 9 and the pressed member 4 to semi-lock the output member 3 so that the pressing surfaces 11 slide with respect to the pressed surface 10. In a state where the output member 3 is semi-locked, when a rotational torque is further reversely inputted to the output member 3, the pair of engaging elements 5 rotate about the center of rotation of the output member 3 while the pressing surfaces 11 slide with respect to the pressed surfaces 10 due to the engagement between the output member side engaging portion 9 and the engaging element side output engaging portions 15. When the pair of engaging elements 5 rotates, the inner surfaces of the engaging element side input engaging portions 14 press the inner side surfaces in the radial direction of the input member side engaging portions 7 in the circumferential direction (direction of rotation), and part of the rotational torque is transmitted to the input member 2.

Note that in the reverse input shutoff clutch 1 of the present example, the size of the gaps between the constituent members is adjusted so that the operations described above are possible.

Figure 9:
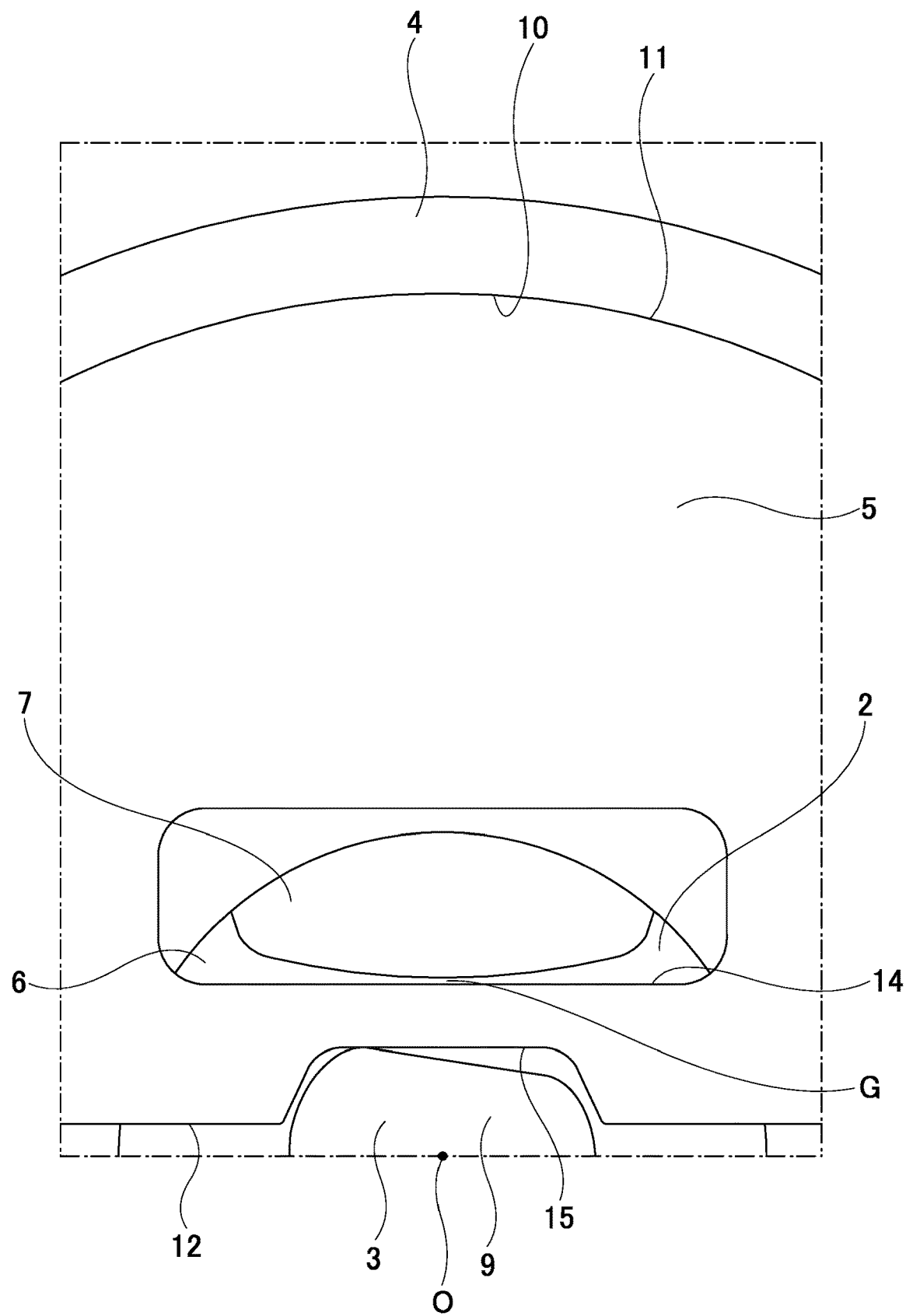
FIG. 9 is a partially enlarged view illustrating a state of the reverse input shutoff clutch of the first example, in which rotational torque is reversely inputted to the output member, and a pressing surface of the engaging element comes into contact with a pressed surface, and an input member side engaging portion of the input member is positioned in the center in the width direction of an engaging element.

For example, in this example, as illustrated in FIG. 9, in a positional relationship in which the pressing surface 11 of the engaging element 5 comes in contact with the pressed surface 10 by reversely inputting rotational torque to the output member 3, when the input member side engaging portion 7 is positioned at the center in the width direction inside the engaging element side input engaging portion 14, or in other words, when, of the inner side surface of the input member side engaging portion 7 in the radial direction, the central portion in the circumferential direction that is a portion that is located at a position closest to the center of rotation of the input member 2 (=center of rotation of the output member 3) 0 is moved farthest away from the center of rotation O of the input member 2 on the outer side in the radial direction (upper side in FIG. 9) in the direction of movement of the pressing surface 11 with respect to the pressed surface 10 (up-down direction in FIG. 9), the inner side surface in the radial direction of the input member side engaging portion 7 and the inner surface of the engaging element side input engaging portion 14 are not in contact with each other. In other words, between the inner side surface in the radial direction of the input member side engaging portion 7 and the inner surface of the engaging element side input engaging portion 14, there is a gap G that allows the pressing surface 11 to be pressed toward the pressed surface 10 due to the corner of the output member side engaging portion 9 pressing the bottom surface of the engaging element side output engaging portion 15. As a result, in a case where rotational torque is reversely inputted to the output member 3, the input member side engaging portion 7 does not prevent the engaging element 5 from moving to the outer side in the radial direction (upper side in FIG. 9), and even after the pressing surface 11 comes in contact with the pressed surface 10, the surface pressure acting on the contact portion between the pressing surface 11 and the pressed surface 10 changes according to the magnitude of the rotational torque reversely inputted to the output member 3 thereby properly locking or semi-locking the output member 3.

Figure 7:
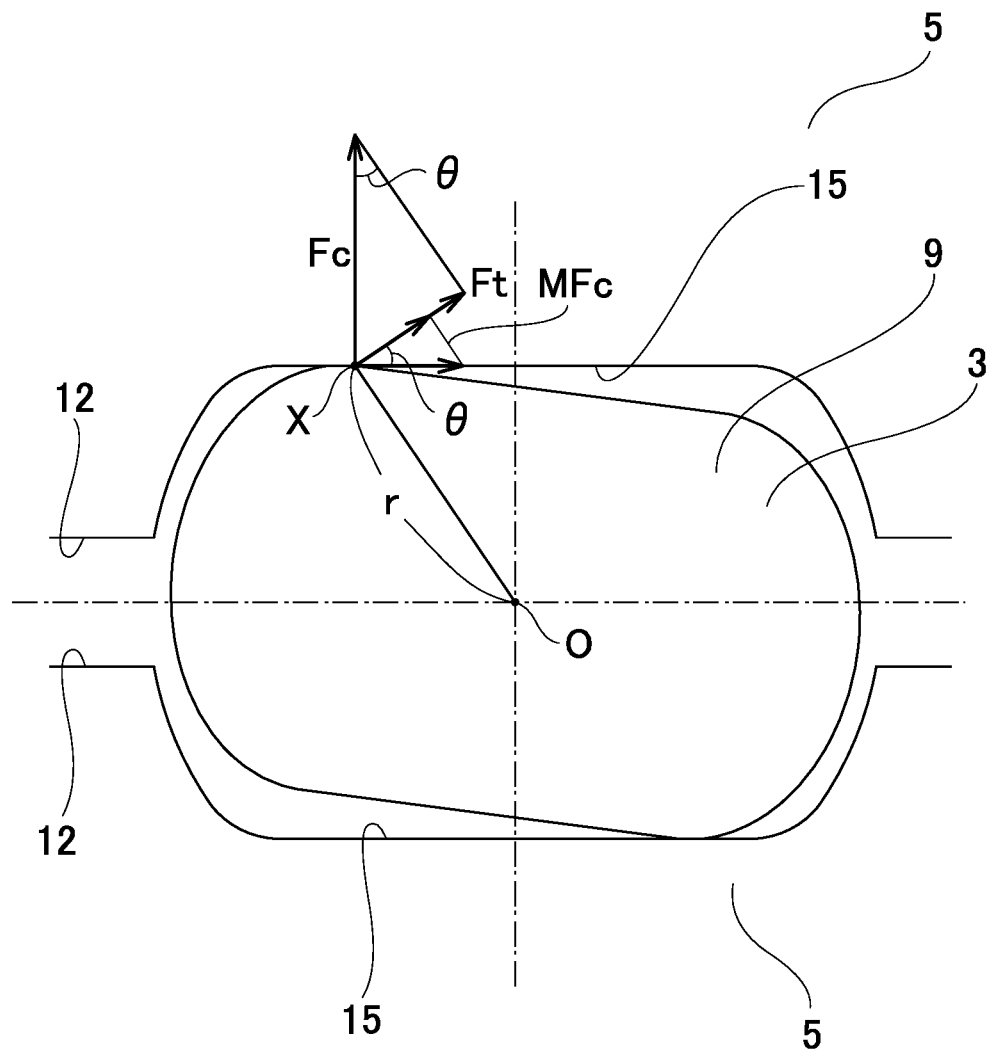
FIG. 7 is a partially enlarged view of FIG. 6 and illustrates a relationship of force that acts on an engaging element from the output member when the rotational torque is reversely inputted to the output member.

The principle and conditions for locking or semi-locking the output member 3 in a case where rotational torque is reversely inputted to the output member 3 as described above will be described more specifically with reference to FIG. 7 and FIG. 8. As illustrated in FIG. 7, when rotational torque is reversely inputted to the output member 3 and the corner of the output member side engaging portion 9 comes in contact with the bottom surface of the engaging element side output engaging portion 15, a normal force Fc acts in a perpendicular direction on the bottom surface of the engaging element side output engaging portion 15 at the contact portion X between the corner portion of the output member side engaging portion 9 and the bottom surface of the engaging element side output engaging portion 15. Moreover, when the friction coefficient between the output member side engaging portion 9 and the engaging element side output engaging portion 15 is taken to be $\mu$, a friction force μFc acts in a parallel direction at the contact portion X on the bottom surface of the engaging element side output engaging portion 15. Here, when the wedge angle between the direction of the line of a tangential force Ft acting at the contact portion X and the bottom surface of the engaging element side output engaging portion 15 is taken to be θ, the tangential force Ft is expressed by the following equation (1).

$$Ft = Fc \cdot \sin\theta + \mu Fc \cdot \cos\theta \qquad (1)$$

Accordingly, the normal force Fc is expressed by the following equation (2) using the tangential force Ft.

$$Fc = Ft/(\sin\theta + \mu \cdot \cos\theta) \qquad (2)$$

When the distance from the center of rotation O of the output member 3 to the contact portion X is taken to be r, the magnitude of the torque T transmitted from the output member 3 to the engaging element 5 when the corner of the output member side engaging portion 9 comes in contact with the bottom surface of the engaging element side output engaging portion 15 is expressed by the following equation (3).

$$T = r \cdot Ft \qquad (3)$$

Figure 8:
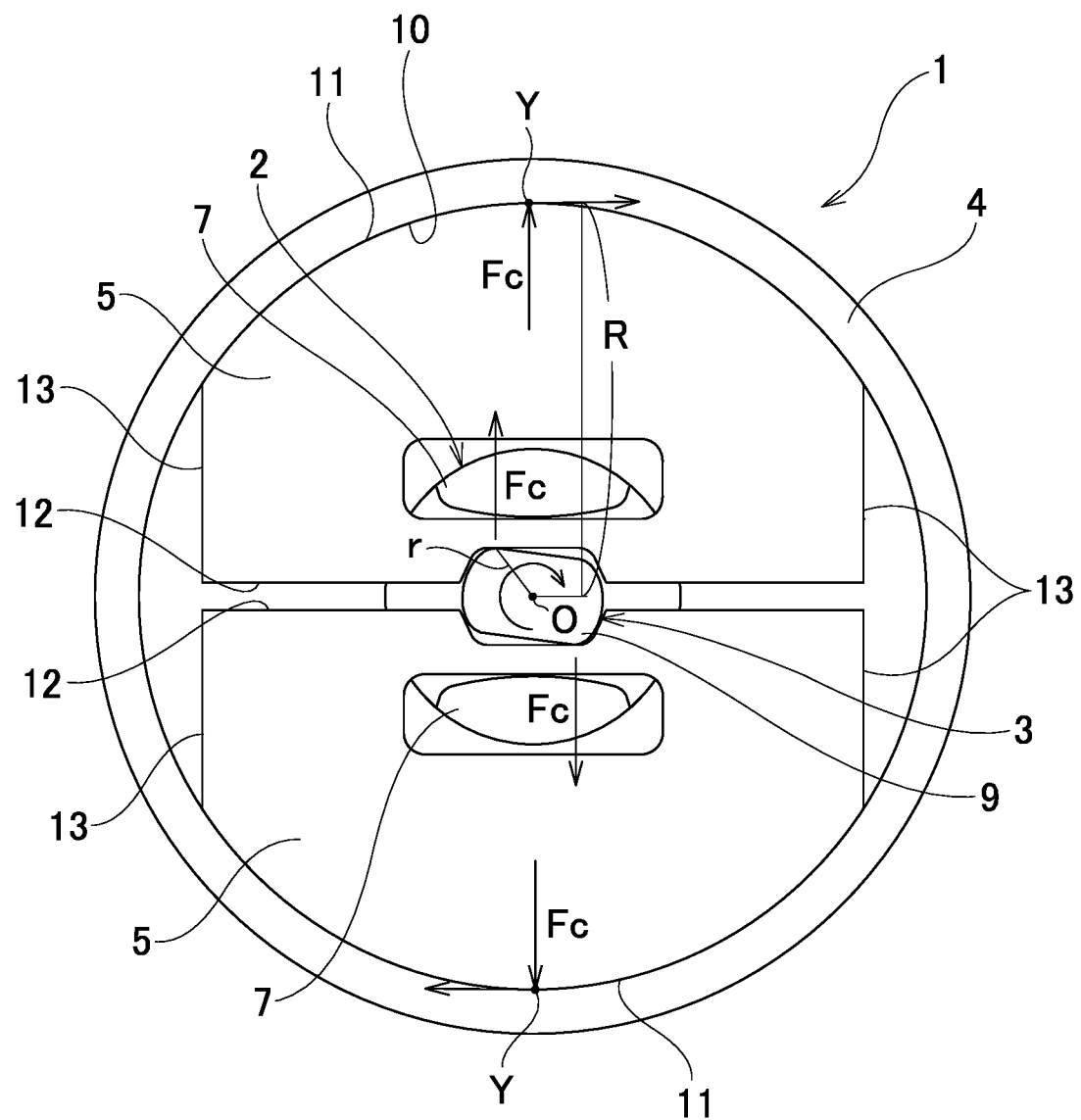
FIG. 8 is a diagram for describing a condition in which the output member is locked or semi-locked when rotational torque is reversely inputted to the output member.

As described above, a normal force Fc acts on the contact portion X, so the pressing surface 11 of the engaging element 5 is pressed by the force of the normal force Fc against the pressed surface 10 of the pressed member 4 as illustrated in FIG. 8. Accordingly, when the friction coefficient between the pressing surface 11 and the pressed surface 10 is taken to be and the distance from the center of rotation O of the output member 3 to the contact portion Y between the pressing surface 11 and the pressed surface 10 is taken to be R, the magnitude of the braking torque T' acting on the engaging element 5 is expressed by the following equation (4).

$$T' = \mu' R Fc \qquad (4)$$

Therefore, it can be understood that the friction coefficient μ', the distance R, and the normal force Fc may be increased in order to obtain a larger braking force.

In addition, in order to lock the output member 3 and prevent rotational torque that is reversely inputted to the output member 3 from being transmitted to the input member 2, the transmission torque T and the brake torque T' must satisfy the relationship of the following equation (5).

$$T < T' \qquad (5)$$

Moreover, when the above equations (1) to (4) are substituted into the above equation (5), the following equation (6) is obtained.

$$\mu' R/(\sin\theta + \mu \cdot \cos\theta) > r \qquad (6)$$

From the above equation (6), it can be seen that when the friction coefficient between the pressing surface 11 and the pressed surface 10 is increased, the output member 3 may be locked even when the distance R is decreased.

Furthermore, presuming that both the friction coefficient μ and the friction coefficient μ' are 0.1, the following equation (7) is obtained from the above equation (6).

$$R > 10r(\sin\theta + 0.1\cos\theta) \qquad (7)$$

From the above equation (7), it can be seen that the output member 3 may be locked by appropriately setting the distance r from the rotation center O of the output member 3 to the contact portion X, the distance R from the center of rotation O of the output member 3 to the contact portion Y, and the wedge angle θ between the direction of the line of action of the tangential force Ft and the bottom surface of the engaging element side output engaging portion 15.

On the other hand, in order to semi-lock the output member 3 so that only a part of the rotational torque reversely inputted to the output member 3 is transmitted to the input member 2 and the remaining portion is shut off, the transmission torque T and the braking torque T' must satisfy the relationship of the following equation (8).

$$T > T' \qquad (8)$$

In addition, as is clear from the above equation (6), the output member 3 may be semi-locked by appropriately setting the friction coefficient μ' between the output member side engaging portion 9 and the engaging element side output engaging portion 15, the friction coefficient between the pressing surface 11 and the pressed surface 10, the distance r from the rotation center O to the contact portion X, the distance R from the center of rotation O to the contact portion Y, and the wedge angle θ between the direction of the line of action of the tangential force Ft and the bottom surface of the engaging element side output engaging portion 15.

Moreover, in a case where the output member 3 is in the locked or semi-locked state and rotational torque is inputted to the input member 2, the locked or semi-locked state of the output member 3 is released when the normal force acting on the engaging element 5 from the input member 2 becomes larger than the normal force Fc acting on the engaging element 5 from the output member 3. In other words, the engaging element 5 moves inward in the radial direction, and rotational torque is transmitted from the input member 2 to the output member 3.

With the reverse input shutoff clutch 1 of this example having the above-described configuration and operating as described above, the dimension in the axial direction may be shortened and the number of parts may be reduced.

The reverse input shutoff clutch 1 of this example converts the rotation of the input member 2 and the output member 3 into movement of the engaging element 5 in the radial direction. Then, by converting the rotation of the input member 2 and the output member 3 into movement of the engaging element 5 in the radial direction in this way, the engaging element 5 is made to engage with the output member 3 located on the inner side of the engaging element 5 in the radial direction, or the engaging element 5 is pressed against the pressed member 4 located on the outer side of the engaging element 5 in the radial direction. As described above, in the reverse input shutoff clutch 1 of this example, due to the movement of the engaging element 5 in the radial direction that is controlled by the respective rotation of the input member 2 and the output member 3, it is possible to switch between a state in which the locked or semi-unlocked state of the output member 3 is released so that rotational torque may be transmitted from the input member 2 to the output member 3, and the locked or semi-locked state of the output member 3 so that the rotation of the output member 3 is prevented or suppressed, so the overall dimension of the reverse input shutoff clutch 1 in the axial direction may be shortened.

In addition, the engaging element 5 has both a function of transmitting rotational torque that is inputted to the input member 2 to the output member 3, and a function of locking or semi-locking the output member 3. Accordingly, the number of parts of the reverse input shutoff clutch 1 may be reduced, and the operation may be stabilized as compared with a case where the function of transmitting rotational torque and the function of locking or semi-locking are provided in different members. For example, in a case where a function of transmitting rotational torque and a function of locking or semi-locking are provided in separate members, there is a possibility that the timing for releasing the lock or semi-lock and the timing for starting transmission of rotational torque may be different. In this case, when rotational torque is reversely inputted to the output member after the locked or half-locked state is released and before transmission of the rotational torque is started, the output member will become locked or semi-locked again. In this example, the engaging element 5 is provided with both the function of transmitting rotational torque to the output member 3 and the function of locking or semi-locking the output member 3, so it is possible to prevent the occurrence of such a problem.

Moreover, the direction of the force acting on the engaging element 5 from the input member 2 and the direction of the force acting on the engaging element 5 from the output member 3 are opposite, so by restricting the magnitude relationship between the two forces, the movement direction of the engaging element 5 may be controlled. Therefore, the switching operation for switching the output member 3 between a locked or semi-locked state and a state in which the lock or semi-lock is released may be performed stably and reliably. Therefore, as in a reverse input shutoff clutch having a conventional structure as described in JP 2007-232095A and JP 2004-084918A, it is possible to prevent a problem of the locked state not being released because of a remaining rolling body biting into the narrow portion in the radial direction of the wedge-shaped space.

Second Example

Figure 10:
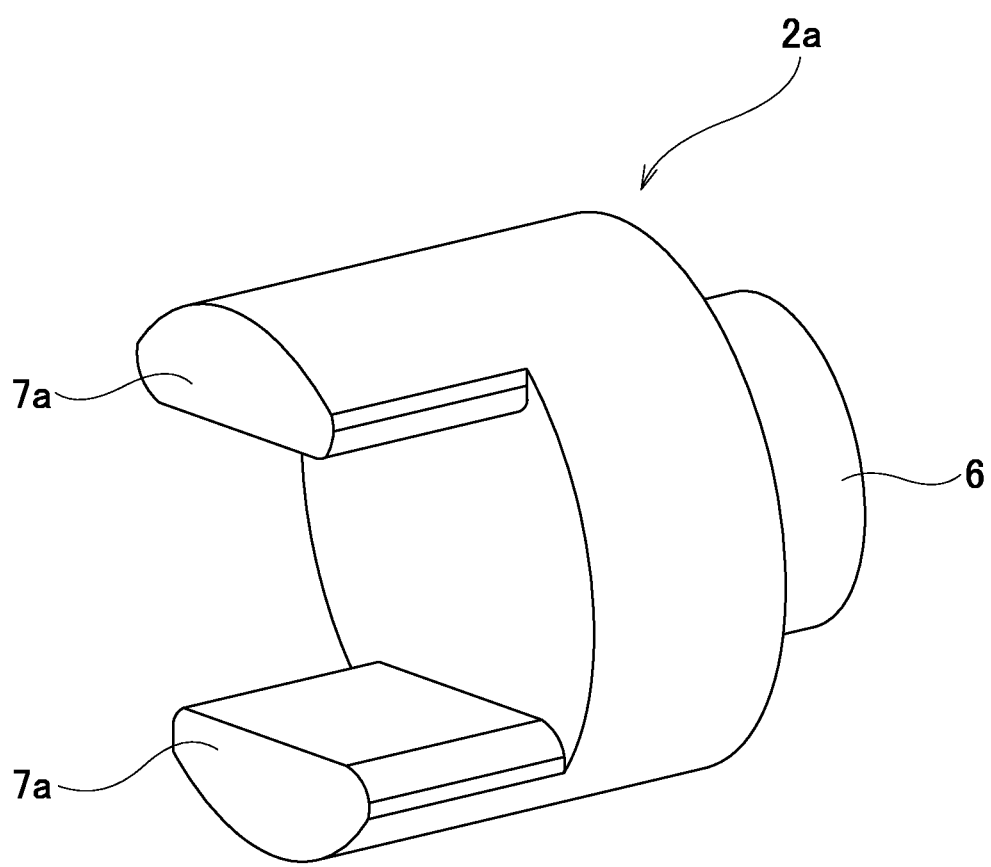
FIG. 10 is a perspective view illustrating a part of an input member that is removed from a reverse input shutoff clutch of a second example of an embodiment of the present invention.

A second example of an embodiment of the present invention will be described with reference to FIG. 10. In this example, each of a pair of input member side engaging portions 7a of an input member 2a has inner surface in the radial direction that is a flat surface parallel to that of the other of the pair. The configurations and operational effects of the other parts are the same as those of the first example.

Third Example

Figure 11:
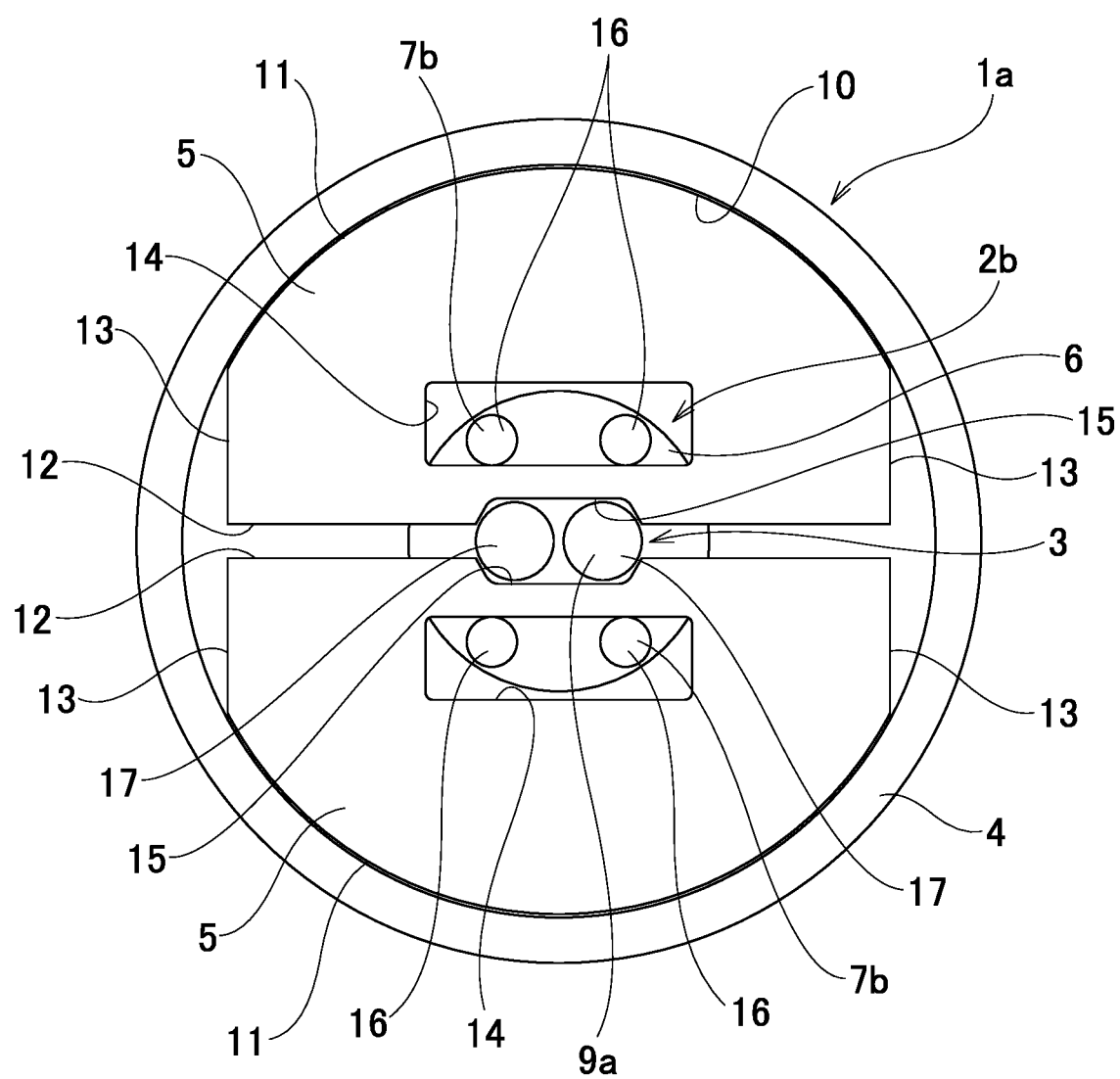
FIG. 11 is a diagram illustrating a reverse input shutoff clutch of a third example of an embodiment of the present invention.
Figure 12:
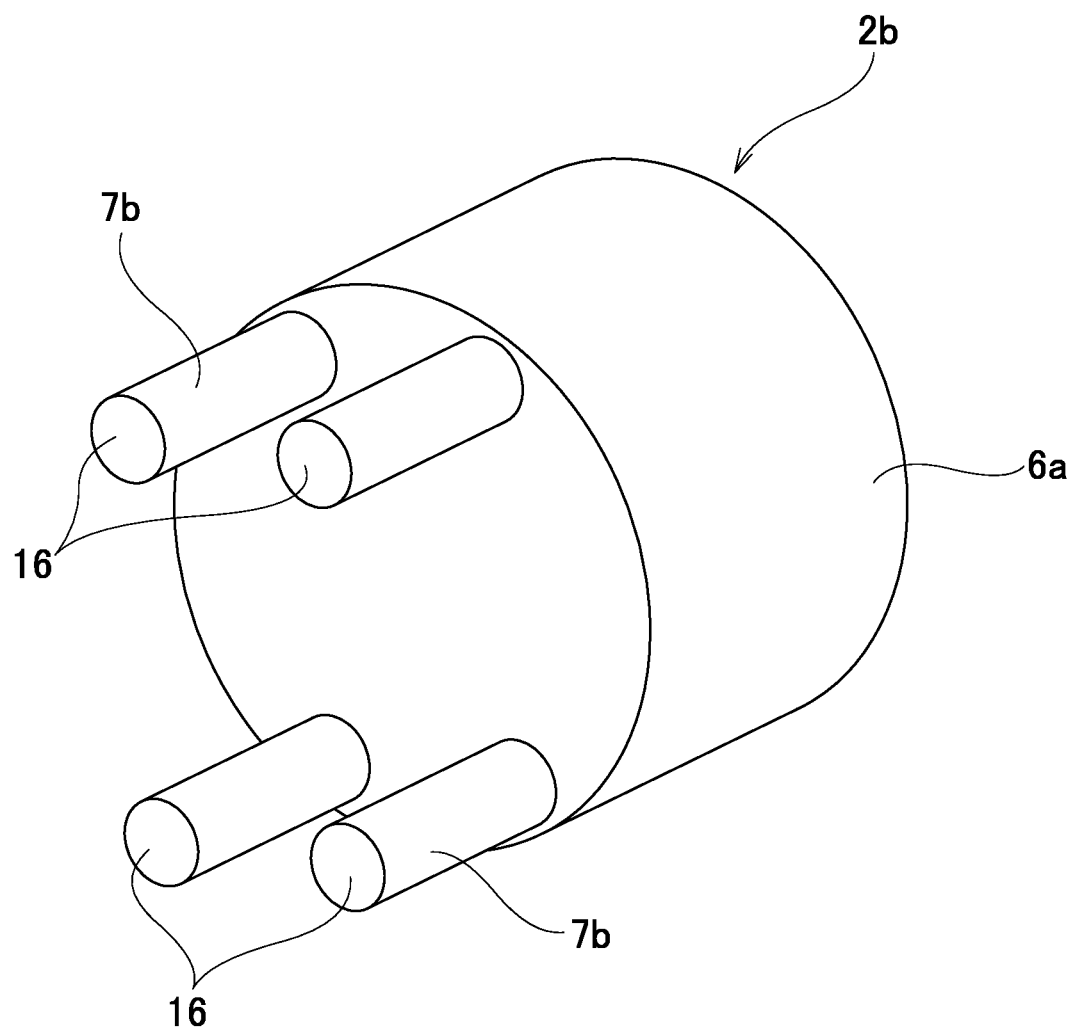
FIG. 12 is a perspective view illustrating a part of an input member that is removed from the reverse input shutoff clutch of the third example.
Figure 13:
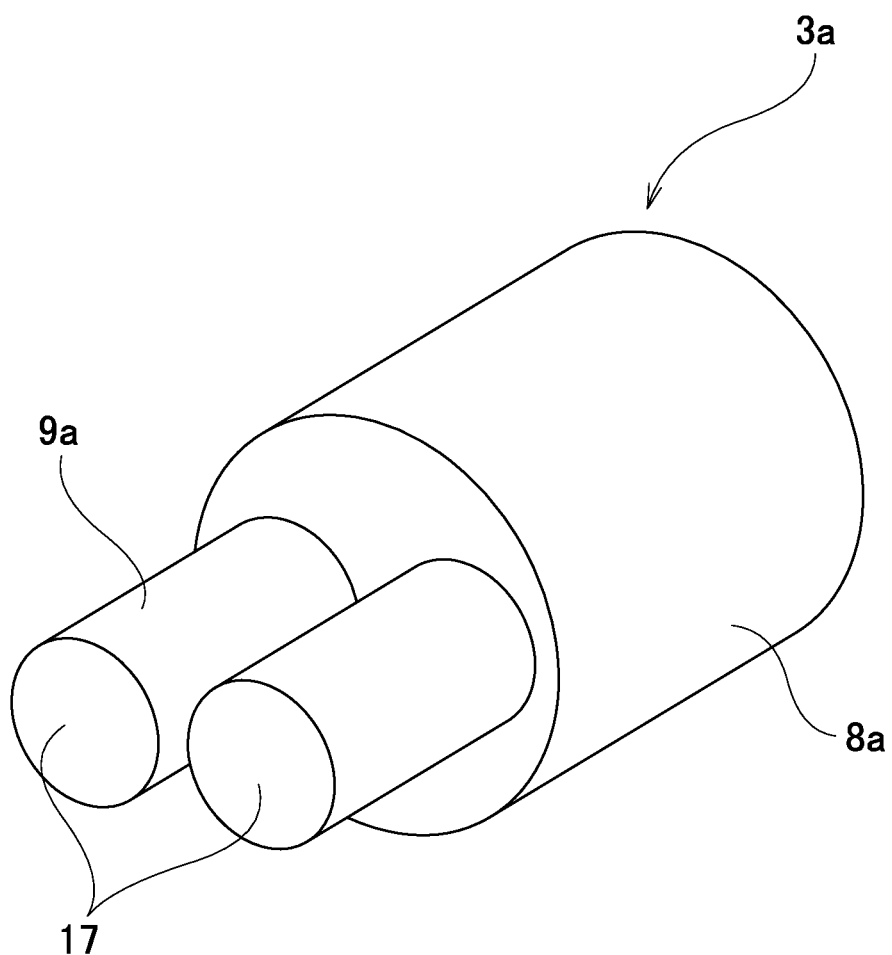
FIG. 13 is a perspective view illustrating a part of an output member that is removed from the reverse input shutoff clutch of the third example.

A third example of an embodiment of the present invention will be described with reference to FIG. 11 to FIG. 13. In the reverse input shutoff clutch 1a of this example, each of the pair of input member side engaging portions 7b of the input member 2b is constituted by a pair of pin portions 16. More specifically, the pair of input member side engaging portions 7b is arranged at two locations on opposite sides in the radial direction of the tip end surface of the input shaft portion 6a, and respectively configured by pin portions 16 that are arranged at two positions spaced apart from each other, and a pair of pin portions 16 adjacent to each other constitutes each of the pair of input member side engaging portions 7b. In other words, the pair of pin portions 16 of the input member side engaging portions 7b is loosely inserted inside the engaging element side input engaging portion 14 of the engaging element 5. Note that in this example, each pin portion 16 is configured by supporting and fixing a pin formed separately from the input shaft portion 6a into a circular hole formed in the tip end surface of the input shaft portion 6a by press fitting or the like.

In this example, the output member side engaging portion 9a of the output member 3a is constituted by a pair of pin portions 17. The pair of pin portions 17 are arranged on both sides of the tip end surface of the output shaft portion 8a with the center axis of rotation of the output member 3a interposed therebetween. Therefore, the distance from the center axis of rotation of the output member 3a to the outer peripheral surface of the output member side engaging portion 9a including the pair of pin portions 17 is not constant in the circumferential direction. Note that in this example, each pin portion 17 is configured by supporting and fixing a pin formed separately from the output shaft portion 8a into a circular hole formed in the tip end surface of the output shaft portion 8a by press fitting or the like.

In this example, by appropriately selecting the diameter of the pin constituting the pin portion 16 and the diameter of the pin constituting the pin portion 17 according to the shape precision of the engaging element 5, the looseness in the direction of rotation of the engaging element 5 with respect to the input member 2b and the looseness of the engaging element 5 with respect to the output member 3a may be adjusted to an appropriate magnitude. The configurations and operational effects of the other parts are the same as those of the first example.

Fourth Example

Figure 14:
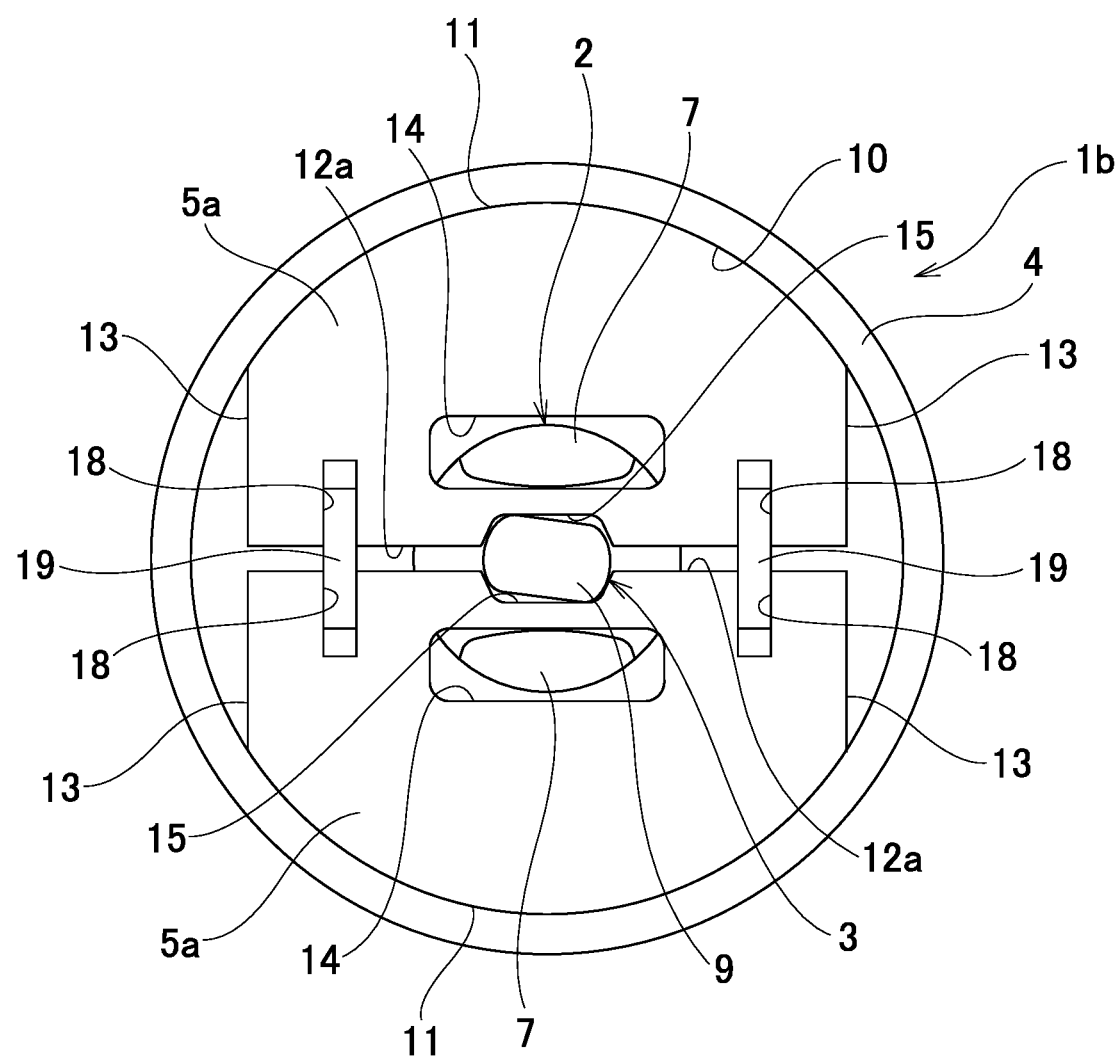
FIG. 14 is a diagram corresponding to FIG. 6 and illustrating a reverse input shutoff clutch of a fourth example of an embodiment of the present invention.

A fourth example of an embodiment of the present invention will be described with reference to FIG. 14. A feature of the reverse input shutoff clutch 1b of this example is that the posture of each of the pair of engaging elements 5a is stabilized, and the engaging elements 5a are accurately moved in the radial direction. In order for this, in this example, guide slits 18 that extend in the vertical direction from each bottom surface 12a are provided on both sides in the width direction sandwiching the engaging element side output engaging portion 15 of the bottom surfaces 12a of the engagement elements 5a. Then, in a state where the bottom surfaces 12a of the pair of engaging elements 5a are opposed to each other, a cylindrical or rectangular columnar guide 19 is arranged in a pair of guide slits 18 existing on the same straight line so as to span between the pair of guide slits 18. The guide 19 is arranged so as to be able to move in the axial direction of the guide 19 without looseness inside the guide slits 18.

With the configuration described above, the pair of engaging elements 5a may be moved in the radial direction and rotated in synchronization, however, are prevented from rotating relative to each other or moving in the width direction. Accordingly, the posture of each of the pair of engaging elements 5a may be stabilized. Moreover, the pair of engaging elements 5a may be moved in the radial direction accurately and smoothly. Therefore, the force acting on the engaging element 5a from the input member side engaging portion 7 or the output member side engaging portion 9 may be efficiently used for movement of the engaging element 5a in the radial direction, and the desired transmission torque and braking torque may be generated. The other configurations and operational effects are the same as those of the first example.

Fifth Example

Figure 15:
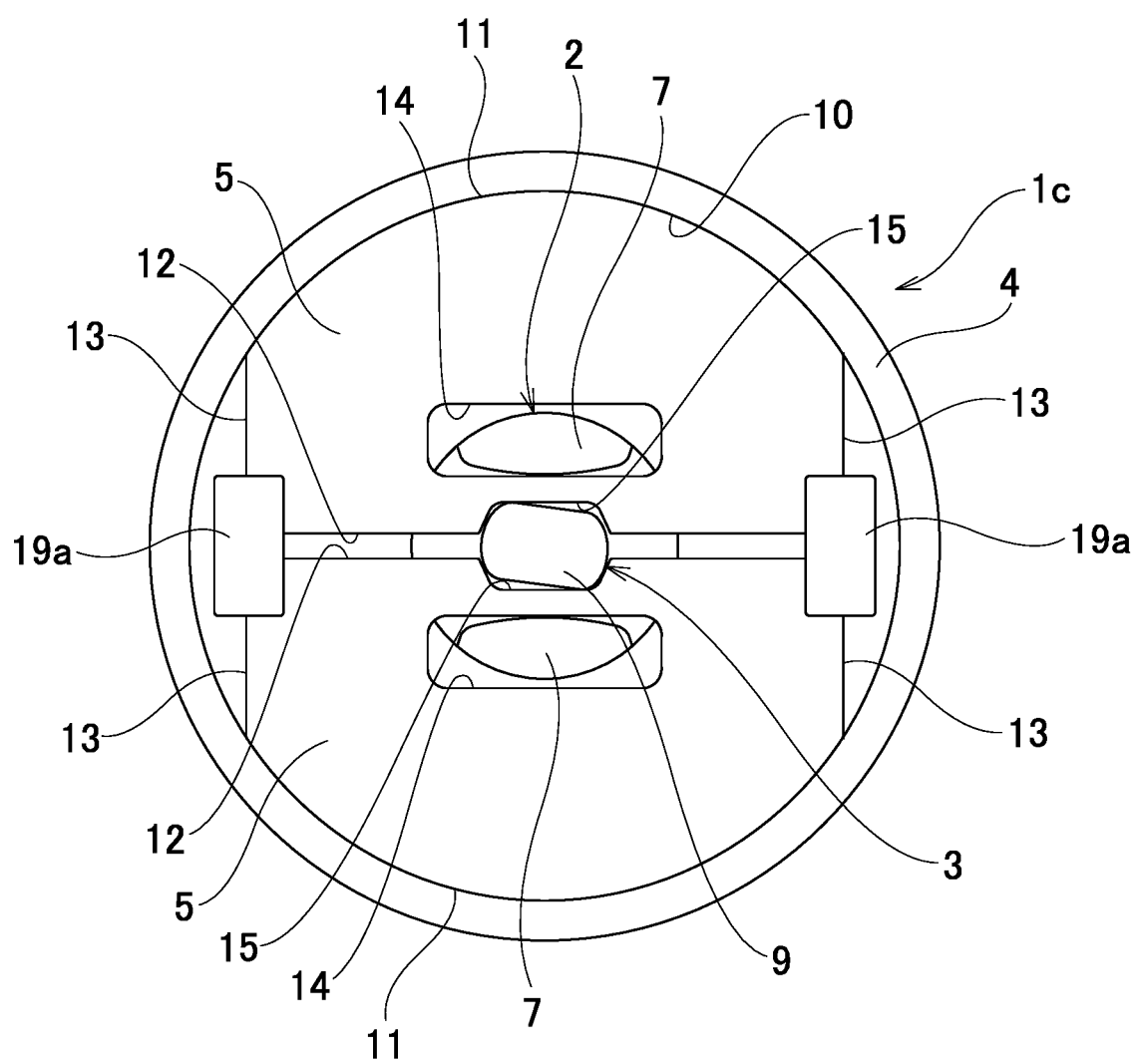
FIG. 15 is a view corresponding to FIG. 6 and illustrating a reverse input shutoff clutch of a fifth example of an embodiment of the present invention.
Figure 16:
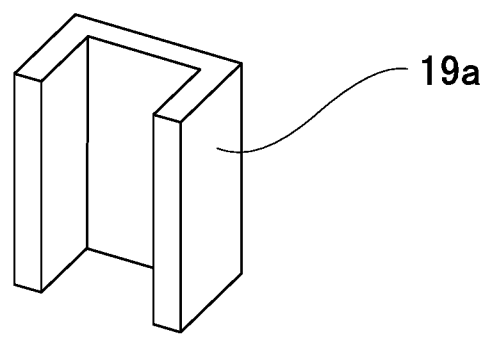
FIG. 16 is a perspective view illustrating a guide that is removed from the reverse input shutoff clutch of the fifth example.

A fifth example of an embodiment of the present invention will be described with reference to FIG. 15 and FIG. 16. Similar to the feature of the reverse input shutoff clutch 1b of the fourth example of an embodiment, a feature of the reverse input shutoff clutch 1c of this example is also to stabilize the respective postures of the pair of engaging elements 5, and precisely move the engaging elements 5 in the radial direction. In order for this, in this example, both sides in the width direction of the inner ends in the radial direction of the pair of engaging elements 5 are respectively guided by a guide 19a having a substantially U-shaped cross section. As a result, the pair of engaging elements 5 may be prevented from rotating relative to each other or moving in the width direction while being able to move in the radial direction and rotate in synchronization.

It is not necessary to form the guide slits 18 in the engaging elements 5a as in the reverse input shutoff clutch 1b of the fourth example of an embodiment, so in this example, the process for Raining the guide slits 18 may be omitted. Moreover, with the guide 19a of this example, it is possible to prevent the pair of engaging elements 5 from being inclined or relatively displaced in the axial direction of the pressed member 4. The other configurations and operational effects are the same as those of the first and fourth examples.

Sixth Example

Figure 17:
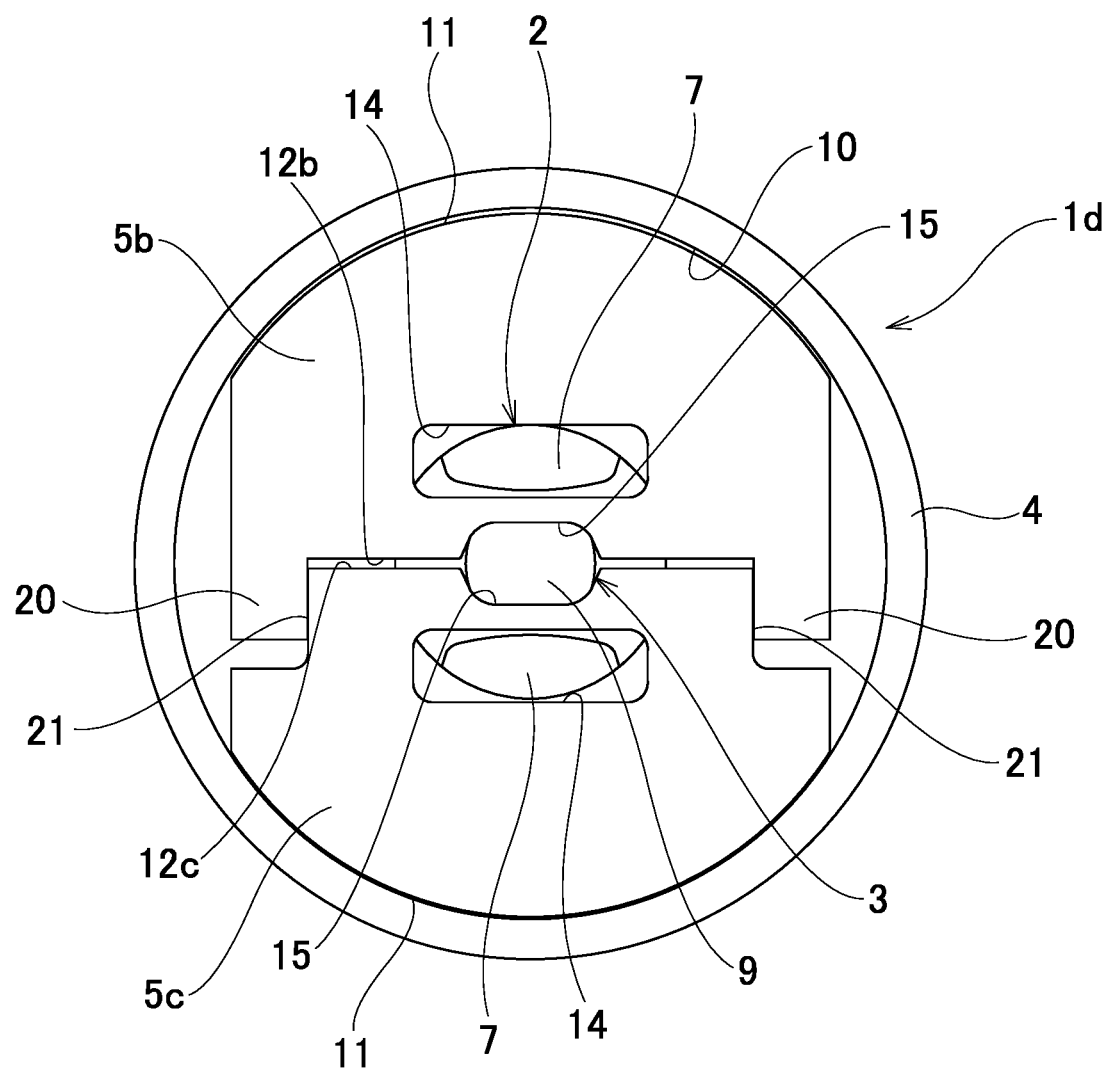
FIG. 17 is a diagram illustrating a reverse input shutoff clutch of a sixth example of an embodiment of the present invention.

A sixth example of an embodiment of the present invention will be described with reference to FIG. 17. Similar to the feature of the reverse input shutoff clutch 1b of the fourth example and the reverse input shutoff clutch 1c of the fifth example, a feature of the reverse input shutoff clutch 1d of this example is also to stabilize the respective postures of the pair of engaging elements 5b, 5c, and precisely move the engaging elements 5b, 5c in the radial direction. In order for this, in this example, a pair of overhang portions 20 are provided on both side portions of the bottom surface 12b in the width direction of one engaging element 5b (upper engaging element 5b in FIG. 17) and extend toward the other engaging element 5c (lower engaging element 5c in FIG. 17). On the other hand, notches 21 are provided on both side portions of the bottom surface 12c in the width direction of the other engaging element 5c. Accordingly, the width dimension of inner end portion in the radial direction of the other engaging element 5c is made smaller by the amount of the pair of notches 21. Then, in a state where the pair of engaging elements 5b, 5c is arranged on the inner side of the pressed member 4 in the radial direction, the inner end portion in the radial direction of the other engaging element 5c is arranged between the pair of overhang portions 20 with no looseness. In order for this, the width dimension between the inner side surfaces of the pair of overhang portions 20 is slightly larger than the width dimension of the inner end portion in the radial direction of the other engaging element 5c.

In the reverse input shutoff clutch 1d of the present example, there is no need to provide guides separate from the engaging elements as in the reverse input shutoff clutch 1b of the fourth example and the reverse input shutoff clutch 1c of the fifth example, so the cost may be reduced by reducing the number of parts, and forgetting to assemble the guides may be prevented. The other configurations and operational effects are the same as those of the first and fourth examples.

Seventh Example

Figure 18:
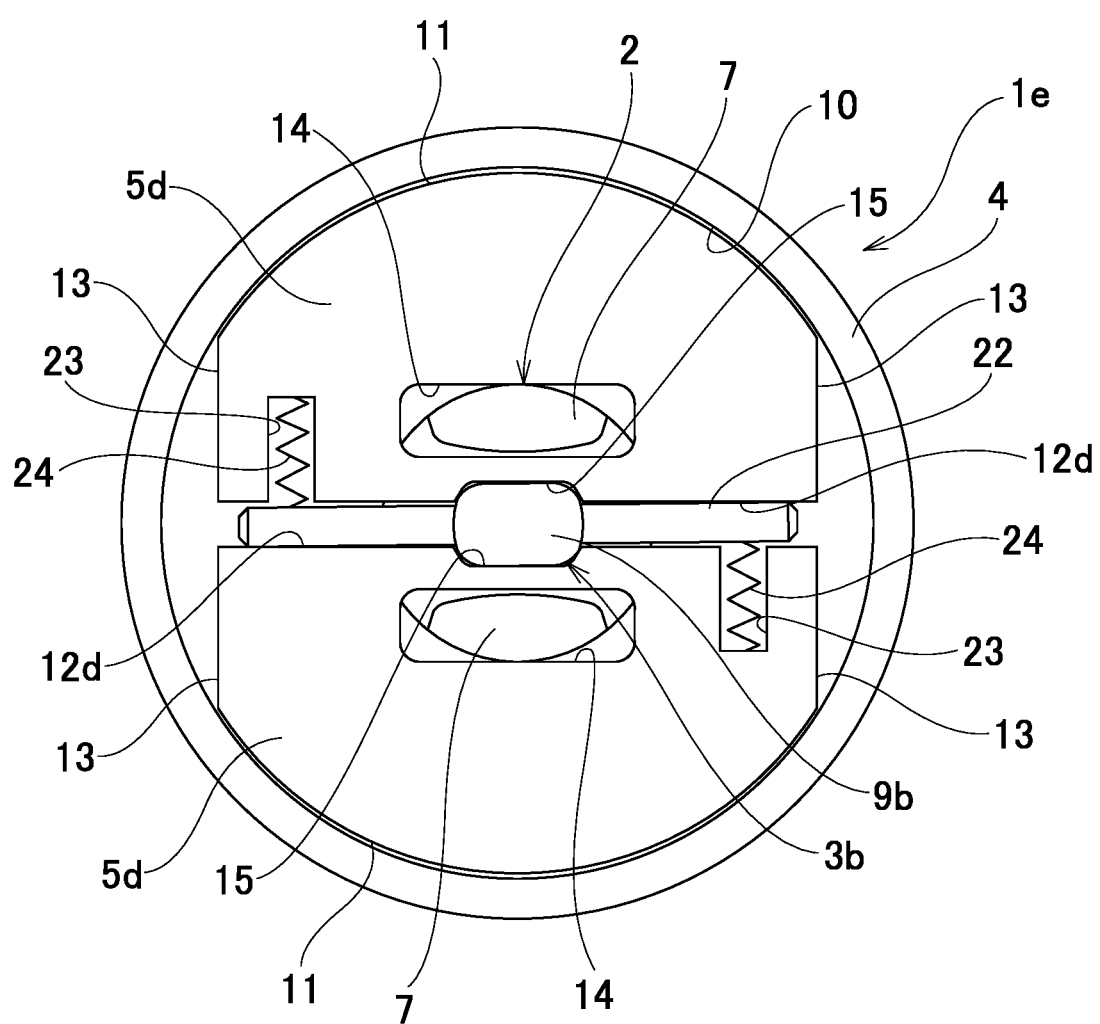
FIG. 18 is a diagram illustrating a reverse input shutoff clutch of a seventh example of an embodiment of the present invention.
Figure 19:
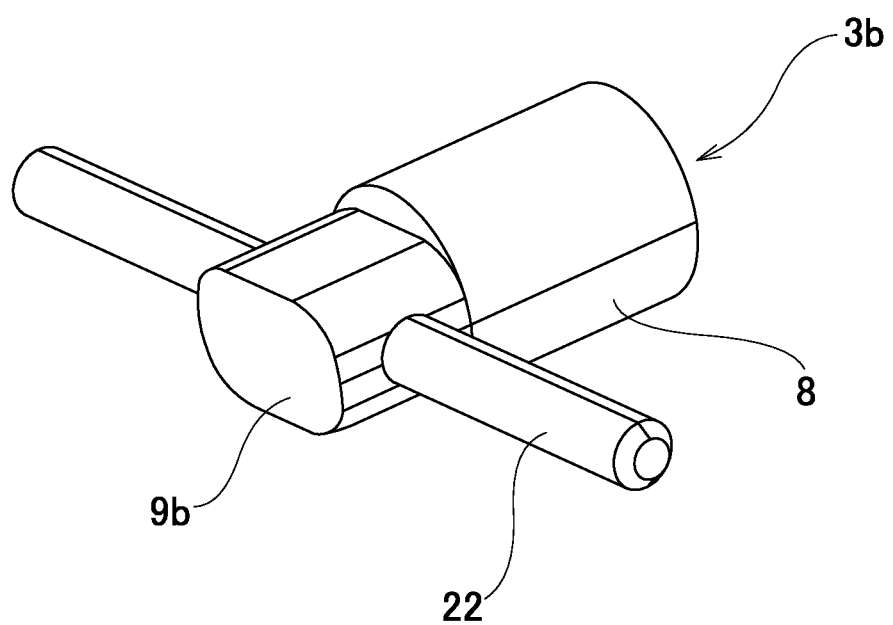
FIG. 19 is a perspective view illustrating a part of an output member that is removed from the reverse input shutoff clutch of the seventh example.

A seventh example of an embodiment of the present invention will be described with reference to FIG. 18 and FIG. 19. A feature of the reverse input shutoff clutch 1e of this example is preventing looseness of an output member 3b. In order for this, in the output member 3b of this example, as illustrated in FIG. 19, an auxiliary shaft portion 22 is provided so as to pass through an output member side engaging portion 9b in the major axis direction, and both side portions in the axial direction of the auxiliary shaft portion 22 are exposed to the outside of the output member side engaging portion 9b. As illustrated in FIG. 18, both side portions in the axial direction of the auxiliary shaft portion 22 are arranged between bottom surfaces 12d of a pair of engaging elements 5d.

In addition, concave housing portions 23 are provided in portions in the width direction of the bottom surfaces 12d of the engaging elements 5d so as to face the one side portion in the axial direction and the other side portion in the axial direction of the auxiliary shaft portion 22, and extend vertically from the bottom surfaces 12d. More specifically, a concave housing portion 23 is provided on the upper engaging element 5c in FIG. 18 in a portion of the bottom surface 12d that is farther on the left side than the engaging element side output engaging portion 15, and a concave housing portion 23 is provided on the lower engaging element 5c in FIG. 18 in a portion of the bottom surface 12d that is farther on the right side than the engaging element side output engaging portion 15. An elastic member 24 is arranged inside each concave housing portion 23, and these elastic members 24 are elastically compressed between the bottom portions of the concave housing portions 23 and the one side in the axial direction and the other side in the axial direction of the auxiliary shaft portion 22. Accordingly, a moment in a specified direction (counterclockwise in the example in FIG. 18) is applied to the output member 3b via the auxiliary shaft portion 22. Moreover, the one side in the axial direction and the other side in the axial direction of the auxiliary shaft portion 22 are pressed against the bottom surfaces 12d of the engaging elements 5d.

In this example, a moment may be applied to the output member 3b, so even in a state where no load is applied to the output member 3b, it is possible to prevent the output member 3b from being loose with respect to the engaging elements 5d. The other configurations and operational effects are the same as those of the first example.

Eighth Example

As described in the first example, when rotational torque is reversely inputted to the output member 3 in the reverse input shutoff clutch 1, in order to lock the output member 3, the torque T transmitted from the output member 3 to the engaging elements 5 and the braking torque T' acting on the engaging elements 5 pressed against the pressed member 4 must satisfy the relationship of T<T'. In addition, when taking the friction coefficient between the pressing surfaces 11 and the pressed surface 10 to be $\mu'$, taking the distance from the center of rotation O of the output member 3 to the contact portion between the pressing surfaces 11 and the pressed surface 10 to be R, and taking the normal force that is the pressing force of the pressing surfaces 11 against the pressed surface 10 to be Fc, the magnitude of the braking torque T' acting on the engaging elements 5 when rotational torque is reversely inputted to the output member 3, is represented by $T'=\mu'RFc$.

Incidentally, for example, in consideration of a case where the reverse input shutoff clutch 1 is applied to an automobile, in recent years in the automobile technical field, vehicle weight is being reduced for the purpose of improving fuel efficiency, and at the same time, there is also a need to reduce the weight of vehicle components. For this reason, in a reverse input shutoff clutch 1 as well, preferably the distance R from the center of rotation O of the output member 3 to the contact portion between the pressing surfaces 11 and the pressed surface 10 that has an influence on the size of the reverse input shutoff clutch 1 is reduced. However, when the distance R is reduced, the braking torque T' is also reduced, so it is difficult to ensure a sufficient shutoff rate for rotational torque reversely inputted to the output member 3.

Therefore, in order to increase the braking torque T', it is conceivable to increase the friction coefficient μ' or the normal force Fc. In order to increase the friction coefficient μ', for example, it is possible to make the pressing surfaces 11 a friction surface material by attaching a friction material to the outer side surface in the radial direction of the engaging elements 5, or it is possible to reduce the amount of lubrication oil supplied to the pressing surfaces 11. However, in a case where a friction material is attached, there is a problem in that the cost is increased, and when the amount of lubricating oil to be supplied is reduced, there is a durability problem in that wear of the pressing surfaces is likely to proceed. On the other hand, in order to increase the normal force Fc, it is necessary to increase the transmission torque T, and thus in order to ensure a sufficient shutoff rate of the rotational torque reversely inputted to the output member 3, an even larger braking torque T' is necessary, and it is difficult to reduce the distance R.

Figure 20:
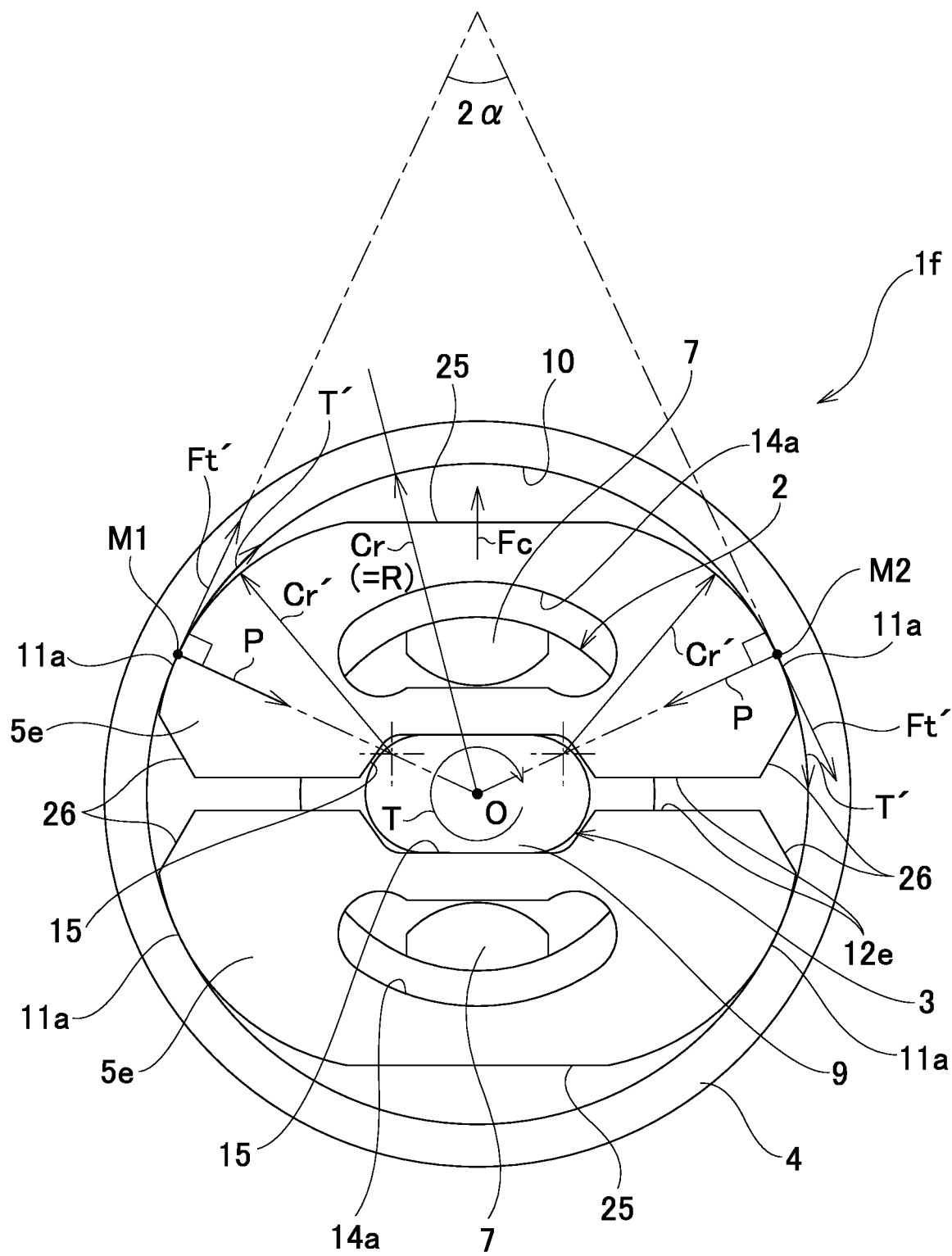
FIG. 20 is a diagram illustrating a reverse input shutoff clutch of an eighth example of an embodiment of the present invention.

Therefore, in the reverse input shutoff clutch 1f of an eighth example of an embodiment of the present invention, as illustrated in FIG. 20, the shape of the outer surfaces in the radial direction of the pair of engaging elements 5e is devised, and a wedge effect is used to obtain a larger normal force (braking torque).

In this example, pressing surfaces 11a that press against the pressed surface 10 are provided at two positions spaced apart in the circumferential direction on the outer side surface in the radial direction of each engaging element 5e. Each pressing surface 11a is a cylindrical convex surface having a radius of curvature Cr' that is smaller than the radius of curvature Cr of the pressed surface 10. Between the pair of pressing surfaces 11a positioned in an intermediate portion in the circumferential direction of the outer side surface in the radial direction of the engaging element 5e, a flat surface-shaped tip end surface 25 is provided so as not to be pressed against the pressed surface 10 (a gap is always present between the tip end surface 25 and the pressed surfaces 10). In order for this, the width dimension in the radial direction of the engaging element 5e is smaller than that of the engaging element 5 of the first example. Moreover, the contour shape of the outer side surface in the radial direction of the engaging element 5 of the first example is generally arc shaped, whereas the contour shape of the outer side surface in the radial direction of the engaging element 5e of the present example is configured by connecting the end portions of a pair of arc portions with straight line portions.

In addition, an engaging element side input engaging portion 14a that is a substantially arc-shaped long hole is provided in an intermediate portion in the radial direction of each engaging element 5e. Then, inside the engaging element side input engaging portion 14a, the input member side engaging portions 7 of the input member 2 may be moved toward or away from the pressed surface 10 and be loosely engaged so as to be able to move in the direction of rotation of the input member 2. Moreover, both side surfaces in the width direction of the engaging elements 5e are made into inclined surfaces 26 such that the angle formed with the bottom surface 12e is an obtuse angle.

In the reverse input shutoff clutch 1f of this example having the above-described configuration, when rotational torque is reversely inputted to the output member 3 and a normal force Fc acts on the engaging elements 5e from the output member side engaging portion 9, the pair of pressing surfaces 11a provided on the outer surfaces in the radial direction of the engaging elements 5 are pressed against the pressed surface 10. Here, the radius of curvature Cr' of the pressing surfaces 11a is smaller than the radius of curvature Cr of the pressed surface 10, and each pressing surface 11a and the pressed surface 10 are in line contact or point contact at one point. Therefore, each engaging element 5e, having the two pressing surfaces 11a, and the pressed member 4 come in contact at a total of two contact points.

At this time, the center of curvature of each pressing surface 11a exists on a virtual line connecting the center O of the pressed member 4 (=center of rotation of the input member 2 and the output member 3) with each of the contact portions M1, M2 between the pressing surface 11a and the pressed surface 10. Further, when the wedge angle between the tangents at the contact portions M1,M2 is taken to be $2\alpha$, and the friction coefficient between the pressing surface 11a and the pressed surface 10 is taken to be μ', the normal force P acting on the contact portions M1, M2 is expressed by the following equation (9).

$$P = Fc/2(\sin\alpha + \mu'\cdot\cos\alpha) \quad (9)$$

In addition, the tangential force Ft' acting on the contact portions M1, M2 that generates the braking force on the engaging element 5e is expressed by the following equation (10).

$$Ft' = \mu''P \quad (10)$$

Moreover, when the distance from the center of rotation O of the output member 3 to the contact portions M1, M2 between the pressing surface 11a and the pressed surface 10 is taken to be R, the magnitude of the braking torque T' acting on the engaging element 5e is expressed by the following equation (11).

$$T' = 2Ft'R \quad (11)$$

From the equations (9), (10), and (11) described above, the magnitude of the braking torque T' is expressed by the following equation (12) using the friction coefficient μ', the distance R (clutch size), the normal force Fc, and the wedge angle α.

$$T' = \mu'RFc/(\sin\alpha + \mu'\cdot\cos\alpha) \quad (12)$$

Here, in the structure of the first example, the magnitude of the braking torque T' is T'=μ'RFc as in equation (4).

Therefore, it can be seen that in the case of the reverse input shutoff clutch 1f of this example, as in the case of the reverse input shutoff clutch 1 of the first example, in order to obtain a larger braking torque T', the friction coefficient μ', the distance R, and the normal force Fc may be increased. Moreover, by utilizing the wedge effect that is a feature of this example in order to increase the braking torque T', the wedge angle α should be made as small as possible.

For example, it will be presumed that the friction coefficient is 0.1, the distance R is 15 mm, the wedge angle α is 25 degrees, and the normal force Fc is 1000 N. In this case, the braking torque T' obtained by the reverse input shutoff clutch 1 of the first example is 1.5 Nm, whereas the braking torque T' obtained by the reverse input shutoff clutch 1f of the present example becomes 2.9 Nm. As described above, in the reverse input shutoff clutch 1f of the present example, by using the wedge effect, a braking torque T' that is approximately twice as large compared to that of the reverse input shutoff clutch 1 of the first example may be obtained. In other words, in the case of the reverse input shutoff clutch 1*f* of the present example, a braking torque T' having a magnitude that is the same as that in the case of the reverse input shutoff clutch 1 of the first example, may be obtained even when the distance R is halved.

As described above, in the reverse input shutoff clutch 1*f* of the present example, a larger braking torque T' may be obtained compared to that of the reverse input shutoff clutch 1 of the first example even in the case of using an equivalent friction coefficient an equivalent distance R, and an equivalent transmission torque T. Therefore, in order to obtain the required rotational torque shutoff rate, the distance R may be easily reduced even without increasing the friction coefficient and the normal force Fc. Such an effect is acquired by just devising the shape of the outer side surface in the radial direction of the engaging element 5*c*, so an increase in cost may also be suppressed. The other configurations and operational effects are the same as those of the first example.

Ninth Example

Figure 21:
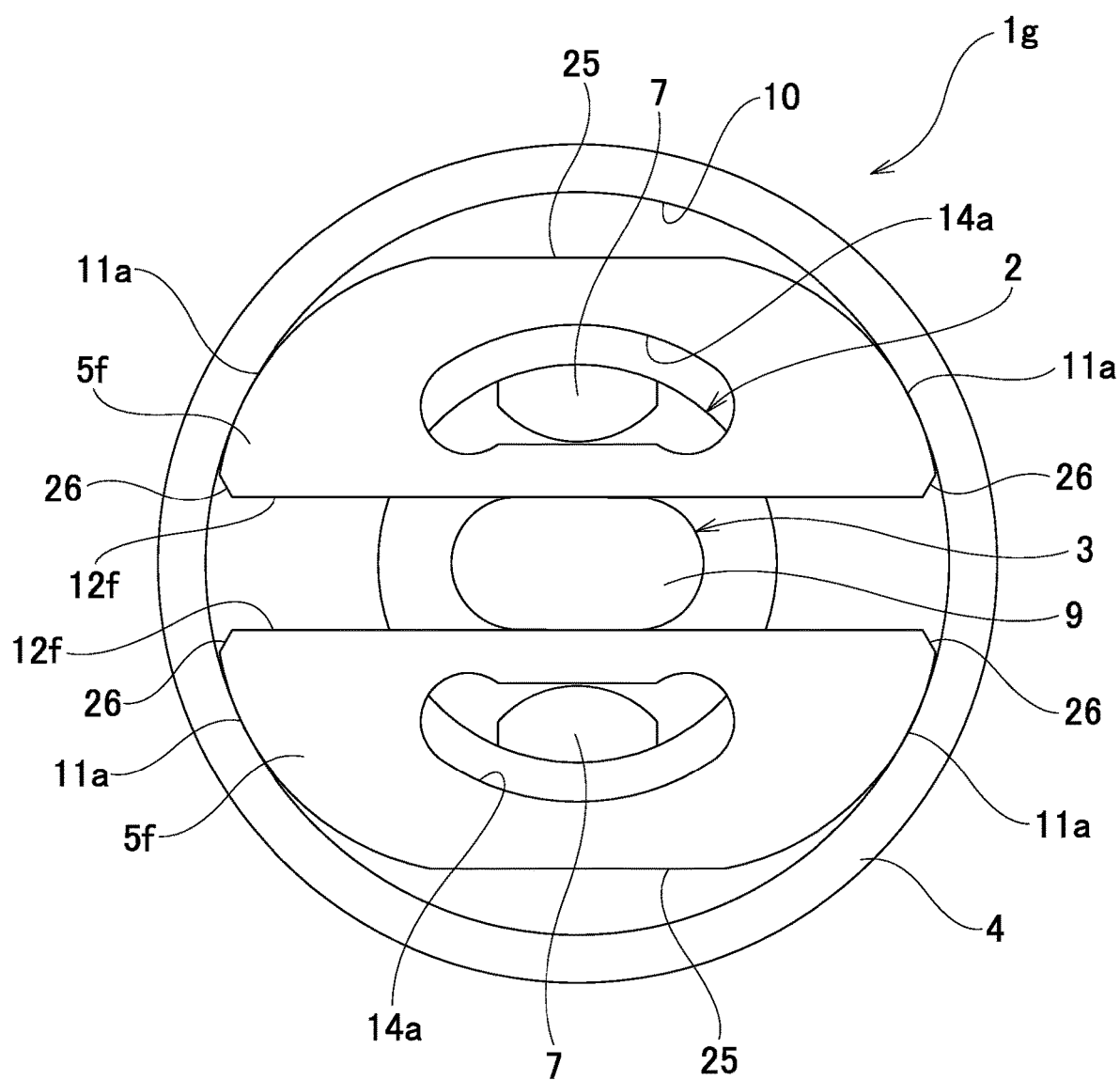
FIG. 21 is a diagram illustrating a reverse input shutoff clutch of an ninth example of an embodiment of the present invention.

A ninth example of an embodiment will be described with reference to FIG. 21. In the reverse input shutoff clutch 1*g* of this example, the shape of a bottom surface 12*f*, which is the inner side surface in the radial direction of an engaging element 5*f* is devised. In other words, the entire inner side surface in the radial direction of the engaging element 5*f* is a flat bottom surface 12*f*, and an engaging element side output engaging portion 15*a* is constituted by the center portion in the width direction of the bottom surface 12*f* That is, at the center in the width direction of the bottom surface 12*f* of the engagement element 5*f* of the present example, the engaging element side output engaging portion 15 (refer to FIG. 1 and the like) that is recessed outward in the radial direction from the bottom surface 12 is not provided as in the engaging element 5 of the first example.

Of the bottom surface 12*f* of the engaging element 5*f*, at least the part constituting the engaging element side output engaging portion 15*a* is a portion in contact with the output member side engaging portion 9 of the output member 3, so it is necessary to perform high-precision finishing. However, in the reverse input shutoff clutch 1*f* of the present example, the entire bottom surface 12*f*, including the engaging element side output engaging portion 15*a*, is formed into a flat surface shape, and since the engaging element side output engaging portion 15 is not provided so as to be recessed outward in the radial direction from the bottom surface 12 as in the first example, it is possible to perform high-precision finishing at low cost by using machine tools such as a surface grinder or the like. The other configurations and operational effects are the same as those of the first example.

Tenth Example

Figure 22:
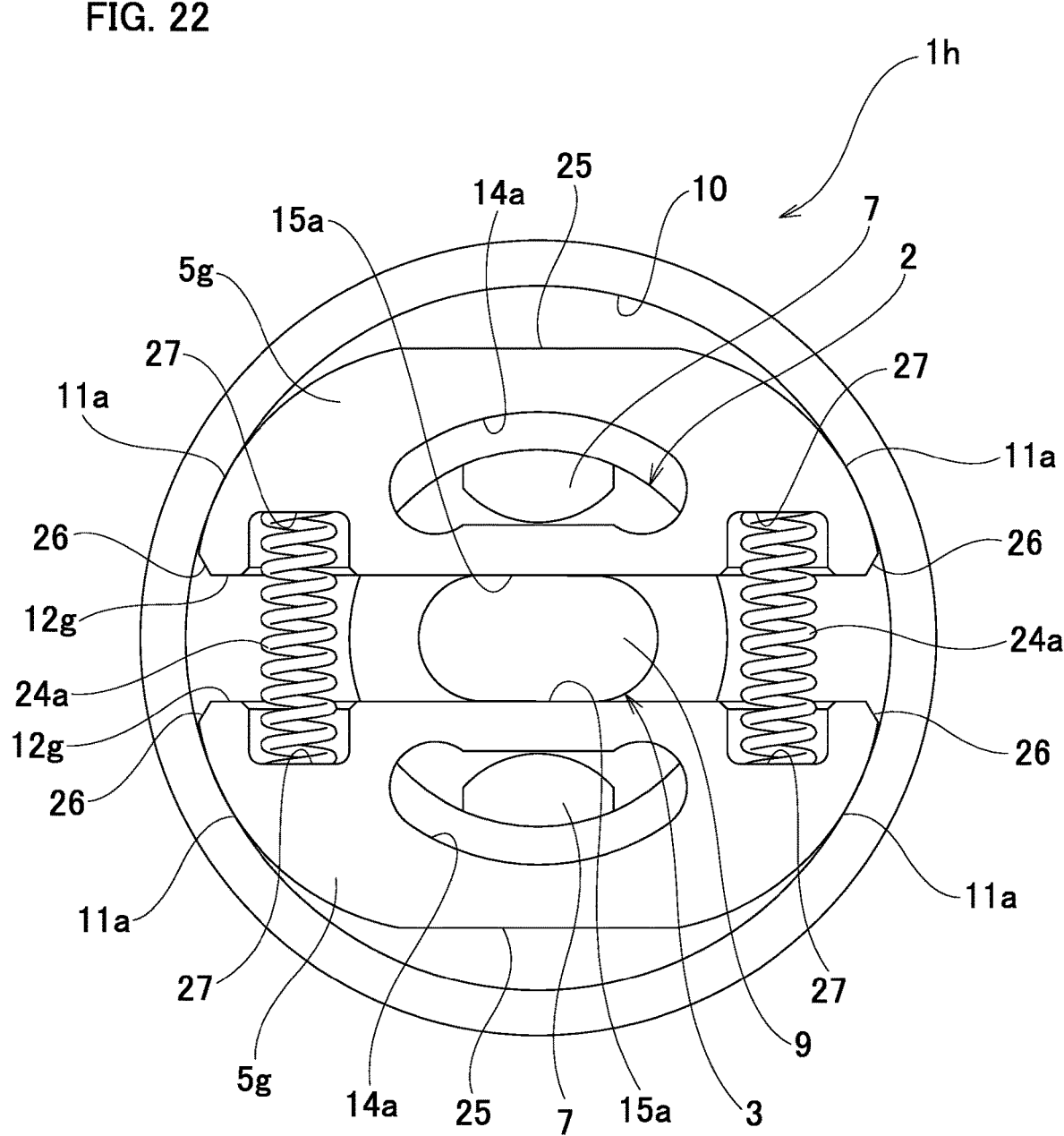
FIG. 22 is a diagram illustrating a reverse input shutoff clutch of a tenth example of an embodiment of the present invention.
Figure 23:
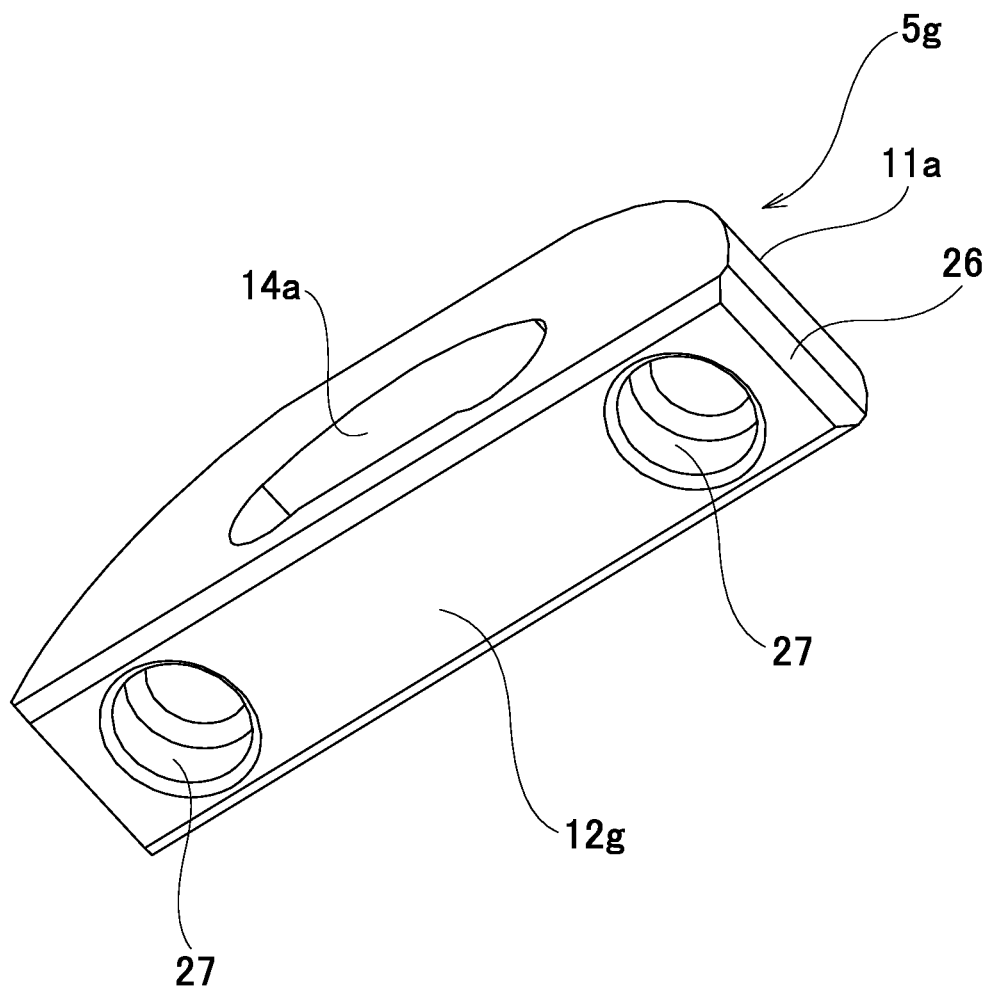
FIG. 23 is a perspective view illustrating only one engaging element that is removed from the reverse input shutoff clutch of the tenth example.

A tenth example of an embodiment of the present invention will be described with reference to FIG. 22 and FIG. 23. A feature of the reverse input shutoff clutch 1*h* of this example is that the posture of each of the pair of engaging elements 5*g* is stabilized, and the engaging elements 5*g* are accurately moved in the radial direction. In order for this, cylindrical concave guide portions 27 that are recessed in the direction perpendicular to the bottom surface 12*g* are provided on both side portions in the width direction of the bottom surface 12*g* of the engaging element 5*g*. Then, in a state where the bottom surfaces 12*g* of the pair of engaging elements 5*g* are opposed to each other, an elastic member 24*a*, which is a coiled spring, is arranged inside each of the pairs of concave guide portions 27 existing on the same straight line so as to span between each of the pairs of concave guide portions 27. The pair of engaging elements 5*g* is pressed toward the pressed surface 10 by using the elastic force exerted by the pair of elastic members 24*a*. Note that the magnitude of the elastic force (magnitude of the spring load) exerted by the elastic members 24*a* is set larger than the weight of each of the engaging elements 5*g* in order to prevent an engaging element 5*g* from moving downward due to the influence of gravity.

In this example such as described above, the movement in the radial direction of the pair of engaging elements 5*g* may be accurately performed by synchronizing and stabilizing the postures of the pair of engaging elements 5*g*. Moreover, while the configuration is simple such that a pair of elastic members 24*a* is provided so as to span the pairs of engaging elements 5*g*, it is possible to effectively prevent an engaging element 5*g* from moving downward due to the influence of gravity and prevent the postures from becoming unstable. The other configurations and operational effects are the same as those of the first example and ninth example.

Eleventh Example

Figure 24:
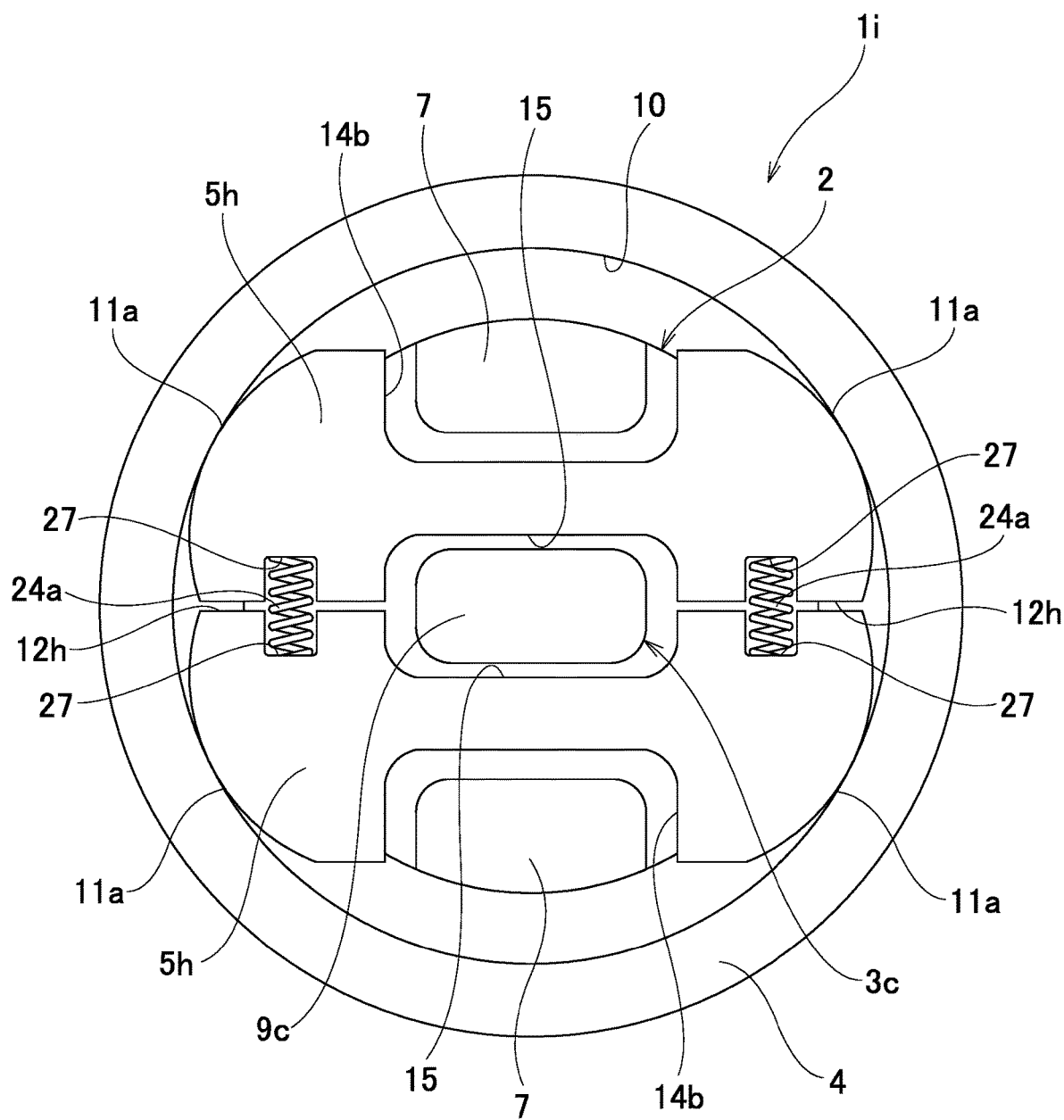
FIG. 24 is a diagram illustrating a reverse input shutoff clutch of an eleventh example of an embodiment of the present invention.
Figure 25:
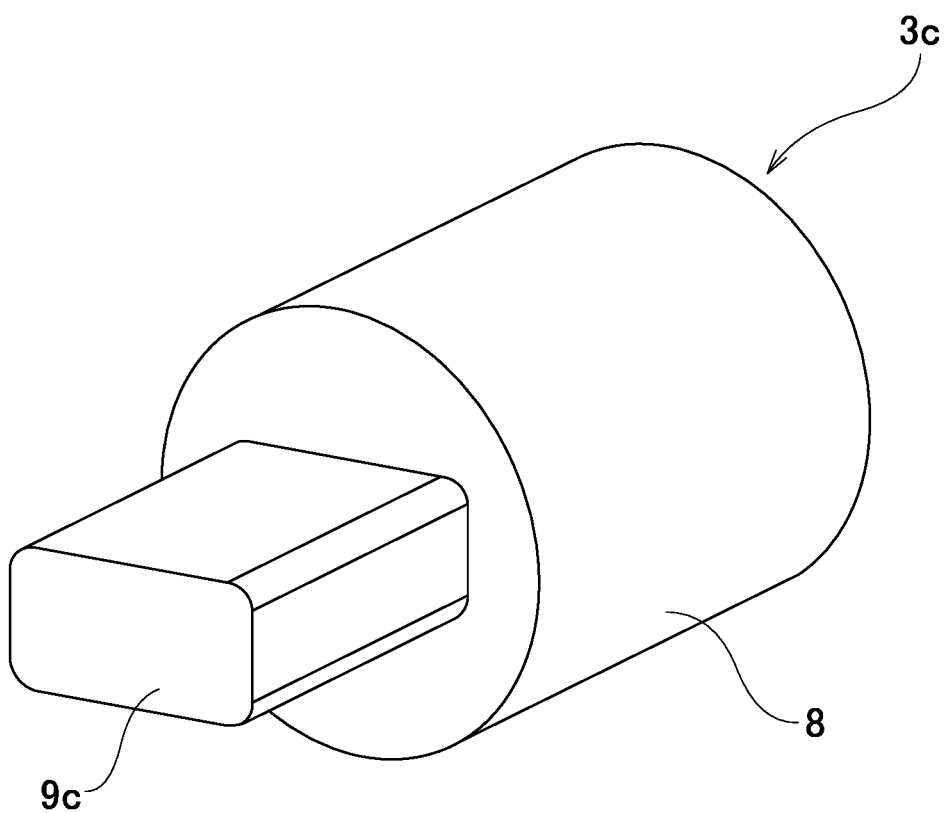
FIG. 25 is a perspective view illustrating a part of an output member that is removed from the reverse input shutoff clutch of the eleventh example.

An eleventh example of an embodiment of the present invention will be described with reference to FIG. 24 and FIG. 25.

In the reverse input shutoff clutch 1*i* of this example, each of the pair of engaging elements 5*h* includes an engaging element side input engaging portion 14*b* that is a concave portion recessed inward in the radial direction at the center in the circumferential direction of the outer side surface in the radial direction. In this example, the input member side engaging portions 7 of the input member 2*a* are loosely engaged inside the engaging element side input engaging portions 14*b*. In other words, each of the pair of engaging elements 5*h* has a portion that is arranged on the inner side in the radial direction of the input member side engaging portion 7, and portions that are arranged on both sides in the circumferential direction of the input member side engaging portion 7, however, does not have a portion arranged on the outer side in the radial direction of the input member side engaging part 7. Accordingly, the reverse input shutoff clutch 1*i* may be reduced in weight.

Note that in this example, the output member side engaging portion 9*c* of the output member 3*c* has a substantially rectangular column shape. More specifically, the outer peripheral surface of the output member side engaging portion 9*c* includes a pair of first flat surfaces parallel to each other in the long-side direction, a pair of second flat surfaces parallel to each other in the short-side direction, and partial cylindrical surfaces connecting the first flat surfaces and the second flat surfaces. The other configurations and operational effects are the same as those of the first example, eighth example, and ninth example.

Twelfth Example

A twelfth example of an embodiment of the present invention will be described with reference to FIG. 26A to FIG. 26D. In this example, four examples of cross-sectional shapes that may be employed respectively for the pressed surface 10 provided on the inner peripheral surface of the pressed member 4 and the pressing surface 11 provided on the outer side surface of the engaging element 5 in the radial direction will be described.

Figure 26:
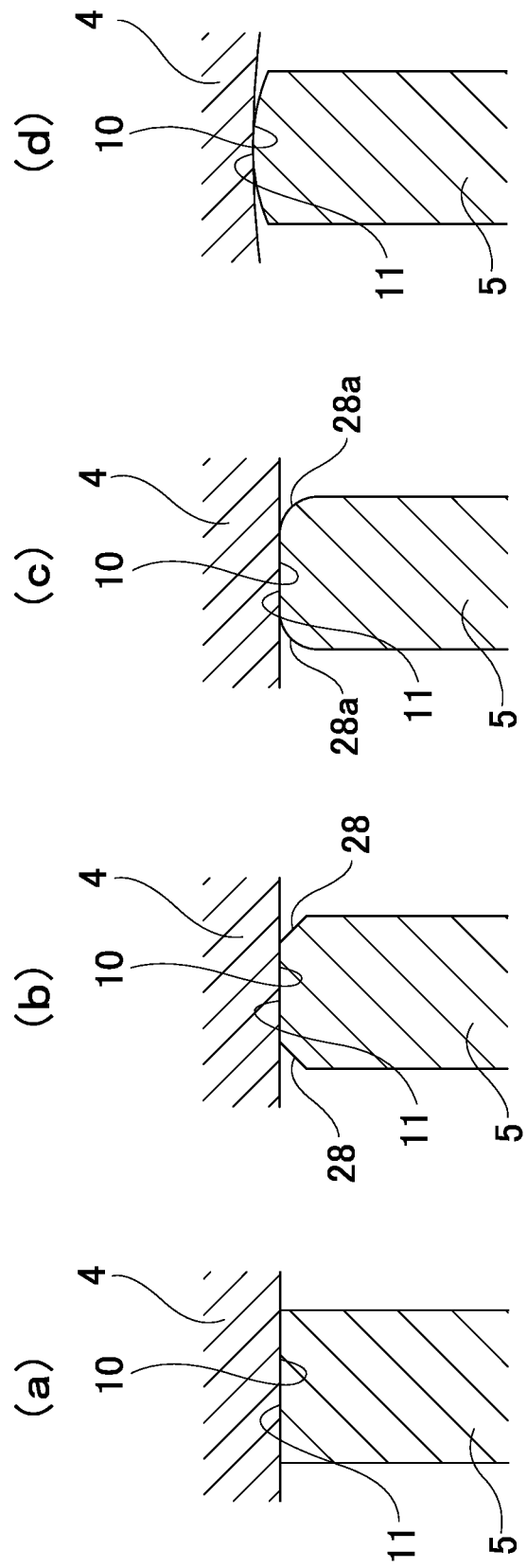
FIG. 26A to FIG. 26D are cross-sectional views corresponding to section A-A in FIG. 6, and illustrate four examples of cross-sectional shapes that may be used as the pressed surface and the pressing surface of a reverse input shutoff clutch of a twelfth example of an embodiment of the present invention.

In the first example illustrated in FIG. 26A, the cross-sectional shapes of both the pressed surface 10 and the pressing surface 11 are both linear. Such a structure has an advantage in that the processing cost may be kept low because the pressed surface 10 and the pressing surface 11 can be easily processed. However, when the center axis of the engaging element 5 is inclined with respect to the center axis of the pressed member 4, an edge load tends to be generated between the corners present at both ends in the axial direction of the pressing surface 11 and the pressed surface 10. Accordingly, wear tends to proceed and durability tends to be low.

Also in the second example illustrated in FIG. 26B, the cross-sectional shapes of both the pressed surface 10 and the pressing surface 11 are both linear. However, in this example, planar (partially conical surface) chamfered portions 28 are provided on both sides in the axial direction of the pressing surface 11 positioned at both end portions in the axial direction of the outer side surface in the radial direction of the engaging element 5. With such a configuration, when the inclination angle between the center axis of the engaging element 5 and the center axis of the pressed member 4 is small, edge loading does not occur.

In the third example illustrated in FIG. 26C as well, the cross-sectional shapes of both the pressed surface 10 and the pressing surface 11 are both linear. However, in this example, convex curved chamfered portions 28a are provided on both sides in the axial direction of the pressing surface 11 positioned at both end portions in the axial direction of the outer side surface in the radial direction of the engaging element 5. With such a configuration, it is possible to increase the inclination angle of the engaging element 5 compared to that of the second example described above without the occurrence of edge loading. However, compared to the second example, the processing of the chamfered portions 28a is troublesome, and the processing cost is likely to increase.

In the fourth example illustrated in FIG. 26D, the cross-sectional shapes of both the pressed surface 10 and pressing surface 11 are circular arc shape. More specifically, the cross-sectional shape of the pressed surface 10 is a concave arc shape, and the cross-sectional shape of the pressing surface 11 is a convex arc shape. Moreover, the radius of curvature of the cross-sectional shape of the pressing surface 11 is made smaller than the radius of curvature of the cross-sectional shape of the pressed surface 10. With such a configuration, it is possible to increase the inclination angle of the engaging element 5 compared to the case of the third example described above without the occurrence of edge loading. However, compared to the third example, the processing of the pressed surface 10 and the pressing surface 11 is troublesome, and the processing cost is likely to increase.

Thirteenth Example

Figure 27:
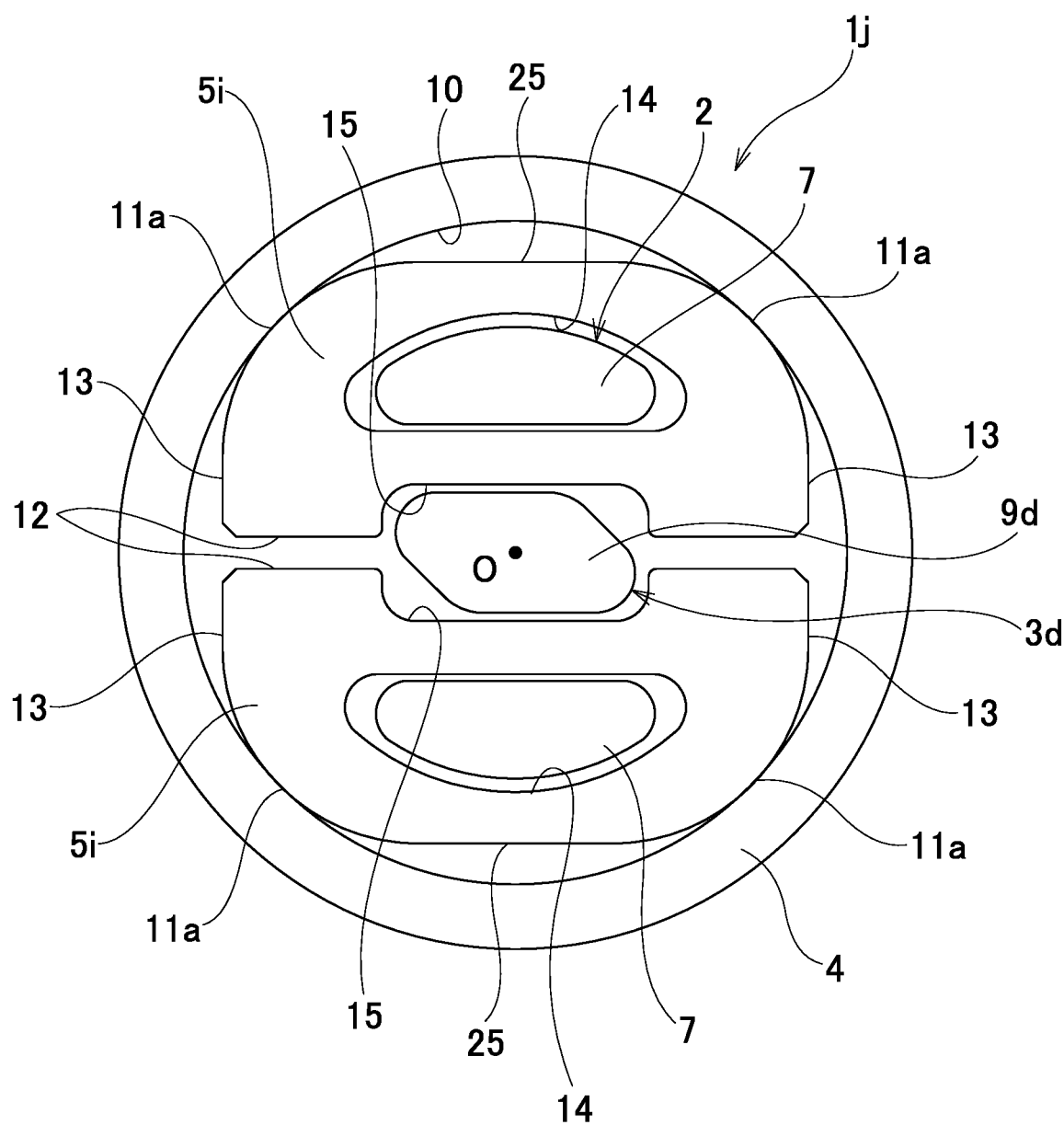
FIG. 27 is a diagram illustrating a reverse input shutoff clutch of a thirteenth example of an embodiment of the present invention.

A thirteenth example of an embodiment of the present invention will be described with reference to FIG. 27. A feature of the reverse input shutoff clutch 1j of this example is that the shutoff rate differs depending on the direction of the rotational torque reversely inputted to an output member 3d. Note that the shutoff rate may be calculated by following equation (13).

(Shutoff rate of rotational torque reversely inputted to output member 3d)=((Rotational torque reversely inputted to output member 3d)−(Rotational torque transmitted to input member 2))/ (Rotational torque reversely inputted to output member 3d)　　(13)

In this example, the cross-sectional shape of the output member side engaging portion 9d of the output member 3d is a substantially a parallelogram. The pair of engaging elements 5i is arranged so that the engaging element side output engaging portions 15 sandwich the output member side engaging portion 9d from both sides in the radial direction.

Accordingly, in the illustrated example, the distance r from the center of rotation O of the output member 3d to the contact portion between the corners of the output member side engaging portion 9d and the bottom portion of the engaging element side output engaging portions 15 becomes larger in a case where the output member 3d rotates in the clockwise direction than in a case where the output member 3d rotates in the counterclockwise direction Therefore, presuming that the magnitude of rotational torque reversely inputted to the output member 3d is the same regardless of the direction of rotation of the output member 3d, the magnitude of the braking torque T' acting on the engaging elements 5i becomes smaller in a case where the output member 3d rotates in the clockwise direction than in a case where the output member 3d rotates in the counterclockwise direction. In short, the shutoff rate of the reverse input shutoff clutch 1j becomes smaller in a case where the output member 3d rotates in the clockwise direction than in a case where the output member 3d rotates in the counterclockwise direction. Note that when the output member 3d rotates in the counterclockwise direction, rotational torque reversely inputted to the output member 3d may be completely shut off so as not to be transmitted to the input member 2, or it is possible to shut off part and transmit the remaining part to the input member 2.

Note that in the reverse input shutoff clutch 1j of the present example, a larger normal force may be obtained by utilizing the wedge effect. In other words, each of the engaging elements 5i has a pressing surface 11a that is pressed against the pressed surface 10 at two positions of the outer side surface in the radial direction separated from each other in the circumferential direction, and has a tip end surface 25 that is provided at an intermediate portion in the circumferential direction that is a portion of the outer side surface in the radial direction between the pair of pressing surfaces 11a. The configurations and operational effects of the other portions are the same as those of the first example and eighth example.

Fourteenth Example

Figure 28:
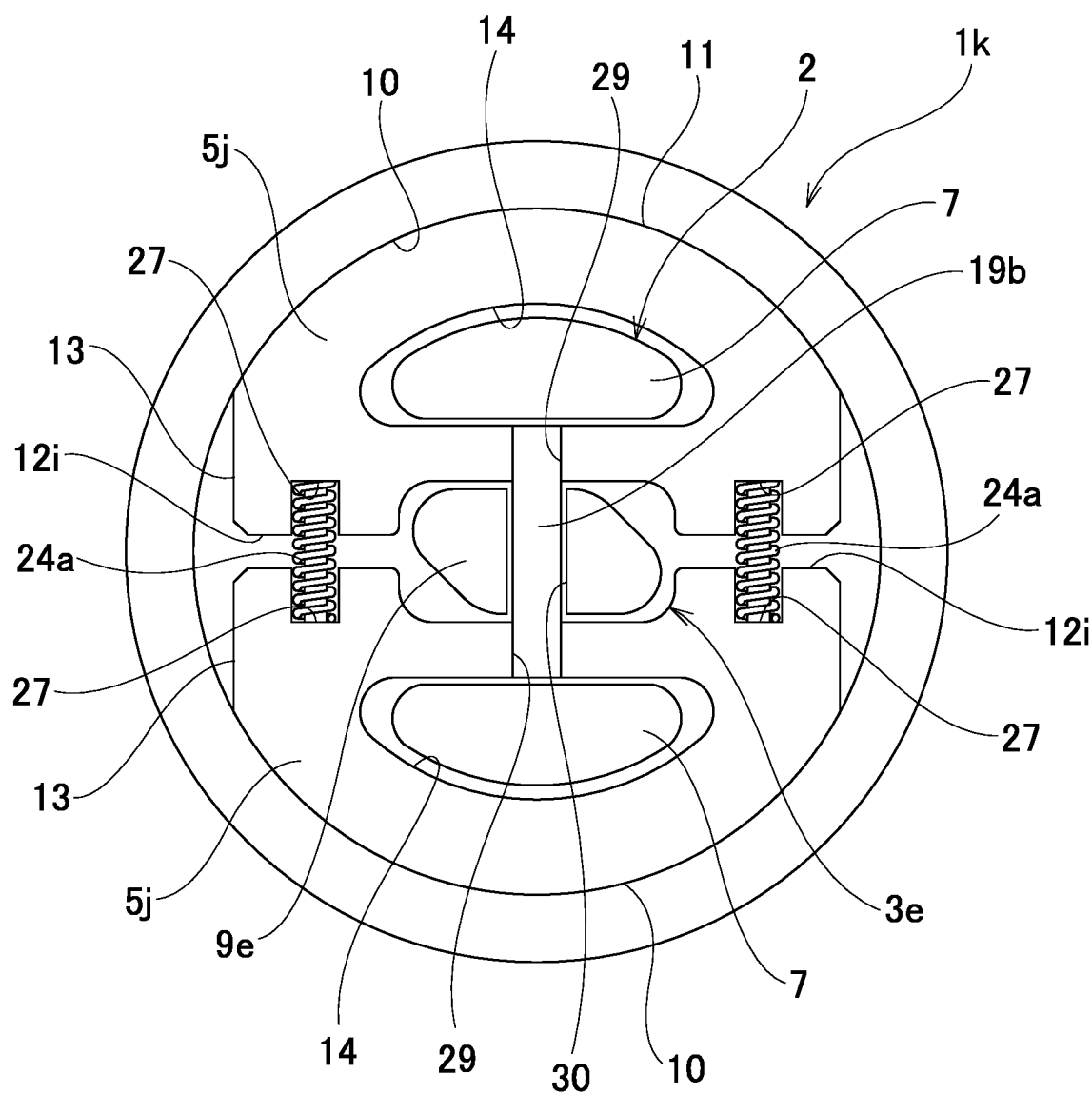
FIG. 28 is a diagram illustrating a reverse input shutoff clutch of a fourteenth example of an embodiment of the present invention.

A fourteenth example of an embodiment of the present invention will be described with reference to FIG. 28. A feature of the reverse input shutoff clutch 1k of this example, as in the reverse input shutoff clutch 1j of the thirteenth example, is that the shutoff rate differs depending on the direction of rotational torque reversely inputted to an output member 3e. In order for this, the cross-sectional shape of an output member side engaging portion 9e of the output member 3e is substantially a parallelogram. A pair of engaging elements 5j is arranged so that engaging element side output engaging portions 15 sandwich the output member side engaging portion 9e from both sides in the radial direction.

Furthermore, the reverse input shutoff clutch 1k of this example has a feature in that the posture of the pair of engaging elements 5j is stabilized and the displacement in the radial direction of the engaging elements 5j is accurately performed. In order for this, each engaging element 5j is provided with cylindrical concave guide portions 27 on both side portions in the width direction of a bottom surface 12g so as to be recessed in a direction perpendicular to the bottom surface 12g. In the reverse input shutoff clutch 1k, an elastic member 24a is arranged inside each of pairs of concave guide portions 27 on the same straight line so that in a state in which the bottom surfaces 12g of the pair of engaging elements 5g oppose each other, the elastic member 24a spans between the pair of concave guide portions 27.

Furthermore, in this example, each engaging element 5j has a guide hole 29 that is formed in the radial direction of the engaging element 5j, and opens to the bottom portion of the engaging element side output engaging portion 15 and the inner surface of the engaging element side input engaging portion 14. Moreover, the output member 3e has an insertion through hole 30 that penetrates through the output member side engaging portion 9e. Then, both end portions in the axial direction of a guide 19b having a columnar shape are inserted into each guide hole 29 of the pair of engaging elements 5j so that there is no looseness in the radial direction and so as to be able to move in the axial direction, and an intermediate portion in the axial direction of the guide 19b is loosely inserted into the insertion through hole 30 of the output member side engaging portion 9e. This prevents the pair of engaging elements 5j from moving relative to each other in the width direction, prevents the pair of engaging elements 5j from tilting so that the bottom portions of the engaging element side output engaging portions 15 do not become out of parallel with each other, and allows only relative displacement of the pair of engaging elements 5j in a direction toward or away from each other. The configurations and operational effects of the other portions are the same as those of the first example, tenth example, and thirteenth example.

Fifteenth Example

Figure 29:
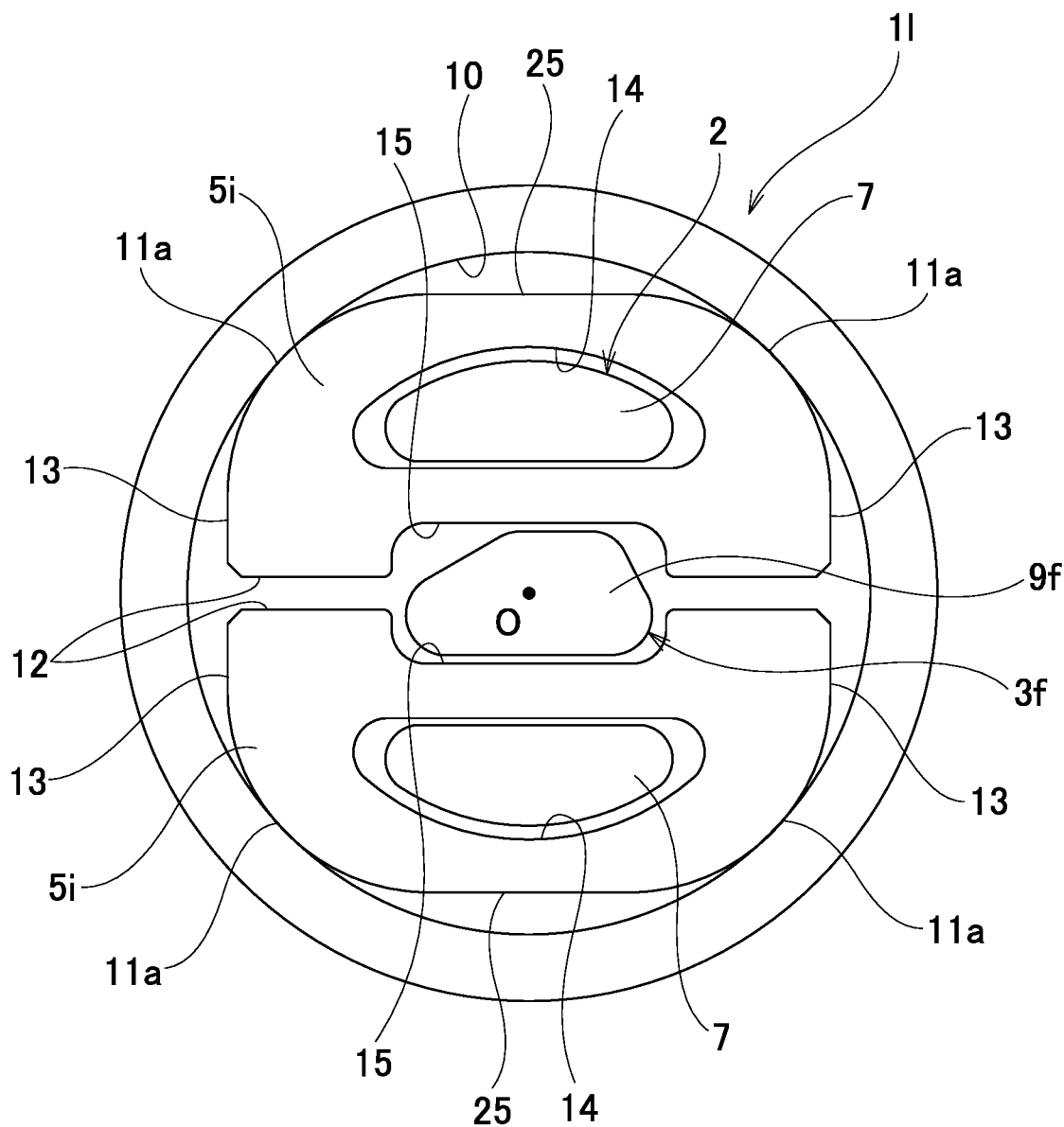
FIG. 29 is a diagram illustrating a reverse input shutoff clutch of a fifteenth example of an embodiment of the present invention.

A fifteenth example of an embodiment of the present invention will be described with reference to FIG. 29. A feature of the reverse input shutoff clutch 1l of this example, as in the reverse input shutoff clutch 1j of the thirteenth example, is that the shutoff rate differs depending on the direction of rotational torque reversely inputted to an output member 3f. The output member 3f is asymmetric with respect to a virtual plane parallel to the axial direction of the output member 3f and the direction of movement of the pressing surface 11a toward or away from the pressed surface 10 (the radial direction of the engaging element 5i), and has an output member side engaging portion 9f having a substantially trapezoidal cross-sectional shape. The pair of engaging elements 5i is arranged so that the engaging element side output engaging portions 15 sandwich the output member side engaging portion 9f from both sides in the radial direction.

In the illustrated example, in one engaging element 5i of the pair of engaging elements 5i (upper side in FIG. 29), the distance r from the center of rotation O of the output member 3f to the contact portion between the corner portions of the output member side engaging portion 9f and the bottom portion of the engaging element side output engaging portion 15 becomes smaller in a case where the output member 3f rotates in the clockwise direction than in a case where the output member 3f rotates in the counterclockwise direction. Therefore, presuming that the magnitude of rotational torque reversely inputted to the output member 3f is the same regardless of the direction of rotation of the output member 3f, the magnitude of the braking torque T' acting on the one engaging elements 5i becomes larger in a case where the output member 3f rotates in the clockwise direction than in a case where the output member 3f rotates in the counterclockwise direction. On the other hand, in the other engaging element 5i of the pair of engaging elements 5i (the lower side in FIG. 29), the distance r is the same regardless of the direction of rotation of the output member 3f, and the magnitude of the braking torque T' acting on the other engaging element 5i is also the same. Accordingly, in this example, the shutoff rate of the entire reverse input shutoff clutch 1l becomes larger in a case where the output member 3f rotates in the clockwise direction than in a case where the output member 3f rotates in the counterclockwise direction. The configurations and operational effects of the other portions are the same as those of the first example, eighth example, and thirteenth example.

Sixteenth Example

Figure 30:
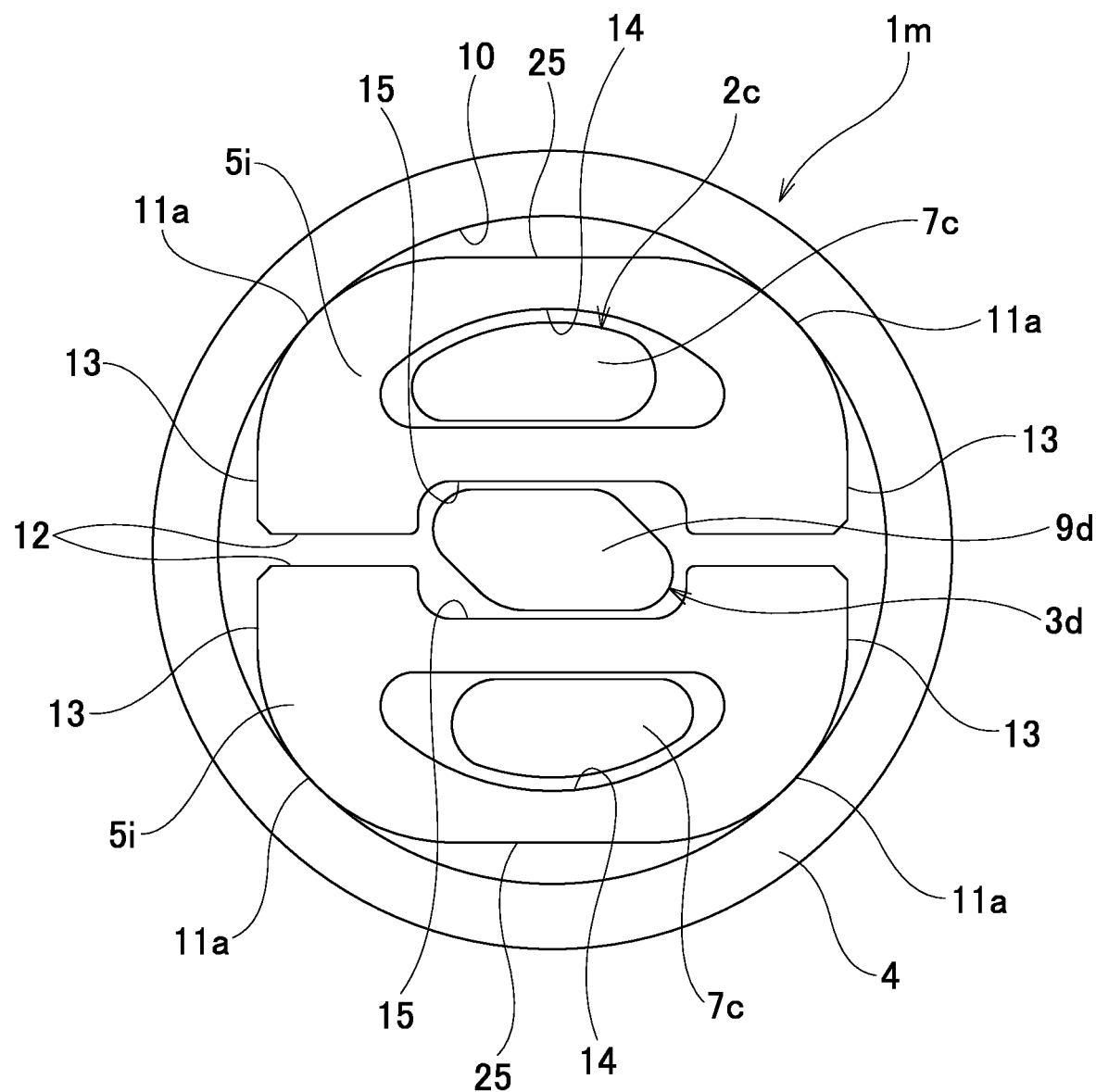
FIG. 30 is a diagram illustrating a reverse input shutoff clutch of a sixteenth example of an embodiment of the present invention.

A sixteenth example of an embodiment of the present invention will be described with reference to FIG. 30. A feature of the reverse input shutoff clutch 1m of this example, as in the reverse input shutoff clutch 1j of the thirteenth example, is that the shutoff rate differs depending on the direction of rotational torque reversely inputted to an output member 3d. In order for this, the cross-sectional shape of the output member side engaging portion 9d of the output member 3d is substantially a parallelogram. The pair of engaging elements 5i is arranged so that the engaging element side output engaging portions 15 sandwich the output member side engaging portion 9d from both sides in the radial direction.

Furthermore, in the reverse input shutoff clutch 1m of this example, the magnitude of looseness of the input member side engaging portion 7c with respect to the engaging element side input engaging portion 14 of the engaging element 5i varies depending on the direction of rotation of the input member 2c. More specifically, each input member side engaging portions 7c has an asymmetric shape with respect to the rotation direction of the input member 2c. In the illustrated example, the looseness of the input member side engaging portions 7c with respect to the engaging element side input engaging portions 14 becomes larger in a case where the input member 2c rotates in the clockwise direction than in a case where the input member 2c rotates in the counterclockwise direction. Accordingly, when the output member 3d is in a locked or semi-locked state, the rotational torque that is required to release the lock or semi lock state may be made smaller in a case where the input member 2c rotates in the clockwise direction than in a case where the input member 2c rotates in the counterclockwise direction. The configurations and operational effects of the other portions are the same as those of the first example and thirteenth example.

Seventeenth Example

Figure 31:
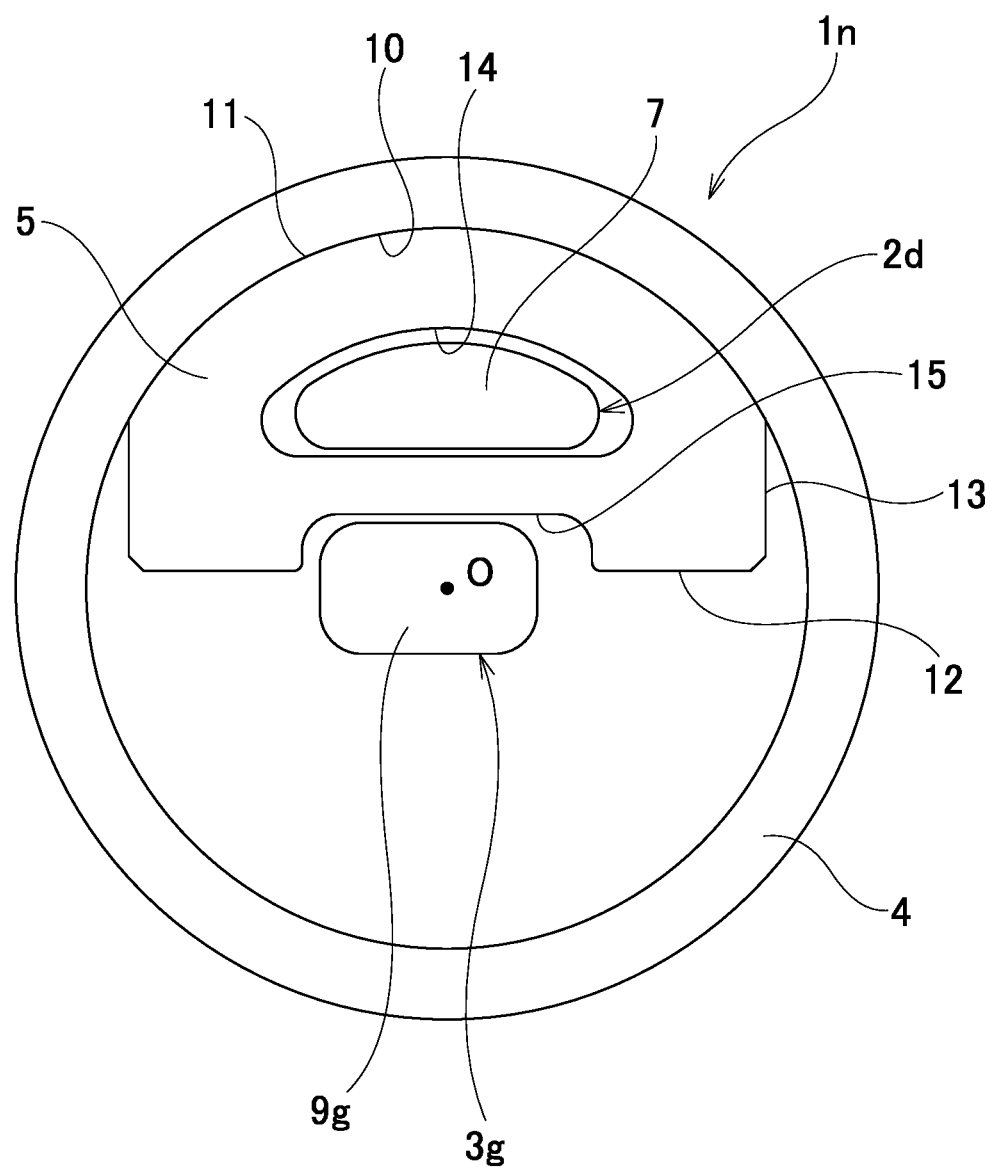
FIG. 31 is a diagram illustrating a reverse input shutoff clutch of a seventeenth example of an embodiment of the present invention.
Figure 32:
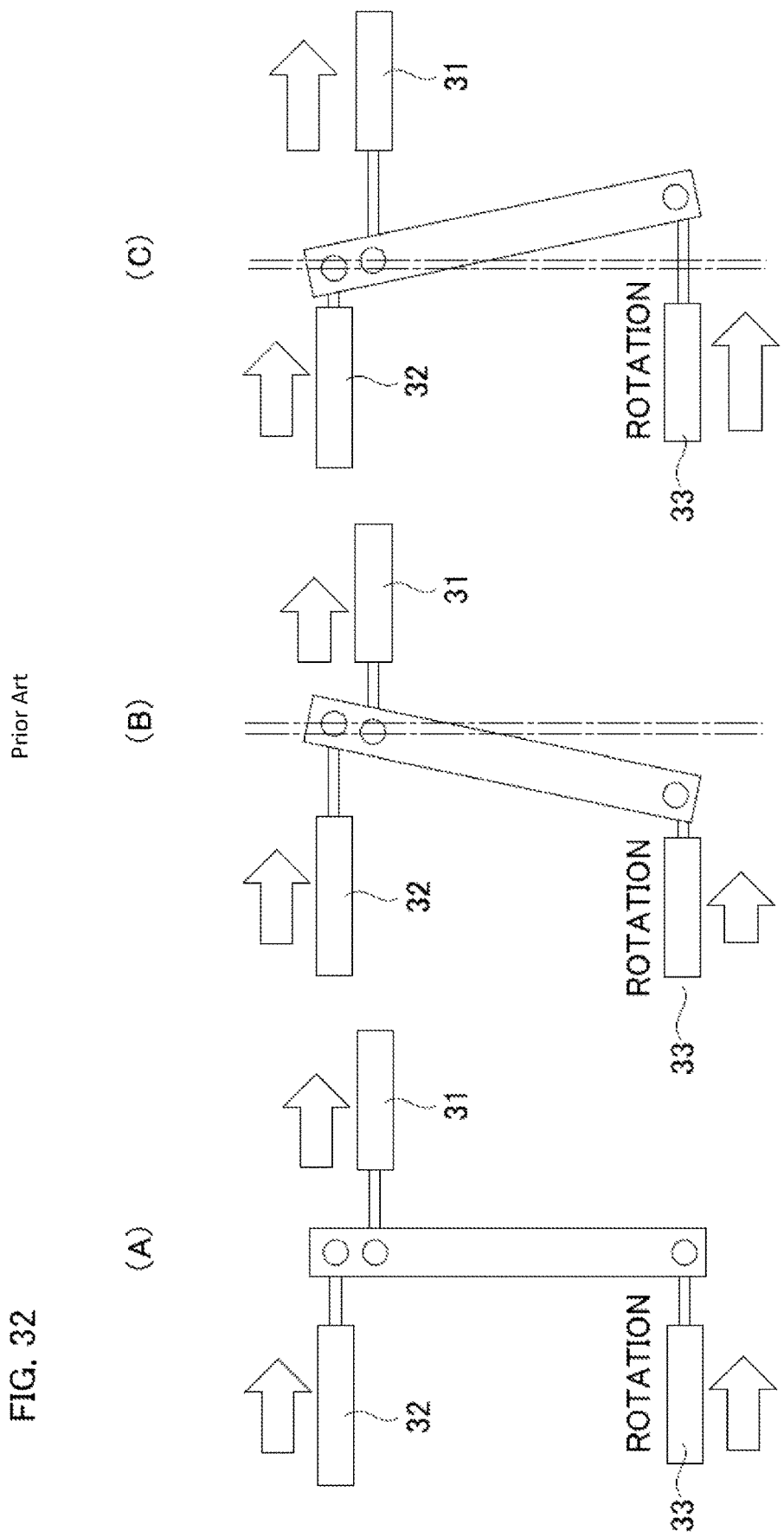
FIG. 32A to FIG. 32C are schematic views for describing a camshaft phase adjustment method by a conventional electric valve timing adjustment device.

A seventeenth example of an embodiment of the present invention will be described with reference to FIG. 31. A feature of the reverse input shutoff clutch 1n of this example, as in the reverse input shutoff clutch 1j of the thirteenth example, is that the shutoff rate differs depending on the direction of rotational torque reversely inputted to an output member 3g. In this example, the output member 3g includes an output member side engaging portion 9g having a substantially rectangular cross section, and the center axis of the output member side engaging portion 9g is offset in the radial direction with respect to the center of rotation O of the output member 3g. In addition, the reverse input shutoff clutch 1n of this example includes only one engaging element 5 having an engaging element side output engaging portion 15 that engages with the output member side engaging portion 9g. Note that the input member 2d of the reverse input shutoff clutch 1n of this example includes only one input member side engaging portion 7.

In the illustrated example, the distance r from the center of rotation O of the output member 3g to the contact portion between the corner portions of the output member side engaging portion 9g and the bottom portion of the engaging element side output engaging portion 15 becomes larger in a case where the output member 3g rotates in the clockwise direction than in a case where the output member 3g rotates in the counterclockwise direction. Accordingly, presuming that the magnitude of the rotational torque reversely inputted to the output member 3g is the same regardless of the direction of rotation of the output member 3g, the magnitude of the braking torque T' acting on the engaging element 5 becomes smaller in a case where the output member 3g rotates in the clockwise direction than in a case where the output member 3g rotates in the counterclockwise direction. In short, the shutoff rate of the reverse input shutoff clutch 1n becomes smaller in a case where the output member 3g rotates in the clockwise direction than in a case where the output member 3d rotates in the counterclockwise direction.

In the reverse input shutoff clutch 1n of this example, the feature that the shutoff rate differs depending on the direction of rotational torque reversely inputted to the output member 3g is achieved by a structure that includes only one engaging element 5. Therefore, compared with the reverse input shutoff clutch 1j of the thirteenth example, the number of parts may be reduced. The configurations and operational effects of the other portions are the same as those of the first example and thirteenth example.

Eighteenth Example

An eighteenth example of an embodiment of the present invention will be described with reference to FIG. 32 to FIG. 40. A feature of this example is that the reverse input shutoff clutch of the present invention is applied to an electric valve timing adjustment device.

The electric valve timing adjustment device described in JP 2010-255494A has a speed reduction mechanism such as a differential gear mechanism between a driven member such as a sprocket or the like that is rotationally driven by a crankshaft and a camshaft. The phase difference between the camshaft and the crankshaft is changed by changing the engaging position of the speed reduction mechanism by an electric motor.

More specifically, as illustrated in FIG. 32A, in the phase maintaining mode where the phase difference between a camshaft 31 and a sprocket (crankshaft) 32 is zero, the rotational speed of an electric motor 33 is set so as to be equal to the rotational speed of the sprocket 32. On the other hand, as illustrated in FIG. 32B, in the delay angle mode where the phase of the camshaft 31 is delayed relative to the phase of the sprocket 32, the rotational speed of the electric motor 33 is set so as to be slower than the rotational speed of the sprocket 32. Moreover, as illustrated in FIG. 32C, in the advance angle mode where the phase of the camshaft 31 is advanced relative to the phase of the sprocket 32, the rotational speed of the electric motor 33 is set so as to be faster than the rotational speed of the sprocket 32. Note that in FIG. 32A to FIG. 32C, the length of the white arrow indicates the magnitude of the rotational speed, and the direction of the white arrow indicates the direction of rotation.

In the electric valve timing adjustment device described in JP 2010-255494A, it is necessary to drive the electric motor so that the rotational speed of the electric motor becomes equal to the rotational speed of the sprocket even when maintaining the phase without causing a phase difference between the camshaft and the sprocket. Therefore, electric valve timing adjustment device having a conventional structure has a point to be improved in that power consumption becomes excessive.

Figure 33:
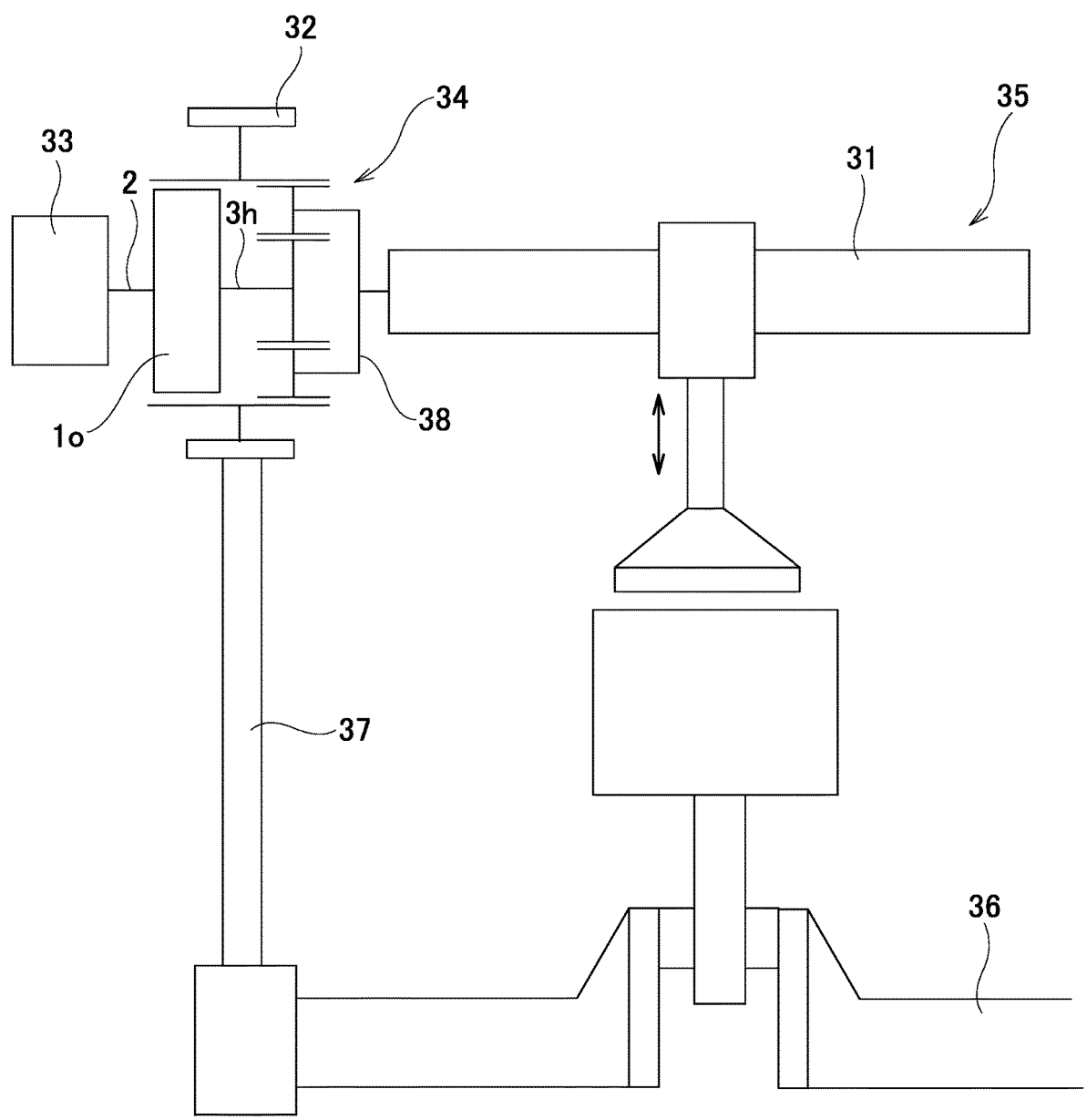
FIG. 33 is a schematic diagram illustrating a part of an engine provided with an electric valve timing adjustment device of an eighteenth example of an embodiment of the present invention.
Figure 34:
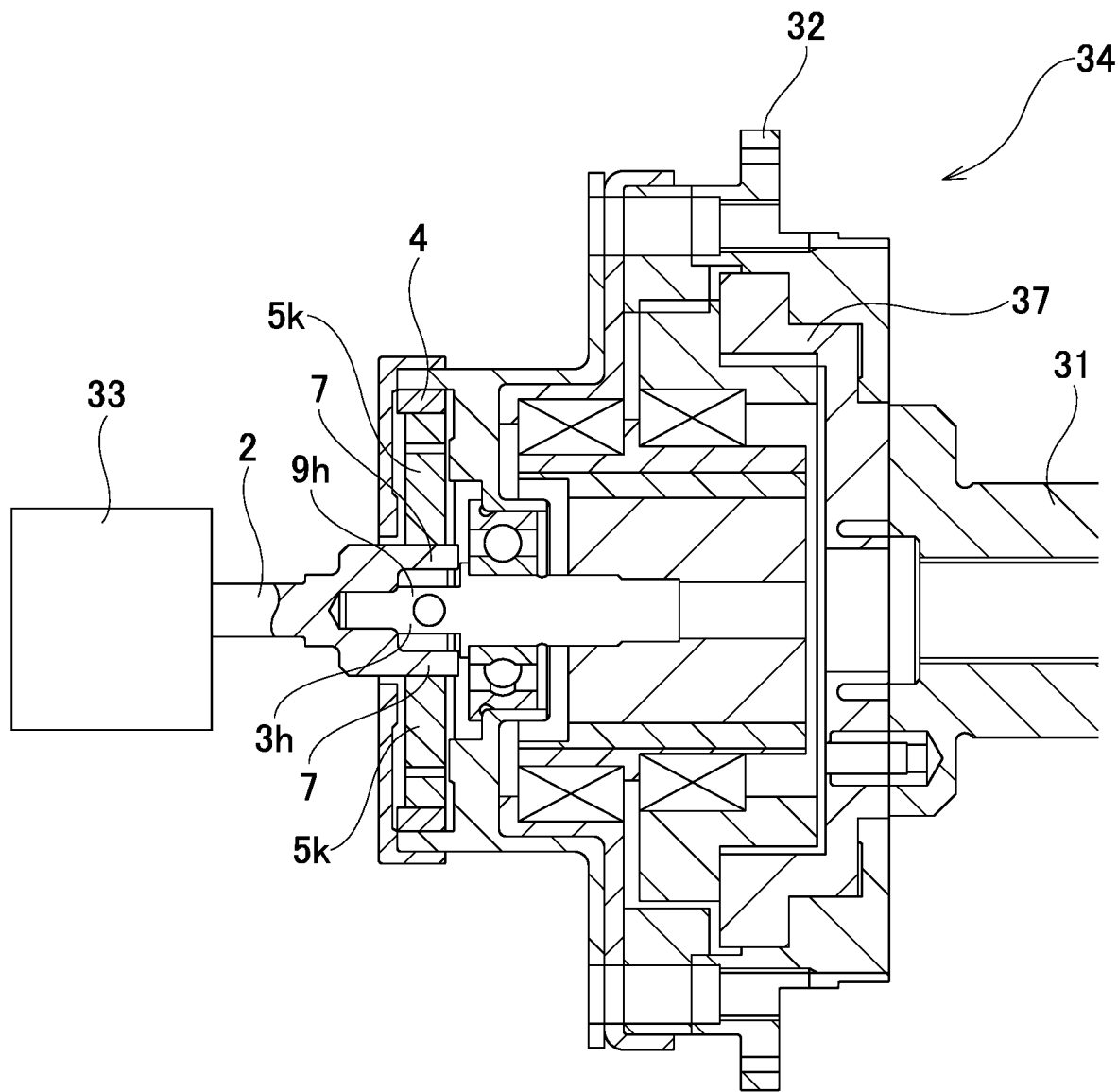
FIG. 34 is a cross-sectional view of the electric valve timing adjustment device of the eighteenth example.

As illustrated in FIG. 33 and FIG. 34, the electric valve timing adjustment device 34 of this example is incorporated in an internal combustion engine 35. The internal combustion engine 35 has a crankshaft 36, and camshaft 31 that drives at least one of an intake valve and an exhaust valve. Moreover, an interlocking mechanism 37 such as a chain, a belt or the like, and the electric valve timing adjustment device 34 are provided between the camshaft 31 and the crankshaft 36.

The electric valve timing adjustment device 34 includes an electric motor 33, a sprocket 32 as a driven member, a speed reduction mechanism 38, and a reverse input shutoff clutch 1o. The reverse input shutoff clutch 1o includes an input member 2, an output member 3h, a pressed member 4, and a pair of engaging elements 5k.

The electric motor 33 is controlled by an electronic control unit (ECU) (not illustrated) so as to have an optimal valve timing, and is connected to the input member 2 constituting the reverse input shutoff clutch 1o so as to transmit torque. Output signals from a plurality of sensors such as a rotation angle sensor of the camshaft 31, a rotation angle sensor of the crankshaft 36, a rotational speed sensor of the electric motor 33 and the like are inputted to the electronic control unit. The electronic control unit controls the rotational speed (actual phase difference) of the electric motor 33 so as to approach a target rotational speed (target phase difference) that is set based on the output signals of the plurality of sensors.

The sprocket 32 is rotationally driven by the crankshaft 36 via the interlocking mechanism 37. Moreover, in a case, for example, where the internal combustion engine 35 is a four-stroke engine, the sprocket 32 rotates in synchronization at ½ of the rotational speed of the crankshaft 36. The sprocket 32 is externally fitted and fixed to the pressed member 4 of the reverse input shutoff clutch 1o. Accordingly, the pressed member 4 rotates as the crankshaft 36 rotates.

The speed reduction mechanism 38 is a differential gear mechanism such as a planetary gear mechanism or the like, and has a first input portion, a second input portion, and an output portion, and the phase difference between the camshaft 31 and the crankshaft 36 is changed by moving the engagement position between the camshaft 31 and the crankshaft 36 to the advance angle side or the delay angle side. In a case where a planetary gear mechanism is used as the speed reduction mechanism 38, for example, a configuration may be adopted in which the output member 3h of the reverse input shutoff clutch 1o is connected to a sun gear that is the first input portion, the sprocket 32 is connected to the ring gear that is the second input portion, and the camshaft 31 is connected to the planetary carrier that is the output portion. According to such a configuration, the sun gear connected to the output member 3h is rotated relative to the ring gear connected to the sprocket 32, whereby it is possible to change the phase difference between the camshaft 31 connected to the planetary carrier and the crankshaft 36.

The basic structure of the reverse input shutoff clutch 1o of the present example is the same as that of the reverse input shutoff clutch 1 of the first example of an embodiment of the present invention described above; however, as illustrated in FIG. 35 and FIG. 36, as in the structure of the fourth example, guides 19 are arranged so as to span guide slits 18 provided on both sides in the width direction of the bottom surfaces 12i of the pair of engaging elements 5k. This ensures an accurate movement in the radial direction of the pair of engaging elements 5k.

Figure 37:
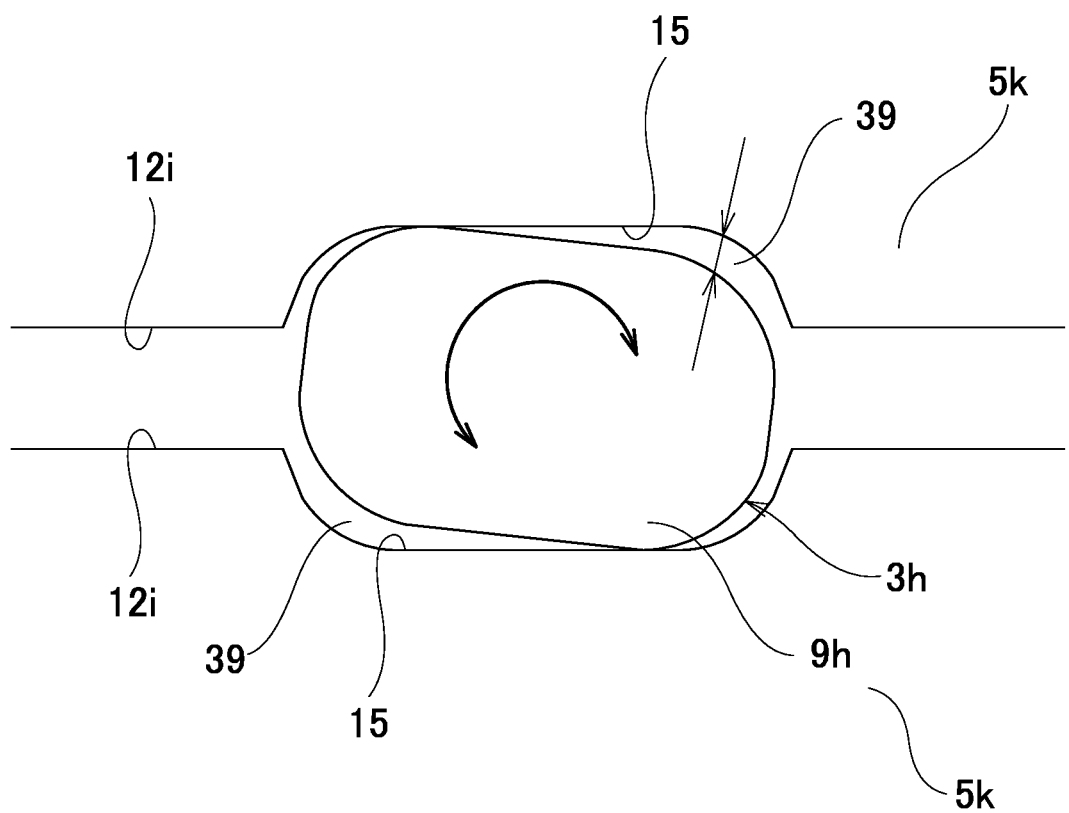
FIG. 37 is a partially enlarged view illustrating a periphery of an output engaging cam of the reverse input shutoff clutch incorporated in the electric valve timing adjustment device of the eighteenth example.
Figure 38:
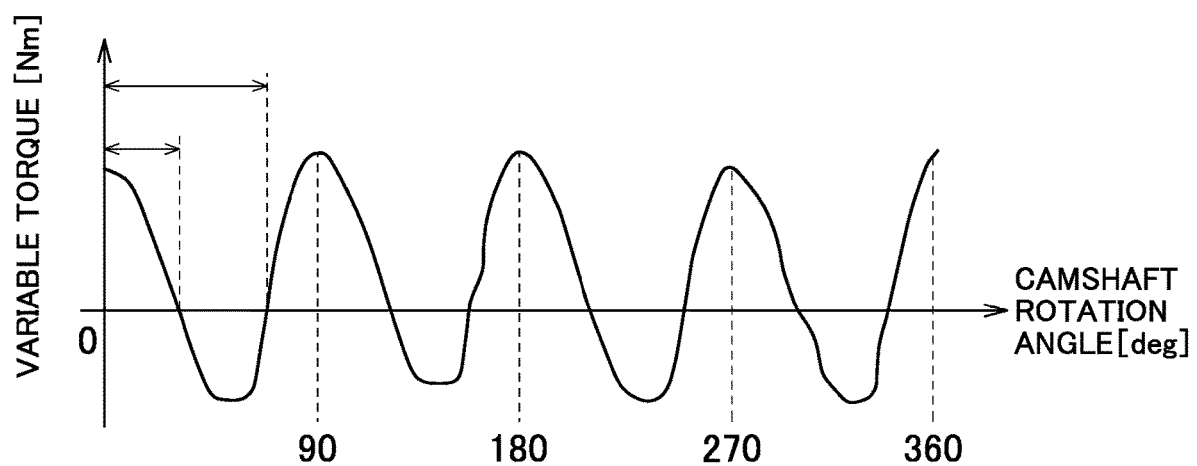
FIG. 38 is a graph illustrating an example of torque inputted to the output member of the reverse input shutoff clutch incorporated in the electric valve timing adjustment device of the eighteenth example.

Furthermore, the reverse input shutoff clutch 1o of the present example has a similar structure to that of the seventh example in that elastic members 24 are arranged in concave housing portions 23 provided in the engaging elements 5k, thereby allowing a moment in a specified direction (counterclockwise in FIG. 35 and FIG. 36) to be applied to the output member 3h via an auxiliary shaft portion 22 that is inserted through the output member side engaging portion 9h. This prevents the output member 3h from being loose with respect to the engaging elements 5k. In particular, the reverse input shutoff clutch 1o utilizes the rotation of the output member side engaging portion 9h functioning as a cam, and by pressing the engaging element side output engaging portions 15 of the engaging elements 5k, the engaging elements 5k are moved outward in the radial direction, so as illustrated in FIG. 37, gaps 39 are required between the outer peripheral side surface of the output member side engaging portion 9h and the bottom surfaces of the engaging element side output engaging portions 15. Moreover, in this example, as will be described later, the output member 3h is rotationally driven by the electric motor 33 or the sprocket 32, so the direction of torque inputted to the output member 3h varies positively and negatively as illustrated in FIG. 38. Accordingly, if no countermeasures are provided, there is looseness of the output member 3h with respect to the engaging elements 5k by the amount of the gaps 39; however, in this example, a moment is applied to the output member 3h by utilizing the elastic force of the elastic members 24, so the looseness of the output member 3h with respect to the engaging elements 5k may be effectively prevented.

Figure 39:
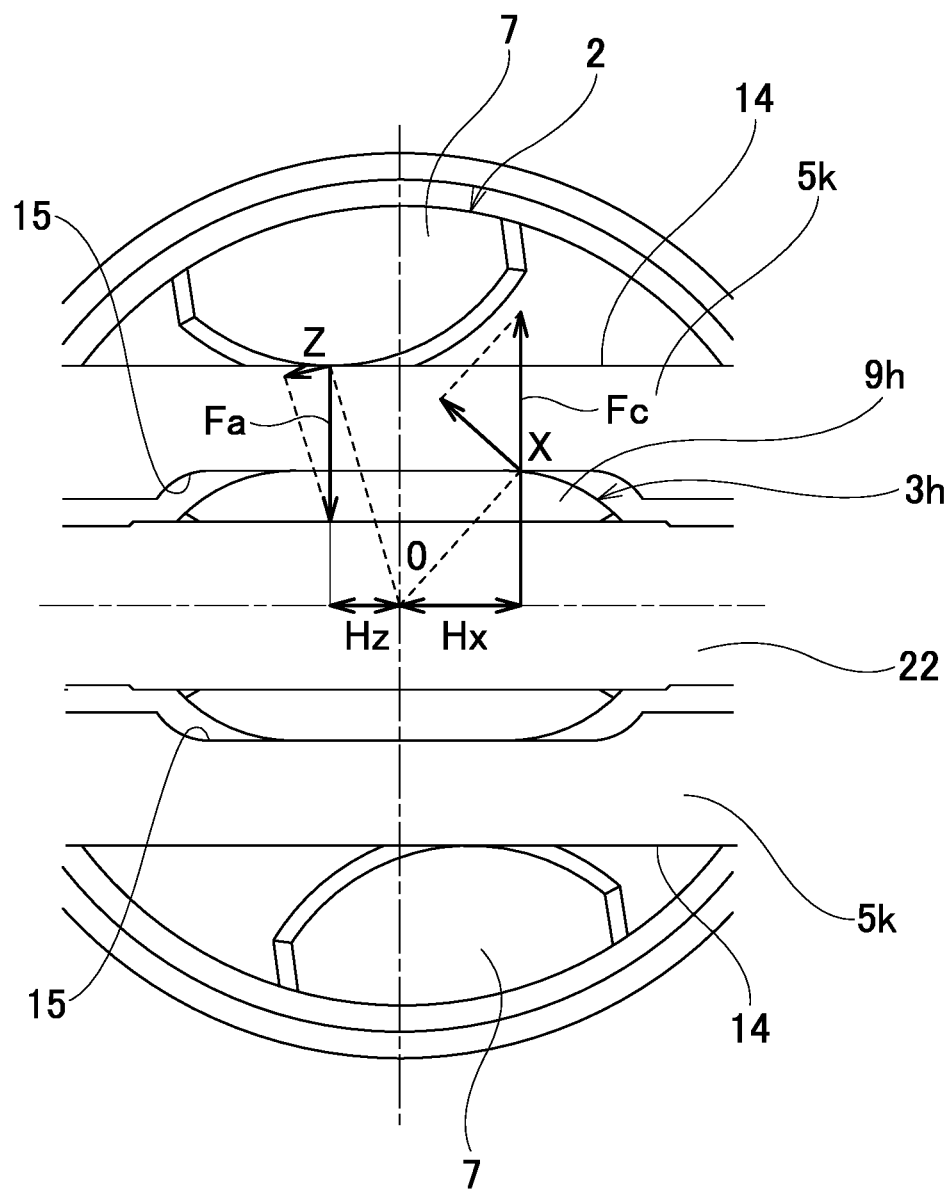
FIG. 39 is a partially enlarged view for describing a relationship between forces acting on an engaging element from an input member side engaging portion and an output member side engaging portion in the reverse input shutoff clutch incorporated in the electric valve timing adjustment device of the eighteenth example.
Figure 40:
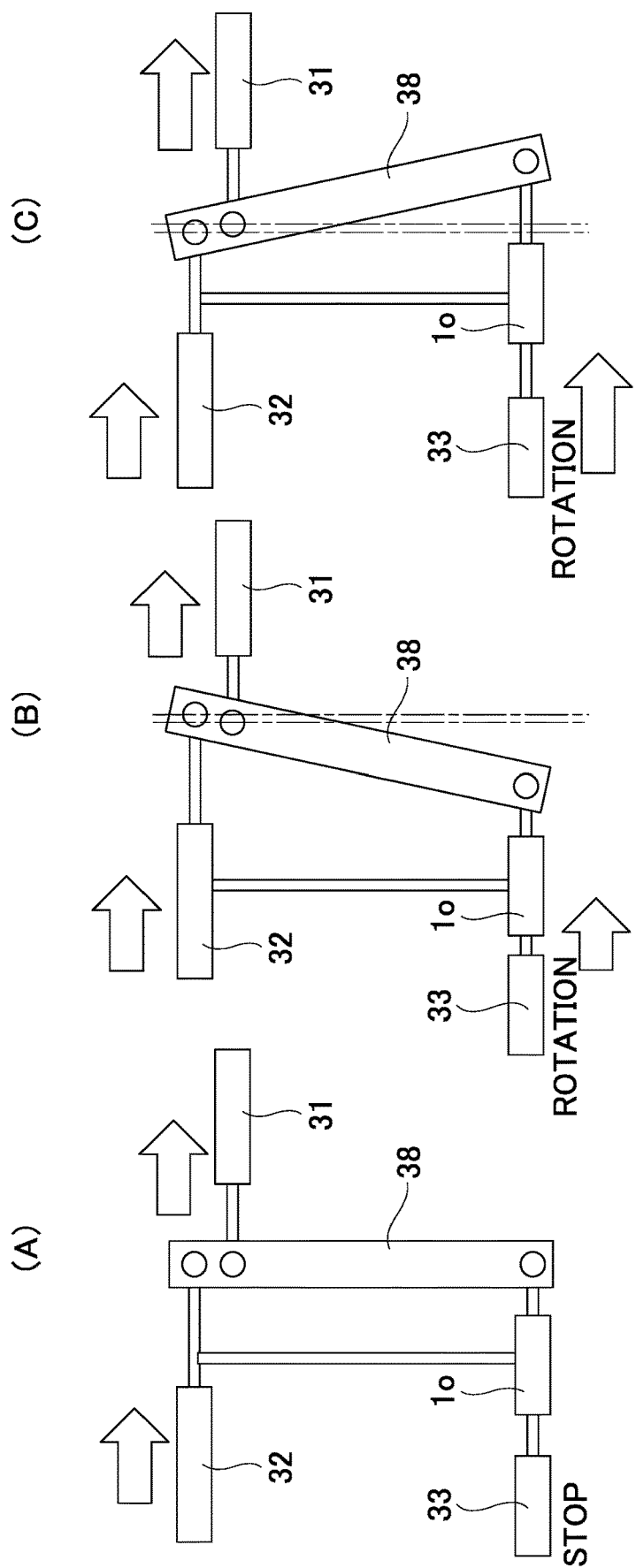
FIG. 40A to FIG. 40C are schematic views for describing a camshaft phase adjusting method by the electric valve timing adjustment device of the eighteenth example.

In addition, as already described in the first example and as illustrated in FIG. 39, the reverse input shutoff clutch 1o of the present example has a configuration in which, when the normal force Fa acting on the engaging elements 5k from the input member 2 becomes larger than the normal force Fc acting on the engaging elements 5k from the output member 3, the engaging elements 5k move inward in the radial direction, and rotational torque is transmitted from the input member 2 to the output member 3h. Moreover, presuming that the magnitude of the torque acting on the engaging elements 5k from the input member 2 is constant, the magnitude of the normal force Fa acting on the engaging elements 5k from the input member 2 becomes smaller as the distance from the center of rotation O of the input member 2 (=center of rotation of the output member 3h) to the contact portions Z between the input member side engaging portions 7 and the inner surfaces of the engaging element side input engaging portions 14 becomes larger. Therefore, in this example, as illustrated in FIG. 39, contact portions Z between the input member side engaging portions 7 and the engaging element side input engaging portions 14 are positioned farther on inner side in the width direction than the contact portions X between the output member side engaging portion 9h and the engaging element side output engaging portions 15. In other words, the distance Hz in the width direction from the center of rotation O to the contact portions Z is less than the distance Hx in the width direction from the center of rotation O to the contact portions X (Hz<Hx).

Next, the operation of the electric valve timing adjustment device 34 of this example will be described.

First, a case where a phase difference is generated between the camshaft 31 and the sprocket 32 will be described.

Figure 35:
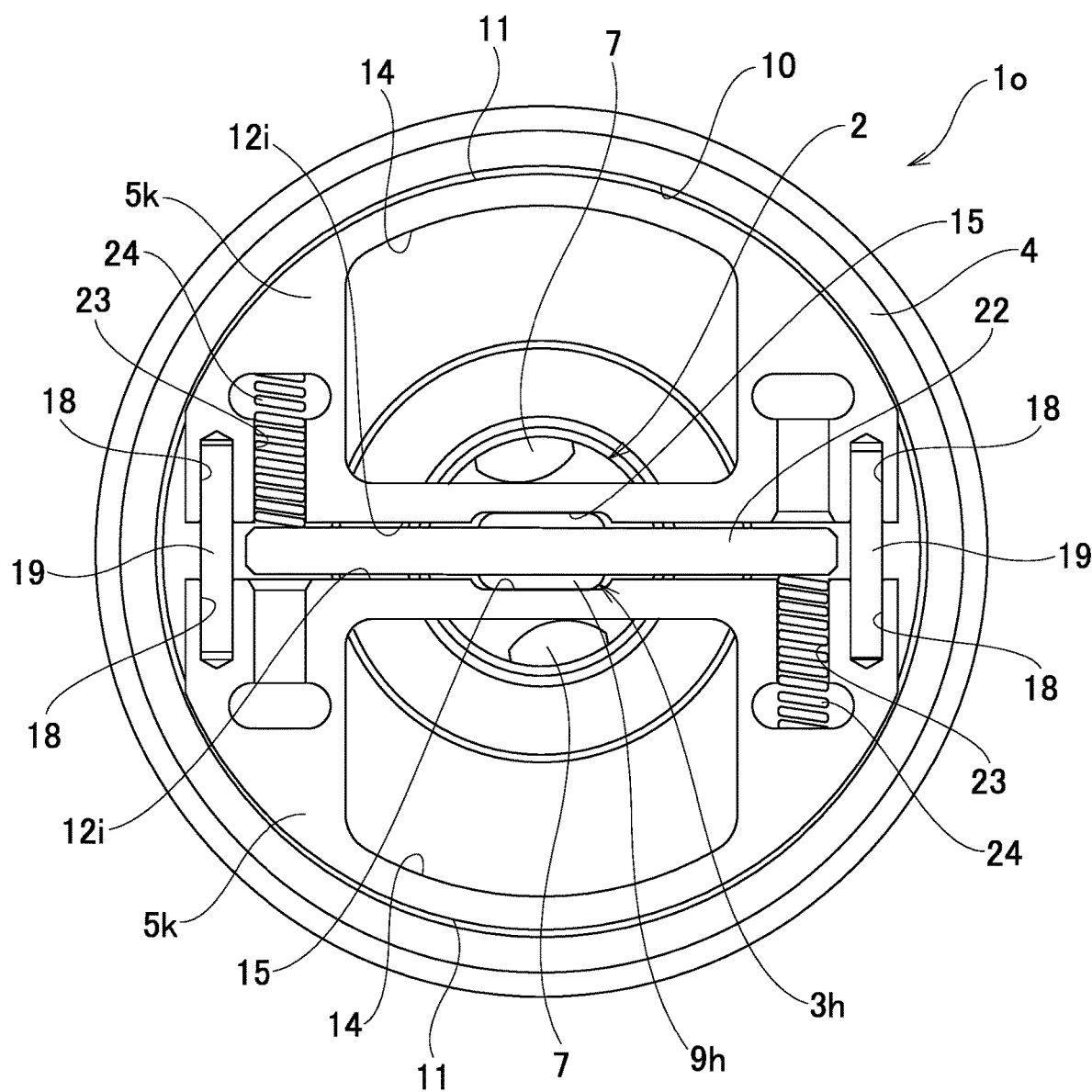
FIG. 35 is a diagram illustrating a state of a reverse input shutoff clutch incorporated in the electric valve timing adjustment device of the eighteenth example in which rotational torque is inputted to an input member of the reverse input shutoff clutch.

In order to cause a phase difference between the camshaft 31 and the sprocket 32, the electric motor 33 is driven, and the electric motor 33 inputs a rotational torque to the input member 2 in the same direction of rotation as the sprocket 32. As illustrated in FIG. 35, when rotational torque is inputted to the input member 2, the input member side engaging portions 7 are rotated inside the engaging element side input engaging portions 14 in the direction of rotation of the input member 2 (counterclockwise direction in the example in FIG. 35). Then, the inner side surface in the radial direction of the input member side engaging portions 7 press the inner surfaces of the engaging element side input engaging portions 14 inward in the radial direction, and each of the pair of engaging elements 5 moves in a direction away from the pressed surface 10. In other words, due to engagement with the input member 2, each of the pair of engaging elements 5k is moved inward in the radial direction, which is a direction away from the pressed surface 10 (the engaging element 5k located on the upper side in FIG. 35 is moved downward, and the engaging element 5k located on the lower side in FIG. 35 is moved upward). As a result, the bottom surfaces 12 of the pair of engaging elements 5k move in a direction toward each other, and the pair of engaging element side output engaging portions 15 sandwich the output member side engaging portion 9h of the output member 3h from both sides in the radial direction. In other words, while rotating the output member 3 so that the major axis direction of the output member side engaging portion 9h is parallel to the bottom surfaces 12 of the engaging elements 5, the output member side engaging portion 9 is made to engage with the pair of engaging element side output engaging portions 15 without looseness. Therefore, the rotational torque inputted to the input member 2 from the electric motor 33 is transmitted to the output member 3h via the pair of engaging elements 5k and outputted from the output member 3h. As a result, the output member 3h rotates in synchronization with the output shaft of the electric motor 33 at the rotational speed set by the electronic control unit.

When the output member 3h is rotationally driven by the electric motor 33, the sun gear that is the first input portion of the speed reduction mechanism 38 connected to the output member 3h rotates in synchronization with the electric motor 33. Here, the ring gear that is the second input portion of the speed reduction mechanism 38 rotates in synchronization with the sprocket 32. Accordingly, the phase difference between the camshaft 31 and the sprocket 32 may be changed by making the rotational speed of the electric motor 33 slower than the rotational speed of the sprocket 32 or faster than the rotational speed of the sprocket 32.

More specifically, as illustrated in FIG. 40B, the phase of the camshaft 31 with respect to the phase of the sprocket 32 may be made slower by making the rotational speed of the electric motor 33 slower than the rotational speed of the sprocket 32. Moreover, as illustrated in FIG. 40C, the phase of the camshaft 31 with respect to the phase of the sprocket 32 may be made faster by making the rotational speed of the electric motor 33 faster than the rotational speed of the sprocket 32. Note that in FIG. 40A to FIG. 40C, the length of the white arrow indicates the magnitude of the rotational speed, and the direction of the white arrow indicates the direction of rotation.

Next, a case where the phase difference between the camshaft 31 and the sprocket 32 is zero will be described.

As is clear from the above description, in order to make the phase difference between the camshaft 31 and the sprocket 32 zero, the rotational speed of the sun gear as the first input portion connected to the output member 3h in the speed reduction mechanism 38 and the rotational speed of the ring gear as the second input portion connected to the sprocket 32 may be made the same. Therefore, in this example, the rotational speed of the output member 3h is made to be the same as the rotational speed of the sprocket 32 by utilizing the characteristics of the reverse input shutoff clutch 10. More specifically, in order to make the rotational speed of the output member 3h the same as the rotational speed of the sprocket 32, driving of the electric motor 33 is stopped, and rotational torque due to the revolution of the planetary carrier of the speed reduction mechanism 38 is reversely inputted to the output member 3h.

Figure 36:
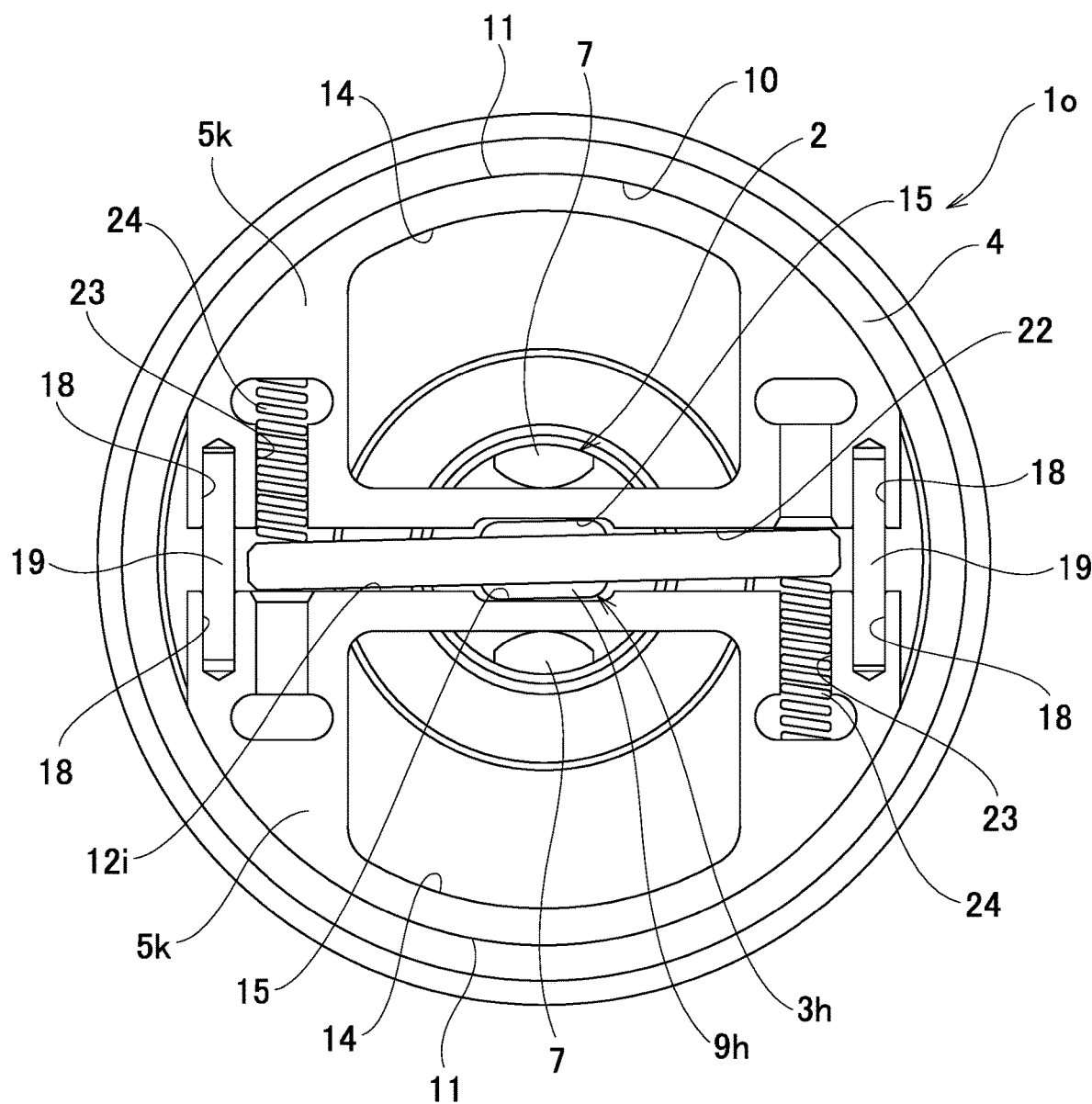
FIG. 36 is a diagram illustrating a state of the reverse input shutoff clutch incorporated in the electric valve timing adjustment device of the eighteenth example in which rotational torque is reversely inputted to an output member of the reverse input shutoff clutch.

As illustrated in FIG. 36, when rotational torque is reversely inputted to the output member 3h, the output member side engaging portion 9h rotates on the inner side between the pair of engaging element side output engaging portions 15 in the direction of rotation of the output member 3h (counterclockwise direction in the example in FIG. 36). Then, the corner portions of the output member side engaging portion 9h press the bottom surfaces of the engaging element side output engaging portions 15 outward in the radial direction, and move the pair of engaging elements 5k in directions toward the pressed surface 10. In other words, due to the engagement with the output member 3h, each of the pair of engaging elements 5k is moved outward in the radial direction that is the direction toward the pressed surface 10 (the engaging element 5k located on the upper side of FIG. 36 is moved upward, and the engaging element 5k located on the lower side in FIG. 36 is moved downward). Accordingly, pressing surfaces 11 of the pair of engaging elements 5k are respectively pressed against the pressed surface 10 to prevent relative rotation between the output member 3h and the pressed member 4. As a result, the rotational speed of the output member 3h and the pressed member 4 is the same, so the rotational speed of the sun gear that is the first input portion connected to the output member 3h, and the rotational speed of the ring gear that is the second input portion connected to the sprocket 32 are the same.

Accordingly, with the electric valve timing adjustment device 34 of this example, as illustrated in FIG. 40A, when the phase difference is maintained so that the phase difference between the camshaft 31 and the sprocket 32 is zero, the electric motor 33 need not be driven. In other words, the electric motor 33 may be set to a non-driven state. For this reason, the power consumption of the electric valve timing adjustment device 34 may be suppressed. Other configurations and effects related to the electric valve timing adjustment device are the same as those of a conventional structure. In addition, other configurations and operational effects related to the reverse input shutoff clutch are the same as those of the first example, the fourth example, and the seventh example. Moreover, the structures of the third example, the fifth example, the sixth example, and the eighth to seventeenth examples may be additionally or alternatively applied.

Nineteenth Example

Figure 41:
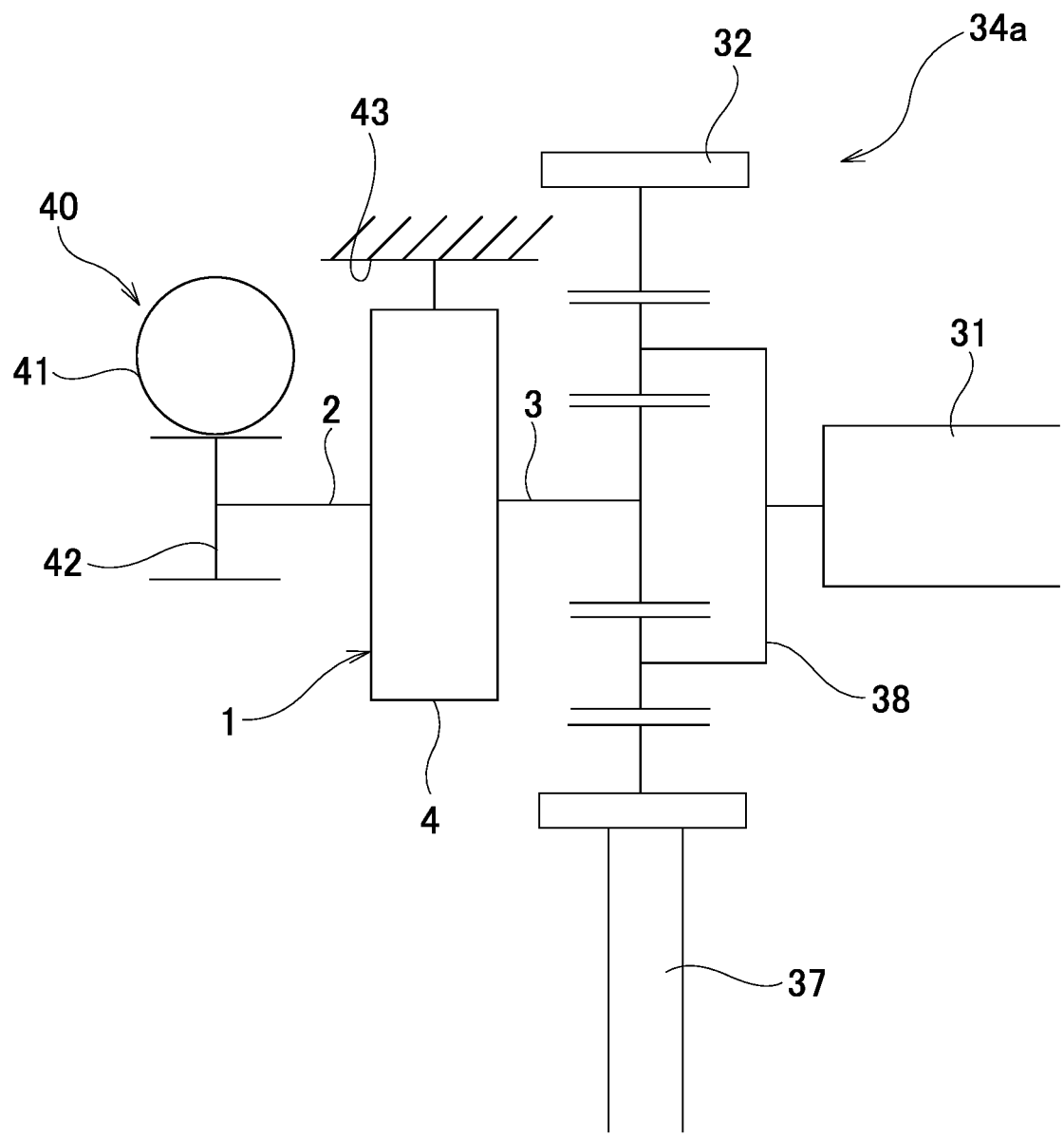
FIG. 41 is a schematic diagram illustrating an electric valve timing adjustment device of a nineteenth example of an embodiment of the present invention.

A nineteenth example of an embodiment of the present invention will be described with reference to FIG. 41. A feature of this example is that the reverse input shutoff clutch 1 is applied to an electric valve timing adjustment device 34a. In this example, the rotational torque of an electric motor is inputted to the input member 2 of the reverse input shutoff clutch 1 via a worm reducer 40. In order for this, a worm gear 41 of the worm reducer 40 is connected to the output shaft of the electric motor, and a worm wheel 42 of the worm reducer 40 is connected to the input member 2.

In this example, the pressed member 4 of the reverse input shutoff clutch 1 is fixed to the inner surface of a non-rotating housing 43 and is not fixed to the sprocket 32. Accordingly, in this example, the pressed member 4 does not rotate.

In the present example having the configuration described above, as in an electric valve timing device having a conventional structure described above, in the phase maintaining mode where the phase difference between the camshaft 31 and the sprocket (crankshaft) 32 is zero, as illustrated in FIG. 32A, it is necessary to make the rotational speed of the electric motor 33 equal to the rotational speed of the sprocket 32. However, in this example, when rotational torque is reversely inputted from the camshaft 31 to the output member 3, rotation of the output member 3 may be prevented. For this reason, it is not necessary to provide a self-locking function in the worm reducer 40, so it is possible to use a worm reducer 40 having high normal efficiency and high reverse efficiency. In addition, the rotation of the electric motor is transmitted to the camshaft 31 via the worm reducer 40 and the speed reduction mechanism 38, so the reduction ratio may be increased, and it becomes possible to control the phase of the camshaft 31 with high accuracy. Other configurations and operational effects related to the electric valve timing adjustment device are the same as in the eighteenth example. Moreover, other configurations and operational effects related to the reverse input shutoff clutch are the same as in the first example. Furthermore, the structures of the second to seventeenth examples can be additionally or alternatively applied.

Twentieth Example

Figure 42:
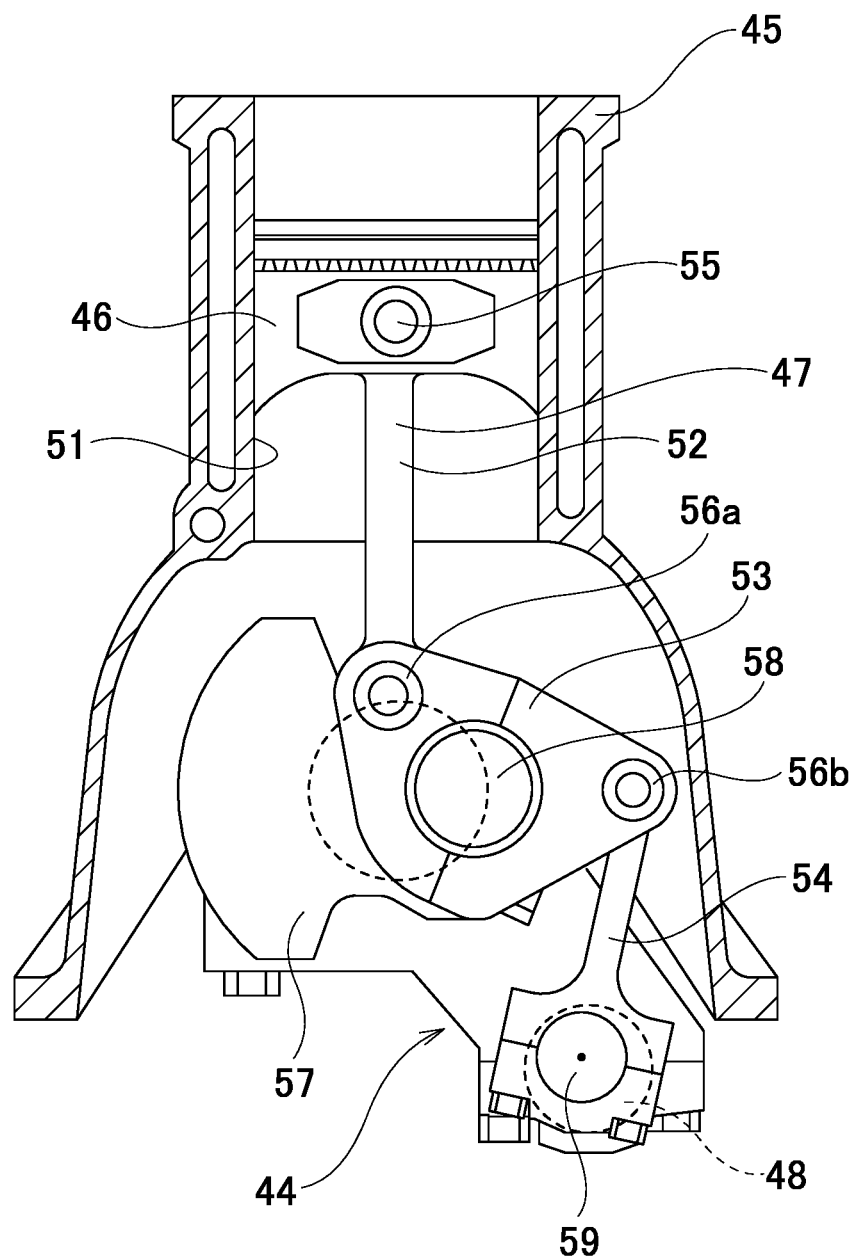
FIG. 42 is a cross-sectional view illustrating a variable compression ratio device of a twentieth example of an embodiment of the present invention.
Figure 43:
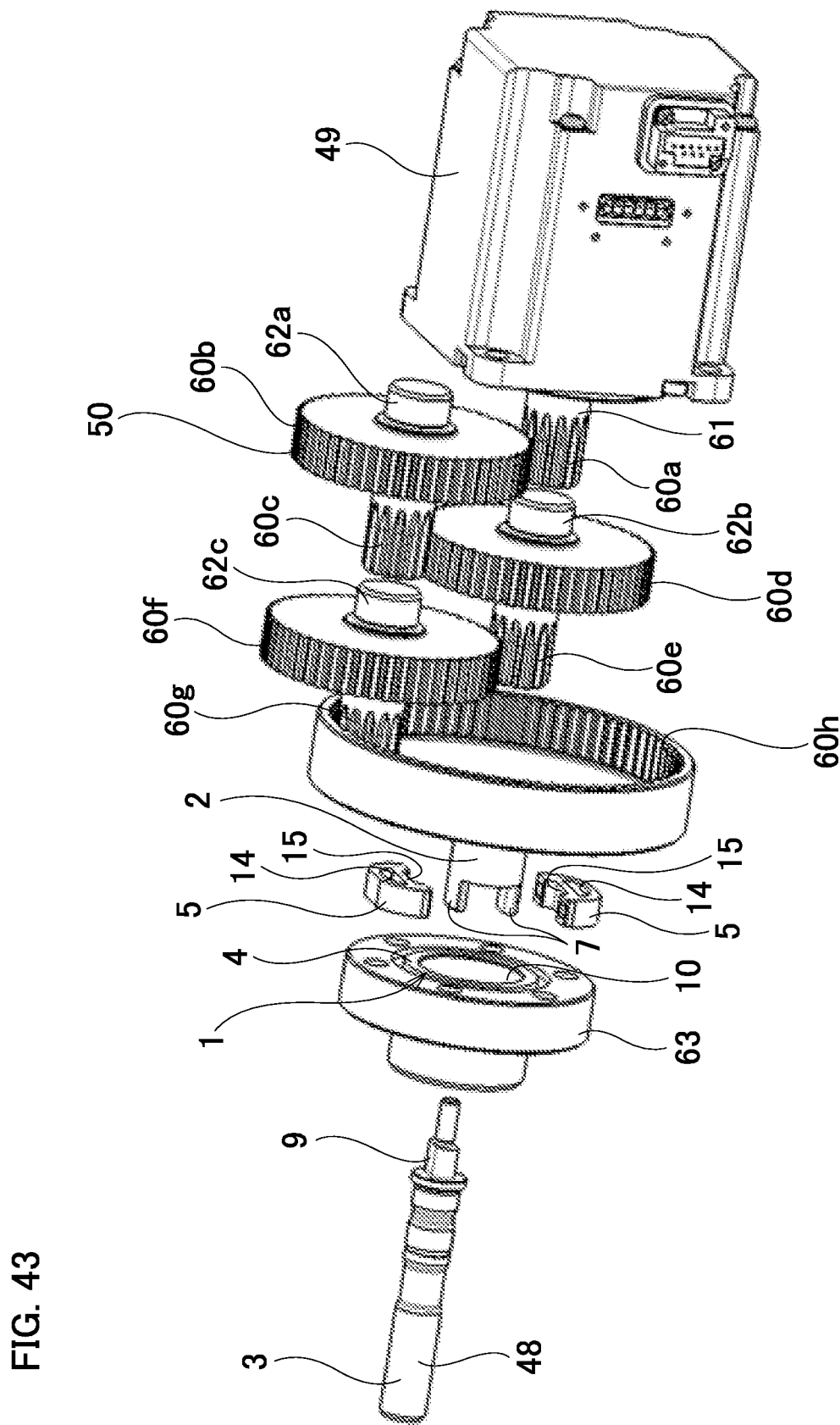
FIG. 43 is an exploded perspective view illustrating a main part of the variable compression ratio device of the twentieth example.

A twentieth example of an embodiment of the present invention will be described with reference to FIG. 42 and FIG. 43. A feature of this example is that the reverse input shutoff clutch 1 is applied to a variable compression ratio device 44. Hereinafter, the variable compression ratio device 44 of this example will be described in detail.

The variable compression ratio device 44 is incorporated in an internal combustion engine (engine) 45, and is capable of changing the engine compression ratio by changing the top dead center position and the bottom dead center position of a piston 46. The variable compression ratio device 44 of this example includes a link mechanism 47, a control shaft 48, an electric motor 49, a speed reduction mechanism 50, and the reverse input shutoff clutch 1 described in the first example.

The link mechanism 47 is connected to the piston 46 arranged in a cylinder 51 of the internal combustion engine 45 and moves the piston 46 in the vertical direction, and includes an upper link 52, a lower link 53, and a control link 54. The upper link 52 is connected to the piston 46 via a piston pin 55, and is connected to the lower link 53 via a first connection pin 56a. The lower link 53 is rotatably attached to a crank pin 58 of the crankshaft 57, and is connected to the control link 54 via a second connection pin 56b. The control link 54 is supported by an eccentric shaft portion 59 provided on the control shaft 48. The posture of the link mechanism 47 having such a configuration is changed by rotating the control shaft 48, which changes the top dead center position and the bottom dead center position of the piston 46. Note that the number of upper links 52, lower links 53, and control links 54 of the link mechanism 47 is the same as the number of cylinders 51.

The control shaft 48 is arranged in parallel with the crankshaft 57 and is rotatably supported by a bearing (not illustrated). The control shaft 48 is rotationally driven by an electric motor 49, and changing the rotation phase thereof changes the top dead center position and the bottom dead center position of the piston 46.

In this example, the speed reduction mechanism 50 and the reverse input shutoff clutch 1 are arranged between the electric motor 49 and the control shaft 48. In the illustrated example, the speed reduction mechanism 50 is a high-efficiency parallel shaft gear reducer, and includes a plurality (eight) of gears 60a to 60h that decelerate and output the rotation of the electric motor 49. More specifically, the speed reduction mechanism 50 includes a first gear 60a that is an input gear, a second gear 60b, a third gear 60c, a fourth gear 60d, a fifth gear 60e, a sixth gear 60f, and a seventh gear 60g as intermediate gears, and an eighth gear 60h as an output gear are provided. The first gear 60a to the seventh gear 60g are external gears having a toothed portion on the outer peripheral surface, and the eighth gear 60h is an internal gear having a toothed portion on the inner peripheral surface.

The first gear 60a that is an input gear is provided at the tip end portion of the output shaft 61 of the electric motor 49. The second gear 60b and the third gear 60c are provided on a first intermediate shaft 62a that is arranged in parallel with the output shaft 61 of the electric motor 49. The fourth gear 60d and the fifth gear 60e are provided on a second intermediate shaft 62b arranged coaxially with the output shaft 61 of the electric motor 49. The sixth gear 60f and the seventh gear 60g are provided on a third intermediate shaft 62c arranged in parallel with the output shaft 61 of the electric motor 49. The eighth gear 60h is arranged coaxially with the output shaft 61 of the electric motor 49. In the speed reduction mechanism 50, the first gear 60a and the second gear 60b, the third gear 60c and the fourth gear 60d, the fifth gear 60e and the sixth gear 60f, and the seventh gear 60g and the eighth gear 60h, respectively engage, whereby the rotational movement of the output shaft 61 of the electric motor 49 is decelerated in four stages. Accordingly, the speed reduction mechanism 50 may have a large reduction ratio, so the electric motor 49 used in combination with the reduction mechanism 50 may be downsized.

In this example, as described above, the reverse input shutoff clutch 1 is arranged between the speed reduction mechanism 50 connected to the electric motor 49 and the control shaft 48. The basic configuration of the reverse input shutoff clutch 1 is the same as the structure of the first example. In particular, in this example, the input member 2 of the reverse input shutoff clutch 1 is fixed coaxially to the eighth gear 60h that is the output gear of the speed reduction mechanism 50. Thereby, the input member 2 is arranged coaxially with the output shaft 61 of the electric motor 49, and is made to rotate in synchronization with the eighth gear 60h. In addition, the output member 3 of the reverse input shutoff clutch 1 is provided integrally with the control shaft 48. Therefore, a substantially long columnar output member side engaging portion 9 is provided at the base end portion of the control shaft 48. Moreover, the annular pressed member 4 of the reverse input shutoff clutch 1 is restrained from rotating via a support bracket 63 arranged around the periphery. A pair of engaging elements 5 is arranged between the output member side engaging portion 9 and the pressed surface 10 provided on the inner peripheral surface of the pressed member 4 so that the output member side engaging portion 9 is sandwiched from both sides in the radial direction. In addition, the input member side engaging portions 7 provided at the tip end portion of the input member 2 are loosely inserted inside the engaging element side input engaging portions 14 provided in the intermediate portion in the radial direction of the engaging elements 5.

The variable compression ratio device 44 of the present example having the above-described configuration decelerates the rotation of the electric motor 49 by the speed reduction mechanism 50 and transmits the rotation to the input member 2 of the reverse input shutoff clutch 1. In addition, at this time, the output of the electric motor 49 is amplified by the speed reduction mechanism 50. When rotational torque is inputted to the input member 2, due to the engagement between the engaging element side input engaging portions 14 and the input member side engaging portions 7, each of the pair of engaging elements 5 move inward in the radial direction to toward each other, and by engaging the output member side engaging portion 9 and the pair of engaging element side output engaging portions 15, mostly all of the rotational torque inputted to the input member 2 is transmitted to the control shaft 48 (output member 3). Then, by controlling the rotational phase of the control shaft 48, the posture of the link mechanism 47 is changed to a posture corresponding to the rotational phase of the control shaft 48. Therefore, according to the performance required of the internal combustion engine 45, it becomes possible to change the top dead center position and the bottom dead center position of the piston 46, and to change the engine compression ratio. Moreover, in this example, a highly efficient parallel shaft gear reducer is used as the speed reduction mechanism 50, so it becomes possible to finely control the rotational phase of the control shaft 48, and the posture of the link mechanism 47 may be finely adjusted.

In addition, the variable compression ratio device 44 of the present example is configured such that when rotational torque is reversely inputted from the control shaft 48 to the reverse input shutoff clutch 1, only a part of the reversely inputted rotational torque is transmitted to the electric motor 49 via the input member 2 and the speed reduction mechanism 50, and the remaining part is shut off. In other words, the remaining part of the rotational torque is consumed by sliding of the pressing surface 11 with respect to the pressed surface 10. Accordingly, energy consumption (amount of electric energy) required for the electric motor 49 may be reduced as compared with a case in which the reverse input shutoff clutch 1 is not provided and the rotational torque reversely inputted from the control shaft 48 is held only by the electric motor 49. Consequently, the operating cost of the variable compression ratio device 44 may be reduced. Moreover, even in a case where the electric motor 49 fails, when assist torque caused by the combustion load is reversely inputted to the control shaft 48, the reverse input shutoff clutch 1 allows a part of the assist torque to pass, so the shaft 48 is allowed to rotate, and the rotation phase of the control shaft 48 may be changed. For this reason, when the engine continues to operate, the engine compression ratio may be automatically changed to the low compression ratio side, and thus it is possible to make it more difficult for abnormal combustion such as knocking or the like to occur.

In this example, an example in which a parallel shaft gear reducer including an external gear and an internal gear is used as the speed reduction mechanism 50 is described; however, the speed reduction mechanism 50 is not limited to such a parallel shaft gear reducer, and in addition to a parallel shaft gear reducer with helical gears, it is also possible to use reducers having various kinds of known structures such as a planetary gear reducer, a cycloid reducer, a harmonic drive (registered trademark) reducer and the like. In addition, in a case in which the electric motor 49 has surplus output torque (output power), the speed reduction mechanism 50 may be omitted and the electric motor 49 and the reverse input shutoff clutch 1 may be directly connected. Moreover, it is also possible to change only one of the top dead center position and the bottom dead center position of the piston 46 according to the performance required for the internal combustion engine 45. The other configurations and operational effects are the same as those of the first example.

Figure 44:
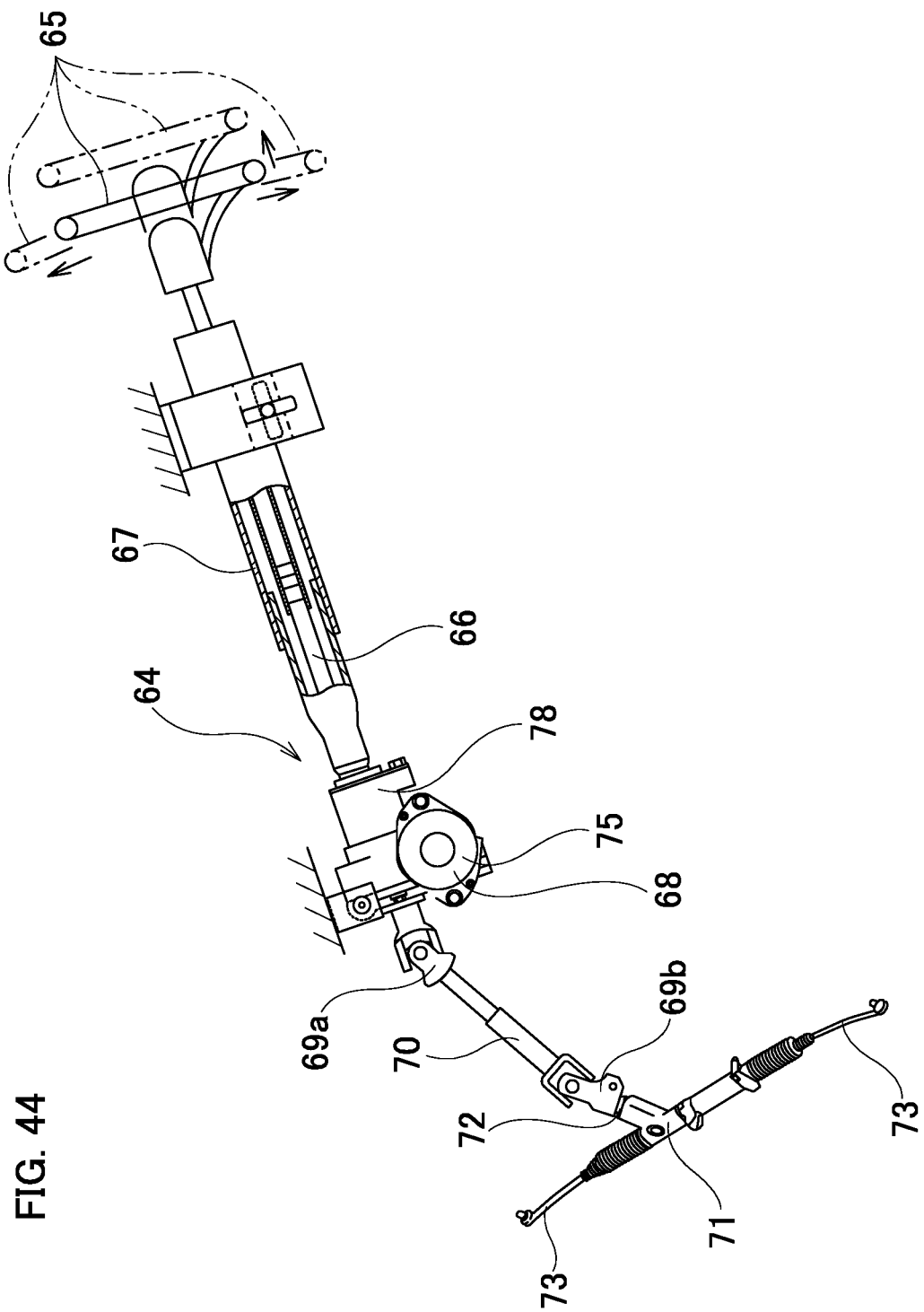
FIG. 44 is a partial cutaway side view illustrating an electric power steering device of a twenty-first example of an embodiment of the present invention.
Figure 45:
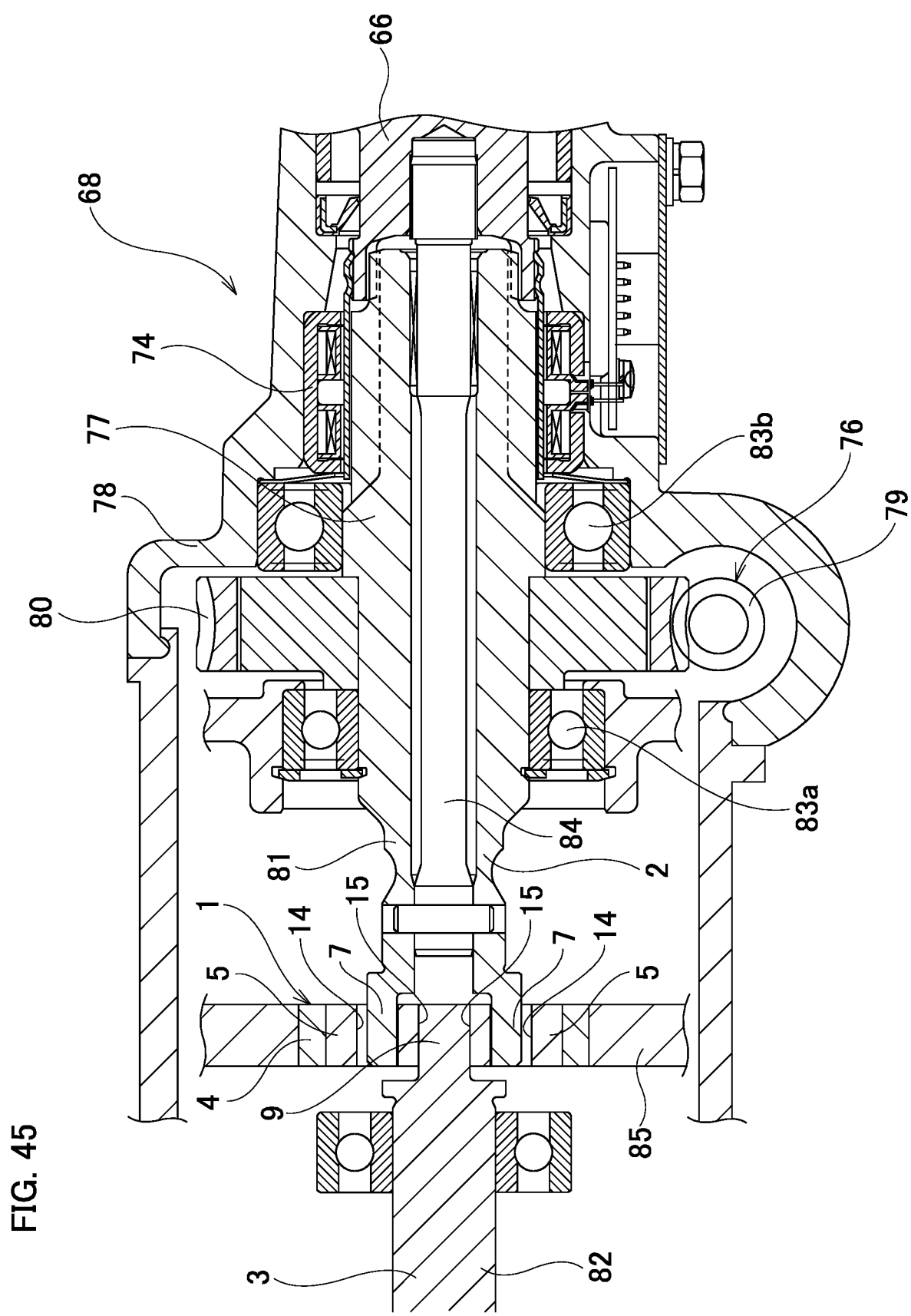
FIG. 45 is a schematic cross-sectional view illustrating a main part of the electric power steering device of the twenty-first example.
Figure 46:
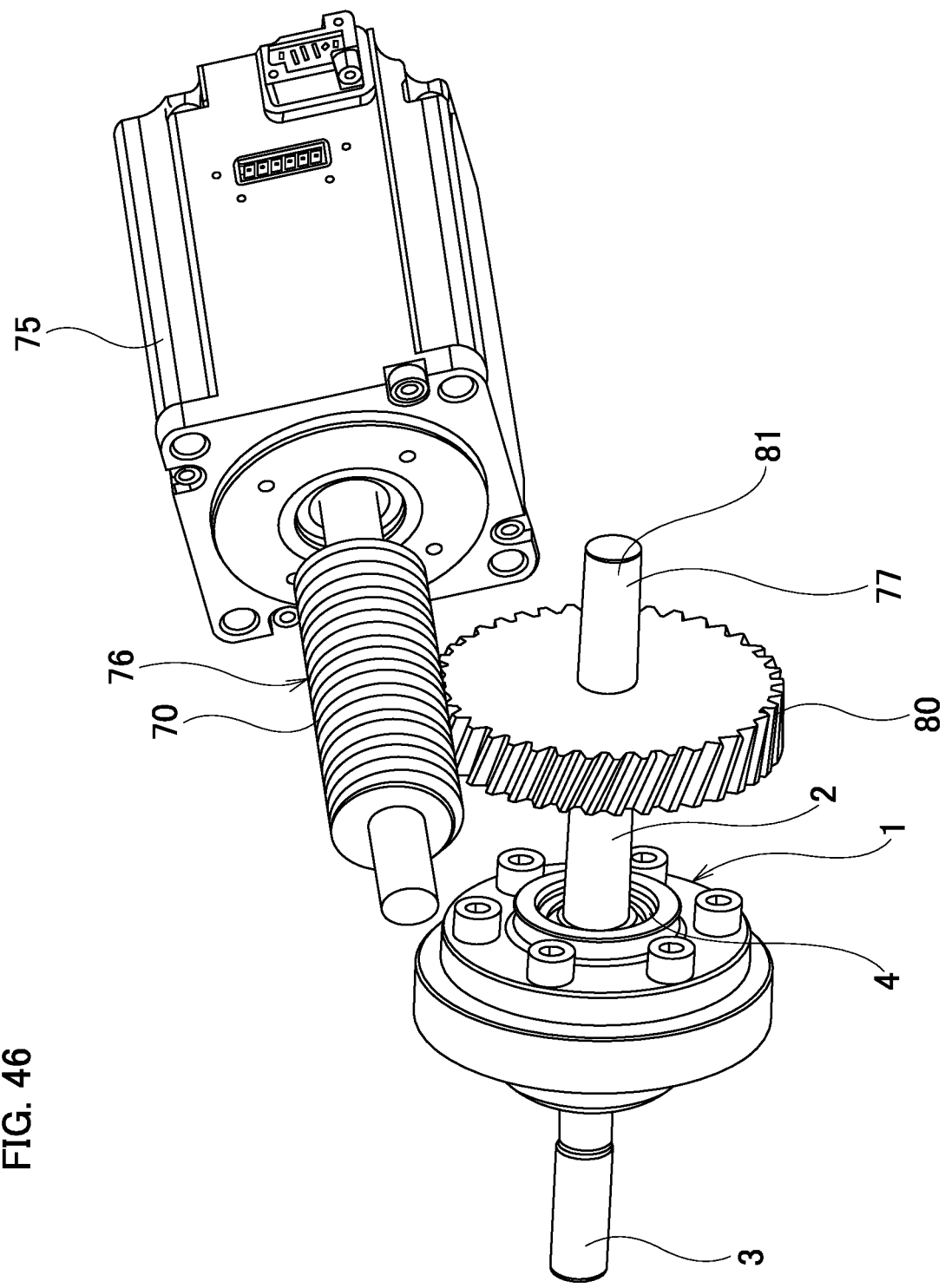
FIG. 46 is a perspective view illustrating the main part of the electric power steering device of the twenty-first example.

Furthermore, the structures of the second to seventeenth examples may be additionally or alternatively applied. For example, as in the structures described in the thirteenth to seventeenth examples, a reverse input shutoff clutch having a different shutoff rate may be preferably applied depending on the direction of the rotational torque that is reversely inputted to the output member. More specifically, the reverse input shutoff clutch is arranged so that the side with the low shutoff rate in the direction of rotation of the output member coincides with the low compression ratio side. Moreover, the side with the large shutoff rate in the direction of rotation of the output member is configured to completely shut off the rotational torque that is reversely inputted to the output member. This makes it possible to further reduce the energy consumption required for the electric motor, while at the same time makes it possible to automatically change the engine compression ratio to the low compression ratio side Twenty-first Example A twenty-first example of an embodiment of the present invention will be described with reference to FIG. 44 to FIG. 46. A feature of this example is that the reverse input shutoff clutch 1 is applied to an electric power steering device 64. In the following, the electric power steering device 64 of this example will be described in detail.

A steering wheel 65 that is operated by the driver in order to change the traveling direction of the vehicle is fixed to a rear end portion of a steering shaft 66. The steering shaft 66 is rotatably supported inside a cylindrical steering column 67. During steering, the movement of the steering wheel 65 is transmitted to a pinion shaft 72 of a steering gear unit 71 via the steering shaft 66, an electric assist device 68, a universal joint 69a, an intermediate shaft 70, and another universal joint 69b. When the pinion shaft 72 rotates, a pair of tie rods 73 arranged on both side of the steering gear unit 71 are pushed and pulled, and a steering angle corresponding to the operated amount of the steering wheel 65 is applied to the pair of left and right steered wheels. The force required for the driver to operate the steering wheel 65 is reduced by the auxiliary power applied from the electric assist device 68. Note that the front-rear direction refers to the front-rear direction of the vehicle body in which the electric power steering device is assembled.

The electric assist device 68 is provided in front of the steering column 67, and measures the steering torque inputted from the steering wheel 65 to the steering shaft 66 by the torque sensor 74, and based on this measurement signal, controls the energization of a steering force assisting motor 75. The auxiliary power generated by the steering force assisting motor 75 is applied to a rotating shaft (output shaft) 77 via a worm reducer 76. The rotating shaft 77 rotates based on the operation of the steering wheel 65, and applies a steering angle to the steered wheels corresponding to the amount of rotation of the steering wheel. A gear housing 78 is fixed to the front end portion of the steering column 67, and a torque sensor 74, the worm reducer 76, and the like are housed in the gear housing 78.

The worm reducer 76 includes a worm 79 and a worm wheel 80. The worm 79 is connected to the output shaft of the steering force assisting motor 75. On the other hand, the worm wheel 80 is externally fitted on the rotating shaft 77.

The rotating shaft 77 is configured by connecting an input-side rotating shaft 81 and an output-side rotating shaft 82 arranged coaxially with each other via the reverse input shutoff clutch 1. The input-side rotating shaft 81 is rotatably supported inside the gear housing 78 via a pair of rolling bearings 83a, 83b, and is coaxially arranged with and connected to the steering shaft 66 via a torsion bar 84. A worm wheel 80 is externally fitted on an intermediate portion of the input-side rotating shaft 81. The front end portion of the output-side rotating shaft 82 is connected to the pinion shaft 72 via a pair of universal joints 69a,69b and an intermediate shaft 70.

The basic configuration of the reverse input shutoff clutch 1 that connects the input-side rotary shaft 81 and the output-side rotary shaft 82 is the same as the structure of the first example, and all of the rotational torque that is inputted to the input-side rotating shaft 81 is transmitted to the output-side rotating shaft 82, whereas, only a part of the rotational torque reversely inputted to the output-side rotating shaft 82 is inputted to the input-side rotating shaft 81. In this example, the input member 2 of the reverse input shutoff clutch 1 is provided integrally with the input-side rotating shaft 81, and the output member 3 of the reverse input shutoff clutch 1 is integrally provided with the output-side rotating shaft 82. Therefore, the pair of input member side engaging portions 7 is provided at the front end portion of the input-side rotating shaft 81, and an output member side engaging portion 9 is provided at the rear end portion of the output-side rotating shaft 82. In addition, the annular pressed member 4 of the reverse input shutoff clutch 1 is fixed to the gear housing 78 or the like via a support bracket 85 arranged in the periphery, and the rotation thereof is restricted. A pair of engaging elements 5 is arranged between the output member side engaging portion 9 and the pressed surface 10 provided on the inner peripheral surface of the pressed member 4 so that the output member side engaging portion 9 is sandwiched from both sides in the radial direction.

Moreover, the input member side engaging portions 7 provided on the input-side rotating shaft 81 are loosely inserted inside the engaging element side input engaging portions 14 provided in the intermediate portion in the radial direction of the engaging elements 5.

In the electric power steering device 64 of this example, when the steering wheel 65 is operated, due to the steering torque applied to the steering shaft 66 and the resistance to rotation of the rotating shaft 77, the steering shaft 66 and the rotating shaft 77 displace relative to each other in the direction of rotation while causing the torsion bar 84 to elastically deform in a twisting direction. A torque sensor 74 measures the relative displacement amount between the steering shaft 66 and the rotating shaft 77. A controller (not illustrated), using the measurement signal of the torque sensor 74, applies auxiliary power to the rotating shaft 77 (input-side rotating shaft 81) via the steering force assisting motor 75 and the worm reducer 76.

In this example, when rotational torque is inputted to the input-side rotating shaft 81 as described above, the pair of the engaging elements 5 of the reverse input shutoff clutch 1, due to engagement with the engaging element side input engaging portions 14 and the input member side engaging portions 7, move inward in the radial direction toward each other, and by causing engagement of the output member side engaging portion 9 and the pair of engaging element side output engaging portions 15, transmit mostly all of the rotational torque inputted to the input side rotation shaft 81 to the output-side rotating shaft 82 (output member 3).

On the other hand, when rotational torque is reversely inputted to the output-side rotating shaft 82, by the output-side rotating shaft 82 rotating while the pressing surfaces 11 of the engaging elements 5 of the reverse input shutoff clutch 1 being slid against the pressed surface 10 of the pressed member 4, a part of the reversely inputted rotational torque is transmitted to the steering wheel 65 via the input-side rotating shaft 81, the torsion bar 84, and the steering shaft 66. Therefore, the reaction force from the road surface may be transmitted to the driver through the steering wheel 65, so that the driver is able to easily ascertain the condition of the road surface. Accordingly, even in a case where the vehicle trajectory needs to be corrected when traveling on a rough road, it is possible to correct the trajectory without delay, which contributes to safe driving of the vehicle. In addition, it is possible to transmit not all, but only a part of the rotational torque reversely inputted to the output-side rotating shaft 82, so, for example, it is possible to prevent torque due to micro vibration inputted to the tire when traveling on a bad road or the like to be transmitted to the driver. Other configurations and operational effects related to the reverse input shutoff clutch are the same as in the first example. Furthermore, the structures of the second to seventeenth examples may be additionally or alternatively applied.

The structures of the first example to the seventeenth example of an embodiment of the present invention described above may be implemented in appropriate combination as long as no contradiction occurs.

In the reverse input shutoff clutch of the present invention, the number of engaging elements provided in various machines is not limited to the two illustrated in the first to sixteenth examples; however, as illustrated in the seventeenth example, one is possible or three or more is also possible. In addition, in regard to the engagement structure between the input member and the output member, the engaging elements are not limited to the structures illustrated in the first to seventeenth examples. As long as the rotation of each of the input member and the output member may be converted into radial movement of the engaging elements, various conventionally known structures may be employed. Moreover, in addition to the coiled spring, a leaf spring, rubber, or the like may also be used as the elastic member used to prevent the output member from looseness.

The reverse input shutoff clutch of the present invention may be applied, for example, an electric valve timing adjustment device as in the eighteenth and nineteenth examples, a variable compression ratio device as in the twentieth example, or an electric power steering device as in the twenty-first example, as well as an electric door device, a lifting device, or the like.

A worm reducer having a self-locking function is used for an electric power window or the like of an automobile that is a kind of a raising/lowering device; however, a reverse input shutoff clutch may also be provided instead of the self-locking function. In a case where a worm reducer is provided with a self-locking function, there is a possibility that the forward efficiency will be reduced and that the size of the device may be increased; however, by applying a reverse input shutoff clutch is applied, the forward efficiency may be increased, and an increase in the size of the device may be prevented.

REFERENCE SIGNS LIST 1, 1a, 1b, 1c, 1d, 1e, 1f, 1g, 1h, 1i, 1j, 1k, 1l, 1m, 1n, 1o Reverse input shutoff clutch
2, 2a, 2b, 2c, 2d Input member
3, 3a, 3b, 3c, 3d, 3e, 3f, 3g, 3h Output member
4 Pressed member
5, 5a, 5b, 5c, 5d, 5e, 5f, 5g, 5h, 5i, 5j, 5k Engaging element
6, 6a Input shaft portion
7, 7a, 7b, 7c Input member side engaging portion
8, 8a Output shaft portion
9, 9a, 9c, 9d, 9e, 9f, 9g, 9h Output member side engaging portion
10 Pressed surface
11, 11a Pressing surface
12, 12a, 12b, 12c, 12d, 12e, 12f, 12g, 12h, 12i Bottom surface
13 Side surface
14, 14a, 14b Engaging element side input engaging portion
15, 15a Engaging element side output engaging portion
16 Pin portion
17 Pin portion
18 Guide slit
17 Pin portion
18 Guide slit
19, 19a Guide
20 Overhang portion
21 Notch
22 Auxiliary shaft portion
23 Concave housing portion
24, 24a Elastic member
25 Tip end surface
26 Inclined surface
27 Concave guide portion
28, 28a Chamfered portion
29 Guide hole
30 Insertion through hole
31 Camshaft
32 Sprocket
33 Electric motor
34, 34a Electric valve timing adjustment device
35 Internal combustion engine
36 Crankshaft
37 Interlocking mechanism
38 Speed reduction mechanism
39 Gap
40 Worm reducer
41 Worm gear
42 Worm wheel
43 Housing
44 Variable compression ratio device
45 Internal combustion engine
46 Piston
47 Link mechanism
48 Control shaft
49 Electric motor
50 Speed reduction mechanism
51 Cylinder
52 Upper link
53 Lower link
54 Control link 55 Piston pin
56a First connection pin
56b Second connection pin
57 Crankshaft
58 Crank pin
59 Eccentric shaft portion
60a to 60h First gear to Eighth gear
61 Output shaft
62a to 62c First intermediate shaft to Third intermediate shaft
63 Support bracket
64 Electric power steering device
65 Steering wheel
66 Steering shaft
67 Steering column
68 Electric assist device
69a, 69b Universal joint
70 Intermediate shaft
71 Steering gear unit
72 Pinion shaft
73 Tie rod
74 Torque sensor
75 Steering force assisting motor
76 Worm reducer
77 Rotating shaft
78 Gear housing
79 Worm
80 Worm wheel
81 Input-side rotating shaft
82 Output-side rotating shaft
83a, 83b Rolling bearing
84 Torsion bar
85 Support bracket

The invention claimed is:

1. A reverse input shutoff clutch, comprising:
an input member;
an output member coaxially arranged with the input member;
a pressed member having a pressed surface; and
an engaging element that, when a rotational torque is inputted to the input member, moves in a direction away from the pressed surface due to engagement with the input member, and by engaging with the output member, transmits the rotational torque that is inputted to the input member to the output member; and when a rotational torque is reversely inputted to the output member, moves in a direction toward the pressed surface due to engagement with the output member, and by coming in contact with the pressed surface, completely shuts off not to transmit the rotational torque that is reversely inputted to the output member, or transmits part of the rotational torque that is reversely inputted to the output member to the input member, and shuts off a remaining part of the rotational torque that is reversely inputted to the output member, wherein the pressed surface is an arc-shaped concave surface with regard to a circumferential direction, the engaging element has a pair of pressing surfaces that is provided at two locations spaced apart in the circumferential direction on an outer side surface in a radial direction thereof and that is pressed against the pressed surface, and each of the pair of pressing surfaces is an arc-shaped convex surface in the circumferential direction having a radius of curvature smaller than a radius of curvature of the pressed surface wherein the engaging element is arranged between the pressed surface and an output member side engaging portion provided on the output member, and causes an input member side engaging portion provided at a portion of an end surface of the input member and separated in a radial direction from a center of rotation of the input member to engage with an engaging element side input engaging portion provided in the engaging element to enable movement of the engaging element toward or away from the pressed surface.

2. The reverse input shutoff clutch according to claim 1, wherein in a positional relationship in which the engaging element is brought into contact with the pressed surface by rotational torque being reversely inputted to the output member, a gap exists between the engaging element and the input member and allows the engaging element to be pressed toward the pressed surface due to the engaging element engaging with the output member.

3. The reverse input shutoff clutch according to claim 1, wherein the engaging element side input engaging portion is configured by a hole provided in an axial direction.

4. The reverse input shutoff clutch according to claim 1, wherein the engaging element side input engaging portion is provided to be recessed inward in the radial direction on an outer side surface in the radial direction of the engaging element.

5. The reverse input shutoff clutch according to claim 1, wherein a magnitude of looseness of the input member side engaging portion with respect to the engaging element side input engaging portion is different between a case in which the input member rotates in one direction and a case in which the input member rotates in the other direction.

6. The reverse input shutoff clutch according to claim 1, wherein a portion of the engaging element that engages with the output member side engaging portion has a flat surface shape.

7. The reverse input shutoff clutch according to claim 6, wherein a bottom surface of the engaging element including the portion that engages with the output member side engaging portion entirely has a flat surface shape.

8. The reverse input shutoff clutch according to claim 1, wherein a plurality of the engaging elements is provided to sandwich the output member side engaging portion from an outer side in a radial direction.

9. The reverse input shutoff clutch according to claim 8, wherein a pair of the engaging elements is provided to sandwich the output member side engaging portion by bottom surfaces of the engaging elements.

10. The reverse input shutoff clutch according to claim 9, wherein each of the pair of engaging elements comprises a concave guide portion on the bottom surface, and an elastic member is arranged so as to span between the concave guide portions.

11. The reverse input shutoff clutch according to claim 1, wherein
an elastic member is arranged between the output member and the engaging element.

12. The reverse input shutoff clutch according to claim 1, wherein
a shutoff rate of rotational torque reversely inputted to the output member is different between a case in which the output member rotates in one direction and a case in which the output member rotates in the other direction.

13. The reverse input shutoff clutch according to claim 1, wherein
a cross-sectional shape in an axial direction of the pressed surface and a cross-sectional shape in an axial direction of a pressing surface of the engaging element pressed against the pressed surface are both linear or arc shaped.

14. The reverse input shutoff clutch according to claim 13, wherein
the cross-sectional shape in the axial direction of the pressing surface is linear, and flat or curved chamfers are provided on both sides of the pressing surface in the axial direction.

15. The reverse input shutoff clutch according to claim 1, wherein
the pressed member is formed in a thin annular shape, and the pressed surface is provided on an inner peripheral surface of the pressed member,
a gap is always present between the outer side surface in the radial direction of the engage element and the pressed surface in a portion between the pair of pressing surfaces.

16. The reverse input shutoff clutch according to claim 1, wherein
an input member side engaging portion provided at a portion of an end surface of the input member and separated in a radial direction from a center of rotation of the input member is engaged with an engaging element side input engaging portion provided in the engaging element to enable movement of the engaging element toward or away from the pressed surface, and
the input member side engaging portion has an outer side surface in the radial direction thereof having a cylindrical surface shape and an inner sides surface in the radial direction thereof having a flat surface shape.

17. An electric valve time adjustment device, comprising:
an electric motor as a drive source; a driven member rotationally driven by a crankshaft; and a speed reduction mechanism having a first input portion, a second input portion, and an output portion connected to a camshaft; wherein
a reverse input shutoff clutch is provided between the electric motor and the driven member and the speed reduction mechanism, and the reverse input shutoff clutch is the reverse input shutoff clutch according to claim 1;
the electric motor is connected to the input member;
the driven member is connected to the pressed member;
the first input portion of the speed reduction mechanism is connected to the output member, and the second input portion of the speed reduction mechanism is connected to the driven member; and
when the electric motor is driven, a rotational torque of the electric motor is transmitted to the output portion of the speed reduction mechanism, and when the electric motor is not driven, a rotational torque of the driven member is transmitted to the output portion of the speed reduction mechanism.

18. A variable compression ratio device comprising:
a link mechanism connected to a piston of an internal combustion engine and moving the piston in a vertical direction;
a control shaft for changing a posture of the link mechanism by own rotation; and
an electric motor for rotating the control shaft; wherein
the variable compression ratio device, by changing a rotation phase of the control shaft by the electric motor, changes an engine compression ratio by changing at least one of a top dead center position and a bottom dead center position of the piston;
a reverse input shutoff clutch is provided between the electric motor and the control shaft, and the reverse input shutoff clutch is the reverse input shutoff clutch according to claim 1;
the input member is connected to the electric motor either directly or via a speed reduction mechanism; and
the output member is connected to the control shaft or is integrally provided with the control shaft.

19. An electric power steering device, comprising:
a rotating shaft rotating based on operation of a steering wheel and applying a steering angle to steered wheels according to an amount of rotation;
a steering force assisting motor for applying an assisting force to the rotating shaft; and
a worm reducer provided between the steering force assisting motor and the rotating shaft and transmitting rotation of the steering force assisting motor to the rotating shaft; wherein
the rotating shaft is configured by connecting an input-side rotating shaft and an output-side rotating shaft coaxially arranged with each other via a reverse input shutoff clutch, the reverse input shutoff clutch is the reverse input shutoff clutch according to claim 1;
the input member is connected to the input-side rotating shaft or is integrally provided with the input-side rotating shaft; and
the output member is connected to the output-side rotating shaft or is integrally provided with the output-side rotating shaft.

\* \* \* \* \*